US012806554B2

(12) United States Patent
Tiffany et al.

(10) Patent No.: US 12,806,554 B2
(45) Date of Patent: *Nov. 24, 2026

(54) FILTER ELEMENT, SYSTEMS, AND METHODS

(71) Applicant: Donaldson Company, Inc., Bloomington, MN (US)

(72) Inventors: Jason A. Tiffany, Bloomington, MN (US); Brent L. Anderson, Cottage Grove, MN (US); Richard P. DeJong, Eden Prairie, MN (US); Andrew C. Dahlgren, Victoria, MN (US); Wim Van Gelder, Kessel-Lo (BE); Olivier Ronneau, Chapelle-Lez-Herlaimont (BE); Mathijs Verstraete, Tienen (BE); Gert Proost, Kessel-lo (BE); Massimo Movia, Enemonzo (IT); Eli Payton Ross, Faribault, MN (US); Michael R. Carlson, Cottage Grove, MN (US)

(73) Assignee: Donaldson Company, Inc., Bloomington, MN (US)

(*) Notice: Subject to any disclaimer, the term of this patent is extended or adjusted under 35 U.S.C. 154(b) by 232 days.

This patent is subject to a terminal disclaimer.

(21) Appl. No.: 18/773,143

(22) Filed: Jul. 15, 2024

(65) Prior Publication Data

US 2024/0375032 A1 Nov. 14, 2024

Related U.S. Application Data

(63) Continuation of application No. 18/216,419, filed on Jun. 29, 2023, now Pat. No. 12,036,502, which is a (Continued)

(51) Int. Cl.

*B01D 46/24* (2006.01)
*B01D 46/00* (2022.01)
(Continued)

(52) U.S. Cl.

CPC ..... *B01D 46/2414* (2013.01); *B01D 46/0005* (2013.01); *B01D 46/521* (2013.01); (Continued)

(58) Field of Classification Search

CPC .......... B01D 2271/027; B01D 46/2414; B01D 46/0005; B01D 46/521; (Continued)

(56) References Cited

U.S. PATENT DOCUMENTS

| | | | |
|---|---|---|---|
| 4,925,561 | A | 5/1990 | Ishii et al. |
| 5,049,326 | A | 9/1991 | Matsumoto et al. |

(Continued)

FOREIGN PATENT DOCUMENTS

| | | | |
|---|---|---|---|
| DE | 102017009689 | A1 | 5/2018 |
| DE | 202008017059 | U1 | 5/2020 |

(Continued)

OTHER PUBLICATIONS

International Search Report and Written Opinion for PCT/US2019/014797, mailed Jun. 4, 2019.

*Primary Examiner* — Robert Clemente
(74) *Attorney, Agent, or Firm* — Merchant & Gould P.C.

(57) ABSTRACT

A gas turbine air intake system uses a filter element having a seal member with radial projections and radial recesses. The seal member forms a seal with components on the tube sheet of the system and at the end opposite of the tube sheet. At the end opposite of the tube sheet, there can be an assembly cover, or alternatively, an additional filter cartridge.

10 Claims, 58 Drawing Sheets

Related U.S. Application Data continuation of application No. 16/963,486, filed as application No. PCT/US2019/014797 on Jan. 23, 2019, now Pat. No. 11,691,101.

(60) Provisional application No. 62/794,205, filed on Jan. 18, 2019, provisional application No. 62/621,364, filed on Jan. 24, 2018.

(51) Int. Cl.
*B01D 46/52* (2006.01)
*B01D 46/58* (2022.01)
*F02C 7/052* (2006.01)

(52) U.S. Cl.
CPC ......... *B01D 46/526* (2013.01); *B01D 46/527* (2013.01); *B01D 46/58* (2022.01); *F02C 7/052* (2013.01); *B01D 2271/027* (2013.01); *B01D 2275/201* (2013.01); *B01D 2279/60* (2013.01); *F05D 2260/607* (2013.01)

(58) Field of Classification Search
CPC ...... B01D 46/525–527; B01D 2279/60; B01D 2201/34; B01D 2201/347; B01D 2265/021; F02C 7/052; F05D 2260/607
See application file for complete search history.

(56) References Cited

U.S. PATENT DOCUMENTS

| | | | |
|---|---|---|---|
| 5,071,456 | A | 12/1991 | Binder et al. |
| 5,562,825 | A | 10/1996 | Yamada et al. |
| 5,613,992 | A | 3/1997 | Engel |
| 5,772,883 | A | 6/1998 | Rothman et al. |
| D396,098 | S | 7/1998 | Gillingham et al. |
| 5,792,247 | A | 8/1998 | Gillingham et al. |
| D398,046 | S | 9/1998 | Gillingham et al. |
| 5,803,941 | A | 9/1998 | Berkhoel et al. |
| D399,944 | S | 10/1998 | Gillingham et al. |
| 5,820,646 | A | 10/1998 | Gillingham et al. |
| 5,895,574 | A | 4/1999 | Friedmann et al. |
| 5,902,364 | A | 5/1999 | Tokar et al. |
| 6,039,778 | A | 3/2000 | Coulonvaux |
| D428,128 | S | 7/2000 | Gillingham et al. |
| 6,179,890 | B1 | 1/2001 | Ramos et al. |
| D437,401 | S | 2/2001 | Ramos et al. |
| 6,190,432 | B1 | 2/2001 | Gieseke et al. |
| 6,210,469 | B1 | 4/2001 | Tokar |
| 6,235,195 | B1 | 5/2001 | Tokar |
| 6,350,291 | B1 | 2/2002 | Gieseke et al. |
| 6,511,101 | B1 | 1/2003 | Sommer et al. |
| 6,673,136 | B2 | 1/2004 | Gillingham et al. |
| 7,625,419 | B2 | 12/2009 | Nelson et al. |
| 8,479,924 | B2 | 7/2013 | Mbadinga-Mouanda et al. |
| 8,956,434 | B2 | 2/2015 | Vanderlinden et al. |
| 8,979,964 | B2 | 3/2015 | Muenkel et al. |
| 9,919,256 | B2 | 3/2018 | Mbadinga-Mouanda et al. |
| 10,661,209 | B2 | 5/2020 | Way |
| 11,691,101 | B2 * | 7/2023 | Tiffany ................ B01D 46/526 55/498 |
| 2003/0146149 | A1 | 8/2003 | Binder et al. |
| 2004/0103626 | A1 | 6/2004 | Warth et al. |
| 2004/0187689 | A1 | 9/2004 | Sporre et al. |
| 2005/0130508 | A1 | 6/2005 | Yeh |
| 2008/0282890 | A1 | 11/2008 | Rocklitz et al. |
| 2009/0094951 | A1 | 4/2009 | Baseotto et al. |
| 2009/0127211 | A1 | 5/2009 | Rocklitz et al. |
| 2010/0032365 | A1 | 2/2010 | Moe et al. |
| 2010/0186353 | A1 | 7/2010 | Ackermann et al. |
| 2012/0124950 | A1 | 5/2012 | Sessions et al. |
| 2014/0137525 | A1 | 5/2014 | Cambpell et al. |
| 2014/0208705 | A1 | 7/2014 | Krull |
| 2014/0260982 | A1 | 9/2014 | Williams et al. |
| 2015/0113931 | A1 | 4/2015 | Bartel et al. |
| 2017/0173512 | A1 | 6/2017 | Van Den Bossche et al. |
| 2017/0246571 | A1 | 8/2017 | Adamek et al. |
| 2018/0207566 | A1 | 7/2018 | Stanhope et al. |
| 2018/0290092 | A1 | 10/2018 | Williams et al. |

FOREIGN PATENT DOCUMENTS

| | | | |
|---|---|---|---|
| EP | 2827967 | B1 | 1/2015 |
| WO | 97/40918 | A1 | 11/1997 |
| WO | 03/47722 | A2 | 6/2003 |
| WO | 2004/007054 | A1 | 1/2004 |
| WO | 2004/082795 | A2 | 9/2004 |
| WO | 2005/077487 | A1 | 8/2005 |
| WO | 2017/139673 | A1 | 8/2017 |

* cited by examiner

FILTER ELEMENT, SYSTEMS, AND METHODS

This application is a continuation of application of U.S. patent application Ser. No. 18/216,419, filed Jun. 29, 2023, which is a continuation of U.S. patent application Ser. No. 16/963,486, filed Jul. 20, 2020, now U.S. Pat. No. 11,691,101, which is a 371 application of International Patent Application No. PCT/US2019/014797, filed Jan. 23, 2019, and claims priority to U.S. Provisional Patent Application No. 62/621,364, filed Jan. 24, 2018, and to U.S. Provisional Patent Application No. 62/794,205, filed Jan. 18, 2019, the disclosures of which are hereby incorporated by reference herein in their entirety.

TECHNICAL FIELD

This disclosure concerns filter for use in air intakes for systems such as gas turbines. In particular, this disclosure concerns filters and systems that ensure the correct filter element is being used for the system.

BACKGROUND

Air intake for gas turbines, and other such systems, require filtration of the air so that particulates in the air do not damage downstream components, such as the turbine. As such, the filters used are important, and having the proper filter element installed is important in protecting the downstream turbine. Improvements in such filter systems are desirable.

SUMMARY

A filter element and filter assembly are provided that improve the prior art.

In one aspect, a filter element is provided including a tubular section of filter media and first and second opposite open end caps secured to the filter media. Each of the first and second end caps has a seal arrangement along an inner radial surface of each of the end caps. Each of the seal arrangements includes a seal member having an inwardly radially directed seal surface and a thickness that varies along the seal member surface.

Each of the seal arrangements may have a same shape as the other.

The tubular section of media can be conical, and the seal arrangements vary in proportion to each other.

In some embodiments, there can be a seal support, which may comprise an inner liner extending between the first and second end caps.

The thickness between the seal support and the seal member may vary in a radial direction along the seal member surface.

A length of the seal member surface can be constant in an axial direction.

The seal member thickness may vary by a minimum thickness and a maximum thickness, wherein the maximum thickness is at least 1.1 times the minimum thickness.

The radially directed seal surface may comprise a plurality of outwardly projecting and axially extending portions and a plurality of inwardly projecting and axially extending portions.

The plurality of outwardly projecting and axially extending portions and the plurality of inwardly projecting and axially extending portions may comprise curved portions.

The radially directed seal surface can include at least 2 of the radially outwardly projecting and axially extending portions alternating with at least 2 of the radially inwardly projecting and axially extending portions per inch around a central axis of the filter element.

The radially directed seal surface can include greater than 20 of the radially outwardly projecting and axially extending portions alternating with greater than 20 of the radially inwardly projecting and axially extending portions.

In some embodiments, the filter media is pleated media.

In many example embodiments, the tubular section of filter media has a round cross section.

In another aspect, a filter element is provided comprising a tubular section of filter media; and first and second opposite open end caps secured to the filter media; each of the first and second end caps having a seal arrangement along an inner radial surface of each of the end caps; each of the seal arrangements including a seal support and a seal member supported by the seal support; and the seal member having an inwardly radially directed seal surface and a thickness between the seal support and the seal member surface that varies along the seal member surface.

In another aspect, a filter assembly is provided. The filter assembly includes a tube sheet having a filtered air aperture; a tube sheet seal member along the aperture; and a filter element releasably secured to the tube sheet. The seal member of the tube sheet has a plurality of alternating outward radial portions and alternating inward radially portions. The filter element includes first and second opposite end caps; a tubular section of filter media defining an interior volume in communication with the filtered air aperture of the tube sheet; and a first filter element seal member along the first end cap having a plurality of compressible alternating radial projections and alternating radially recesses. The first filter element seal member forms a seal with the tube sheet seal member in that the tube sheet seal member inward radial portions receive the first filter element seal member radial projections; and the first filter element seal member radial recesses receive the tube sheet seal member outward radial portions.

In some examples, the tube sheet seal member is part of a seal plate having a collar and a neck. The collar is attachable to the tube sheet, and the neck projects axially from the collar. The tube sheet seal member is along the neck.

The filter assembly may further comprise a yoke plate secured to the tube sheet. The yoke plate includes a fixture holding a rod removably securing the filter element to the tube sheet.

In some example embodiments, the second end cap is an open end cap.

In embodiments where the second end cap is an open end cap, the second end cap includes a second filter element seal member having a plurality of compressible alternating radial projections and alternating radially recesses.

In embodiments that have a second open end cap, the filter assembly can further include an assembly cover having a plurality of alternating outward radial portions and alternating inward radially portions. The assembly cover may be received within and form a seal with the second end cap such that the assembly cover inward radial portions receive the second filter element seal member radial projections; and the second filter element seal member radial recesses receive the assembly cover outward radial portions.

In embodiments that include an assembly cover, the filter assembly can further include a gasket washer and a pivotable handle, wherein the rod extends through the assembly cover and is secured to the gasket washer and handle to removably secure the filter element to the tube sheet.

In some examples, the filter element is one in a filter pair; the filter pair comprising either two cylindrical elements, or a conical element and a cylindrical element stacked axially In some embodiments that include a second open end cap, the assembly further includes an additional filter cartridge removably mounted within the second end cap. The additional filter cartridge has a media pack comprising opposite first end and second flow faces with flutes extending in a direction therebetween and a sidewall extending between the first and second flow faces. At least some of the flutes have an upstream portion adjacent the first flow face that are open and a downstream portion adjacent the second flow face that are closed. At least some of the flutes have an upstream portion adjacent the first flow face that are closed and a downstream portion adjacent the second flow face that are open. A band is around the sidewall of the additional filter cartridge. The band includes a plurality of alternating outward radial portions and alternating inward radial portions. The additional filter cartridge is received within and forms a seal with the second end cap such that the band inward radial portions receive the second filter element seal member radial projections; and the second filter element seal member radial recesses receive the band outward radial portions.

In embodiments that include an additional filter cartridge, the filter assembly may further include a gasket washer and a pivotable handle, wherein the rod extends through the additional filter cartridge and is secured to the gasket washer and handle to removably secure the filter element to the tube sheet.

In another aspect, a filter cartridge is provided. The filter cartridge includes a media pack comprising opposite first and second flow faces with flutes extending in a direction therebetween, and a sidewall extending between the first and second flow faces. At least some of the flutes have an upstream portion adjacent the first flow face that are open and a downstream portion adjacent the second flow face that are closed; and at least some of the flutes have an upstream portion adjacent the first flow face the are closed and a downstream portion adjacent the second flow face that are open. A band is around the sidewall. The band includes a plurality of alternating outward radial portions and alternating inward radial portions.

The band can be between the first flow face and second flow face.

The band may be against the side wall.

The band may be adjacent the first flow face.

In some embodiments, the band is part of an end piece. The end piece has a plate extending radially from the first flow face. The band extends axially from the plate along the side wall.

In many example embodiments, the media pack is coiled, and the media pack defines a central, open channel extending between the first and second flow faces.

In example embodiments, the media pack forms a round construction.

In a further aspect, a filter arrangement is provided comprising first and second opposite open end caps; a tubular section of filter media extending between the first and second end caps and defining an interior volume therewithin; and a filter cartridge mounted within an opening in the second end cap.

The filter cartridge can include a media pack comprising media for straight-through flow.

The filter cartridge may include a media pack comprising flutes.

The filter cartridge may include a media pack comprising pleats.

The filter cartridge may include a media pack comprising opposite first and second flow faces with flutes extending in a direction therebetween; and a sidewall extending between the first and second flow faces; at least some of the flutes having an upstream portion adjacent the first flow face being open and a downstream portion adjacent the second flow face being closed; and at least some of the flutes having an upstream portion adjacent the first flow face being closed and a downstream portion adjacent the second flow face being open.

In some embodiments, the tubular section of filter media is pleated media.

In some arrangements, the first open end cap includes a radially inwardly directed seal member oriented to form a releasable radial seal.

The filter cartridge can be removably mounted in the opening of the second end cap.

The filter cartridge can be non-removably mounted in the opening of the second end cap.

In some implementations, the media pack in the filter cartridge is coiled.

In some embodiments, the media pack of the filter cartridge extends from the second end cap into the interior volume and toward the first end cap along an extension less than half of a distance between the first and second end caps.

In some embodiments, the media pack of the filter cartridge extends from the second end cap into the interior volume and toward the first end cap along an extension less than one-third of a distance between the first and second end caps.

In some arrangements, the filter cartridge is positioned within the opening in the second end cap in an off-centered position.

In one or more embodiments, the filter cartridge has an outer perimeter shape that is non-round.

The filter cartridge may have has an outer perimeter shape including one of: a sector of an annulus with rounded ends; a segment of a circle; or banana.

In a further aspect, a filter element is provided including a tubular section of filter media defining an open filter interior; and a first open end cap and an opposite second end cap secured to the filter media; the second end cap having a center, integrated gasket with a seal member; the seal member having an inwardly radially directed seal surface and a thickness that varies along the seal member surface.

In example embodiments, the thickness varies in a radial direction along the seal member surface.

In example embodiments, a length of the seal member surface is constant in an axial direction.

In example embodiments, the radially directed seal surface comprises a plurality of outwardly projecting and axially extending portions and a plurality of inwardly projecting and axially extending portions.

In example embodiments, the plurality of outwardly projecting and axially extending portions and the plurality of inwardly projecting and axially extending portions comprise curved portions.

In example embodiments, the second end cap has a recessed section projecting inwardly into the filter interior; and the integrated gasket is centered in the recessed section.

In example embodiments, the integrated gasket has an outer diameter less than 20% of an outer diameter of the second end cap.

In example embodiments, the first end cap has a seal arrangement along an inner radial surface; and the seal arrangements includes a seal support and a seal member supported by the seal support; the first end cap seal member having an inwardly radially directed seal surface and a thickness between the seal support and the seal member surface that varies along the seal member surface.

In example embodiments, the radially directed seal surface of the first end cap comprises a plurality of outwardly projecting and axially extending portions and a plurality of inwardly projecting and axially extending portions.

In example embodiments, the filter media is pleated media.

In example embodiments, the tubular section of filter media has a round cross-section.

In a further aspect, a filter assembly is provided including a tube sheet having a filtered air aperture; a tri-pod yoke arrangement secured to the tube sheet; the yoke arrangement including a rod; a portion of the rod having a plurality of alternating outward radial sections and alternating inward radial sections; a filter element releasably secured to the tube sheet; the filter element having: (i) first and second opposite end caps; the first end cap forming a seal with the tube sheet; (ii) a tubular section of filter media defining an interior volume in communication with the filtered air aperture; and (iii) the second end cap having an integrated gasket with a seal member having a plurality of compressible alternating radial projections and alternating radial recesses; the second end cap receiving the rod through the gasket in that: the rod inward radial sections receive the seal member radial projections; and the seal member radial recesses receive the rod outward radial sections.

In example embodiments, there is a pivotable handle secured to a free end of the rod.

In example embodiments, the tube sheet has a tube sheet seal member along the aperture; the tube sheet seal member having a plurality of alternating outward radial portions and alternating inward radial portions; and the first end cap has a first filter element seal member having a plurality of compressible alternating radial projections and alternating radial recesses; the first filter element seal member forming a seal with the tube sheet seal member in that: the tube sheet seal member inward radial portions receive the first filter element seal member radial projections; and the first filter element seal member radial recesses receive the tube sheet seal member outward radial portions.

In another aspect, a filter element is provided comprising: a tubular section of filter media; and a first end cap secured to the filter media; the first end cap having a seal arrangement along an inner radial surface; the seal arrangement including a seal member having an inwardly radially directed seal surface and a thickness that varies along the seal member surface; and a second end cap secured to the filter media opposite of the first end cap; the second end cap being closed except for a seal-receiving opening in the center of the second end cap; the seal-receiving opening having an outer diameter less than 20% of an outer diameter of the second end cap.

In example embodiments, the thickness of the seal member surface varies in a radial direction along the seal member surface.

In example embodiments, a length of the seal member surface is constant in an axial direction.

In some implementations, the seal member thickness varies by a minimum thickness and a maximum thickness, wherein the maximum thickness is at least 1.1 times the minimum thickness.

The radially directed seal surface may comprise a plurality of outwardly projecting and axially extending portions and a plurality of inwardly projecting and axially extending portions.

In some examples, the plurality of outwardly projecting and axially extending portions and the plurality of inwardly projecting and axially extending portions comprise curved portions.

In example embodiments, the filter media is pleated media.

In example embodiments, the tubular section of filter media has a round cross-section.

A variety of examples of desirable product features or methods are set forth in the description that follows, and in part, will be apparent from the description, or may be learned by practicing various aspects of this disclosure. The aspects of this disclosure may relate to individual features, as well as combinations of features. It is to be understood that both the foregoing general description and the following detailed description are explanatory only, and are not restrictive of the claimed inventions.

DETAILED DESCRIPTION

A. System, FIGS. 1 and 23

Figure 1:
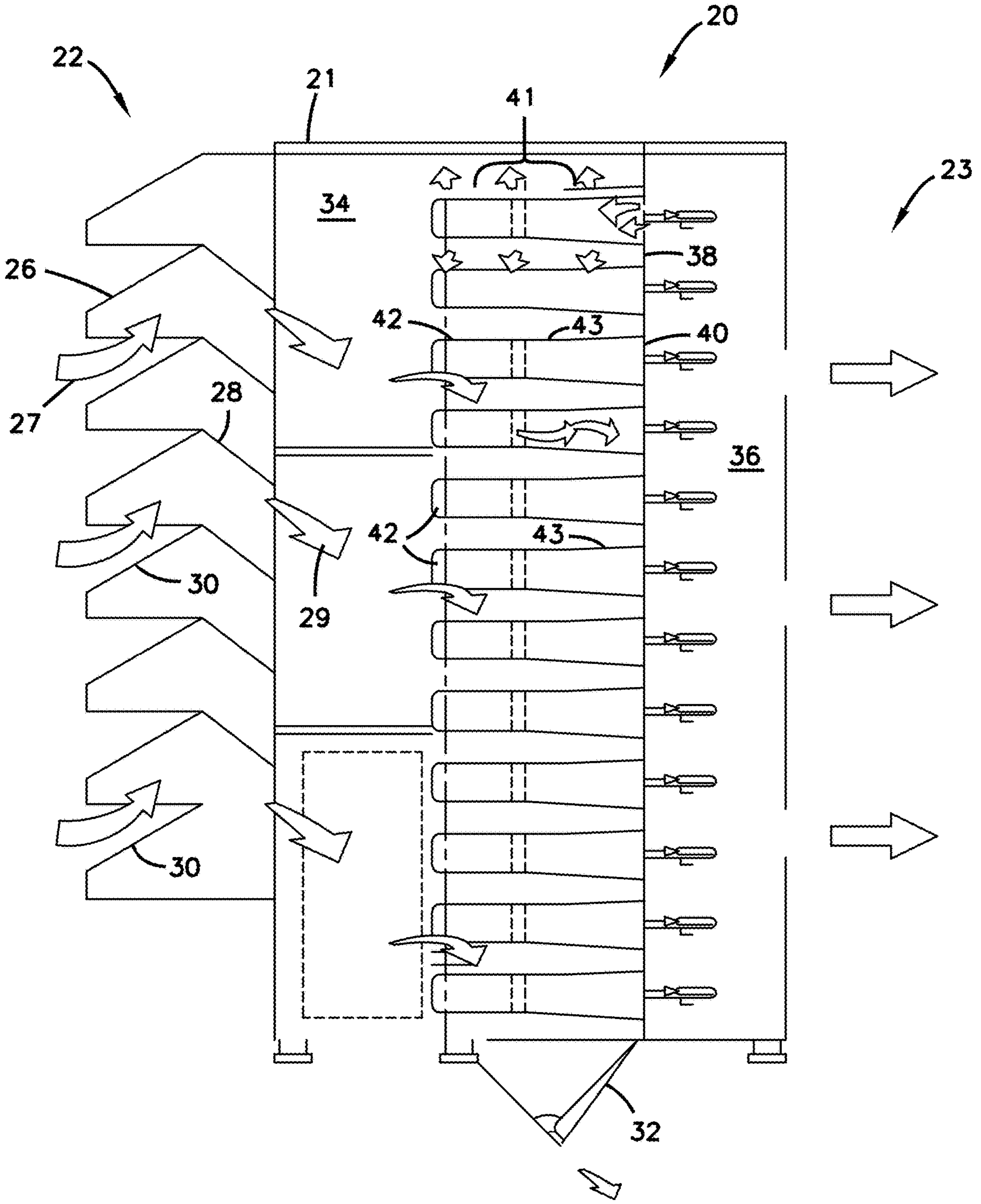
FIG. 1 is a schematic view of a gas turbine air inlet system using filter elements and assemblies constructed in accordance with principles of this disclosure.
Figure 23:
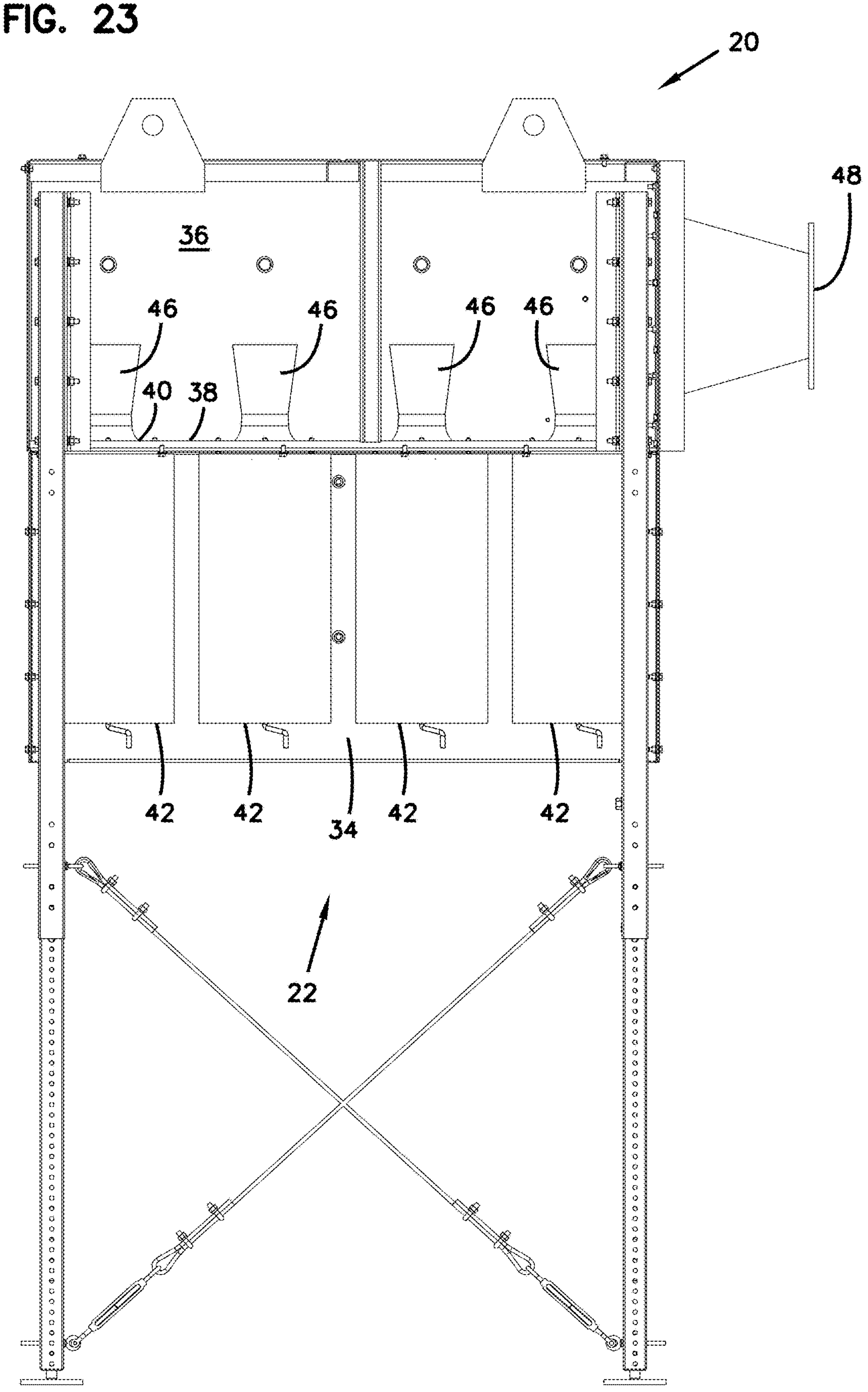
FIG. 23 is a schematic view of another gas turbine air inlet system using filter elements and assemblies constructed in accordance with principles of this disclosure.

FIGS. 1 and 23 depict two types of example gas turbine air intake systems (filter systems) at 20. The system of FIG. 1 includes filter elements that are horizontally oriented, while the system of FIG. 23 includes filter elements that are vertically oriented. Common parts will use the same reference number.

In FIG. 1, the system 20 includes a chamber 21 having an air inlet side 22 and an air outlet side 23. Air enters the chamber 21 through a plurality of vertically spaced inlet hoods 26 positioned along the air inlet side 22. The inlet hoods 26, although not required, function to protect internal filters of the system 20 from the effects of rain, snow and sun. Also, the inlet hoods 26 are configured such that air entering the inlet hoods 26 is first directed in an upward direction indicated by arrow 27, and then deflected by deflector plates 28 in a downward direction indicated by arrow 29. The initial upward movement of air causes some particulate material and moisture from the air stream to settle or accumulate on lower regions 30 of the inlet hoods 26. The subsequent downward movement of air forces dust within the chamber 21 downward toward a dust collection hopper 32 located at the bottom of the chamber 21. It should also be noted that air inlet side 22 may have vanes and other mechanical moisture separator inlets.

The chamber 21 of the system 20 is divided into upstream and downstream volumes 34 and 36 by a tube sheet 38 (also referred to also as partition 38), which is oriented vertically in the FIG. 1 embodiment and horizontally in the FIG. 23 embodiment. The upstream volume 34 generally represents the "dirty air section" of the air cleaner system 20, while the downstream volume 36 generally represents the "clean air section" of the system 20. The tube sheet 38 defines a plurality of apertures 40 for allowing air to flow from the upstream volume 34 to the downstream volume 36. Each aperture 40 is covered by a filter pair 41, comprising a cylindrical element 42 and a conical element 43. In other embodiments, the filter pair 41 can include two cylindrical elements; or alternatively, instead of a filter pair 41, there may be only a single element such as cylindrical element 42. In FIG. 1, the conical air filter element 43, covers the aperture 40. Both elements 42 and 43 are located in the upstream volume 34 of the chamber. The filter elements 42, 43 are arranged and configured such that air flowing from the upstream volume 34 to the downstream volume 36 passes through the filter elements 42, 43 prior to passing through the apertures 40.

Example filter elements 42 are described further below.

In general, during filtering, air is directed from the upstream volume 34 through the filter elements 42. After being filtered, the air flows through the tube sheet 38, via apertures 40, into the downstream clean air volume 36. The clean air is then drawn out from the downstream volume 36 and into a gas turbine intake, not shown. The elements 42, in the system 20 of FIG. 1, may be pulse cleaned to direct pulses of air backward through the interior of the element 42 to dislodge material on an upstream portion of the elements 42. The pulse jet air cleaners can be sequentially operated from the top to the bottom of the chamber 21 to eventually direct the dust particulate material blown from the filters into the lower hopper 32, for removal. In many air pulse jet cleaning applications, a useful air pressure is generally within the range of 60 to 1500 psi.

In the FIG. 23 embodiment, the tube sheet 38 is horizontal. In the system 20 of FIG. 23, each aperture 40 of the tube sheet 38 includes a venturi tube 46 for directing a pulse jet air of air mounted in the downstream volume 36. Periodically, a pulse jet air cleaner is operated to direct a pulse jet of air backwardly through the venturi tube 46 and into the interior of the associated air filter element 42 to dislodge particular material trapped in or on the air filter element 42. The air to be filtered flows upwardly at inlet side 22, then through the elements 42, and then through the venturis 46, into the downstream volume 36, and exits through the outlet 48.

B. Example Assemblies, FIGS. 2-4, 17, 18 and 24

Figure 2:
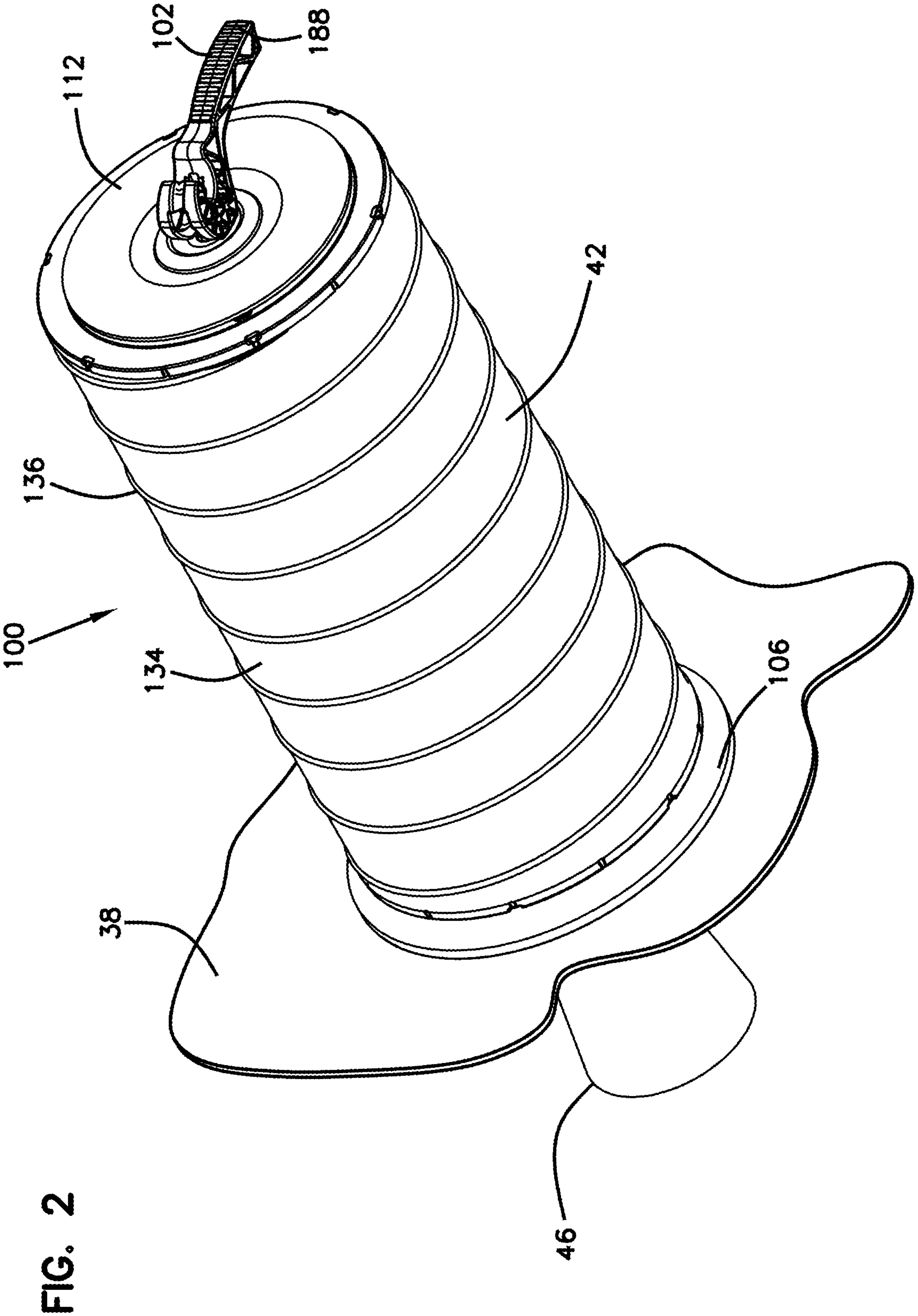
FIG. 2 is a perspective view of a filter assembly which can be utilized in gas turbine filter systems, such as a system of FIG. 23, constructed in accordance with principles of this disclosure.
Figure 24:
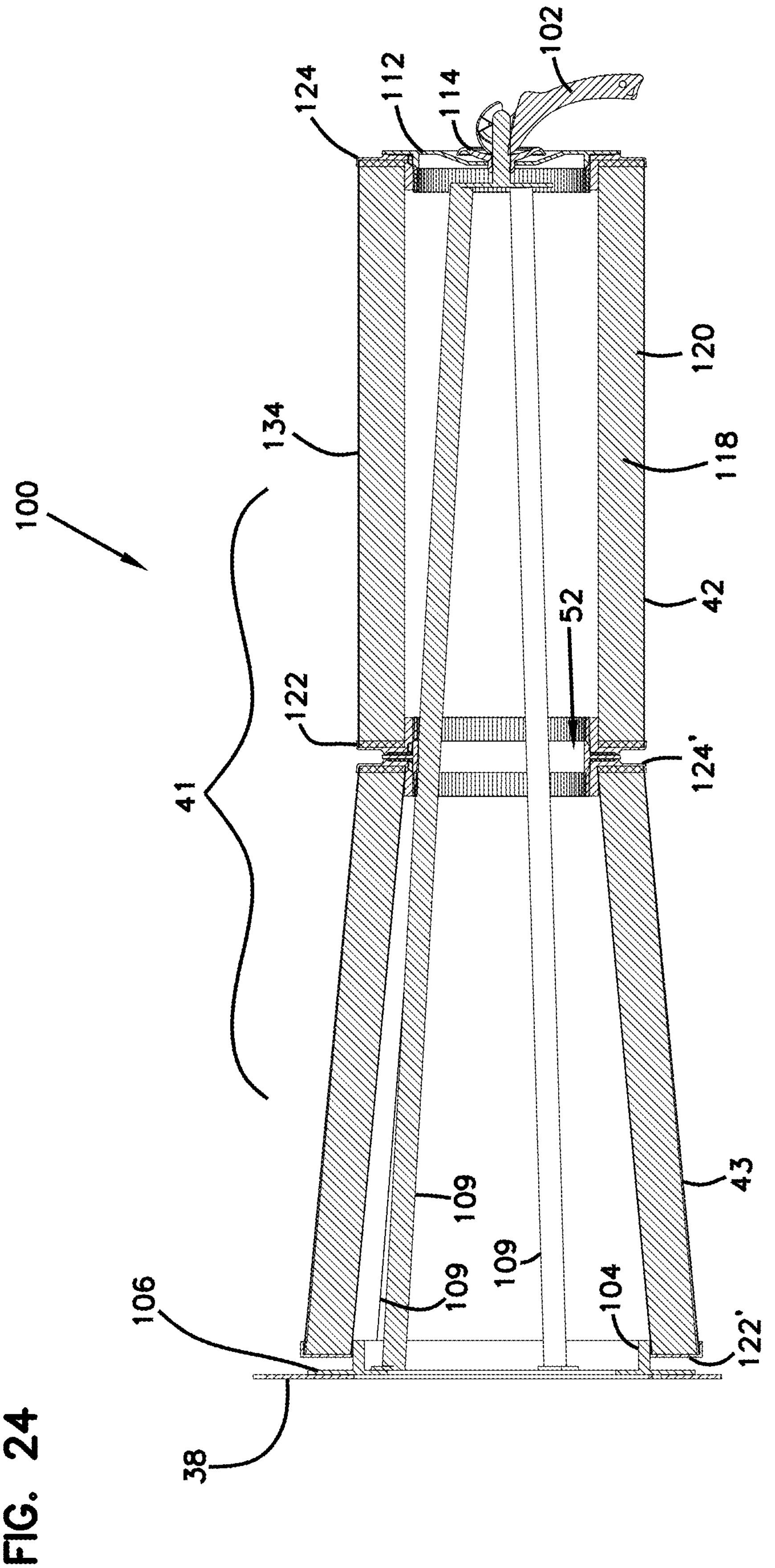
FIG. 24 is a cross-sectional view of another filter assembly that can be used in the system of FIG. 1.

FIG. 2 is a perspective view of a filter assembly 100, which can be used in the system 20 of FIG. 23. FIG. 24 shows a cross-sectional view of filter assembly 100, when filter pair 41 is used in the system of FIG. 1. The filter assembly 100 can have many different embodiments. One example embodiment is in FIGS. 3 and 4; while another example embodiment is in FIGS. 17 and 18; another example embodiment shown in FIG. 24; another example embodiment shown in FIGS. 54-56; and another example embodiment is in FIGS. 57-61. These filter assemblies 100 have common components, and the same reference numerals will be used to show the same components (except for the embodiment of FIGS. 57-61, which uses different reference numerals). A description of each component will not be repeated for each embodiment, but will be incorporated by reference based on the reference numeral.

In FIG. 2, the filter element 42 can be seen operably installed adjacent the tube sheet 38. As will be explained further below, the element 42 is sealed to seal plate 106, which is against the tube sheet 38. Also visible in FIG. 2 is a pivotable handle 102, which is part of a yoke assembly to removably secure the filter element 42 to the tube sheet 38. The handle 102 can be similar to the handle as described in U.S. Pat. No. 8,956,434 and U.S. 2017/0173512, each of which is incorporated herein by reference in its entirety.

Figure 3:
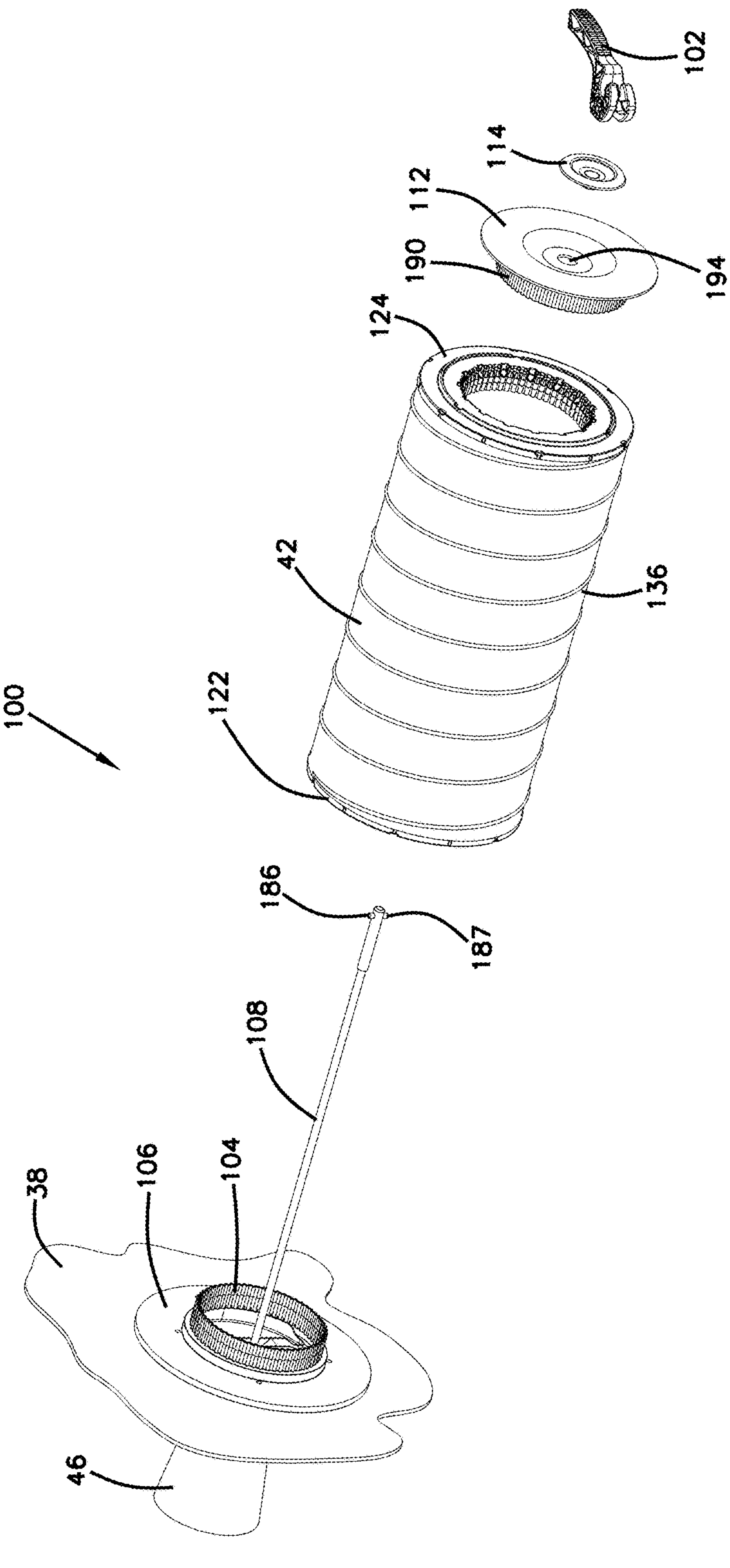
FIG. 3 is a perspective, exploded view of the assembly of FIG. 2.
Figure 17:
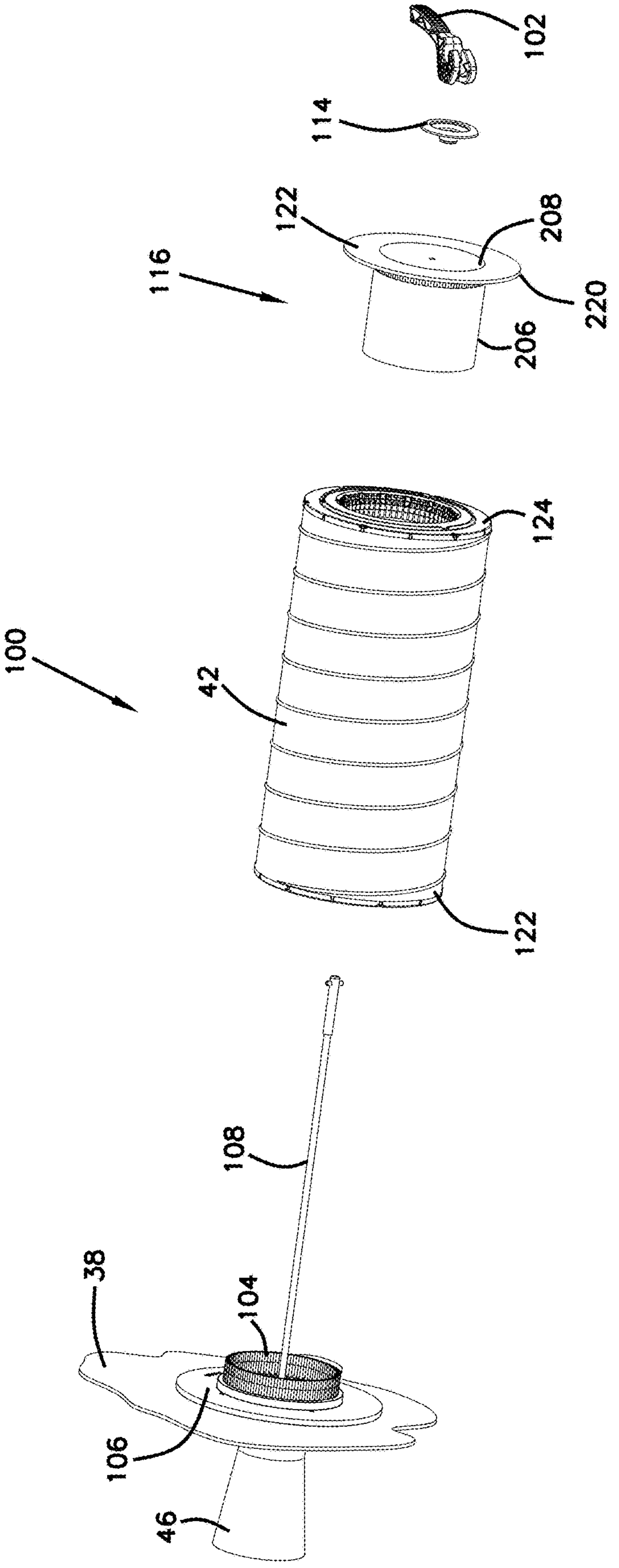
FIG. 17 is an exploded, perspective view of a second embodiment of a filter assembly that can be used in the system of FIG. 1 or FIG. 23.

In the embodiments of FIGS. 3, 17, and 24, the aperture 40 (FIG. 1) in the tube sheet 38 includes a tube sheet seal member 104. The tube sheet seal member 104 is along the aperture 40 and is attached to the tube sheet 38. It is releasably sealed to the filter element 42, as described further below. Many examples are possible, and in the example embodiments of FIGS. 3, 17, and 24, the tube sheet seal member 104 is part of seal plate 106. The seal plate 106 is described further below and is used to attach the tube sheet seal member 104 to the tube sheet 38.

Also visible in FIGS. 3 and 17 is a rod 108 which can be held by a fixture 110, which is part of the yoke assembly for releasably holding the filter element 42 to the tube sheet 38. FIG. 24 includes a tri-pod of legs 109, which is part of the yoke assembly for releasably holding the filter pair 41 to the tube sheet 38.

One difference between the assemblies 100 of FIGS. 3, 24 and FIG. 17 is the assembly at the end of the filter element 42 opposite of the end that connects to the tube sheet 38. In the FIGS. 3 and 24 assemblies, there is an assembly cover 112. The assembly cover 112, which is described further below, covers the end of the filter element 42 and receives the rod 108 (FIG. 3) or tri-pod legs 109 (FIG. 24) to allow the yoke assembly including the handle 102 to releasably secure the filter element 42 (FIG. 3) or filter pair 41 (FIG. 24) to the tube sheet 38. As can also be seen in FIG. 3, there is a gasket washer 114, which engages the handle 102 and helps to releasably lock the filter element 42 to the tube sheet 38.

In the FIG. 17 embodiment, instead of an assembly cover 112, there is a second or an additional filter cartridge 116. The additional filter cartridge 116 covers the open end of the filter element 42, which is opposite of the tube sheet 38, and provides for additional filtration. This is described further below. The additional filter cartridge 116 allows for the rod 108 to pass therethrough and engage the handle 102 and gasket washer 114.

C. Example Filter Element

An example embodiment of filter element 42 is now described further. The filter element 42 includes a tubular section of filter media 118. The tubular section of media 118, in this embodiment, is cylindrical and has a round cross-section. In other embodiments, the tubular shape could be non-cylindrical and have an oval or elliptical cross-section.

In this embodiment, the media 118 is pleated media 120. The pleated media 120 can be made from cellulous. Many alternatives are possible.

The filter element 42 further includes a first end cap 122 and an opposite second end cap 124. The filter media 118 is secured to and extends between the first end cap 122 and second end cap 124.

The first end cap 122 is an open end cap in that it has an opening 126 in communication with an interior volume 128 defined by the tubular section of media 118.

While in some embodiments, the second end cap 124 could be a closed end cap, in the embodiment depicted, the second end cap 124 is an open end cap defining an opening 130. The opening 130 is in communication with the interior volume 128. Further details about the first end cap 122 and second end cap 124 are discussed below.

An inner liner 132 extends between the first end cap 122 and second end cap 124. As will be described further below, the inner liner 132 helps prevent the pleats of the pleated media 120 from collapsing and acts as a seal support. In alternate embodiments, no seal support is used, and in some of those alternate embodiments, no inner liner is used so that the element is inner-liner free.

In this embodiment, there is also an optional outer liner 134. The outer liner 134 is radially outside of the outer pleat tips of the pleated media 120 and extends between the first end cap 122 and second end cap 124. The outer liner 134 can also help support the pleats. In alternative embodiments, there is no outer liner at all.

In FIGS. 2-5, it can be seen how, in this embodiment, there is an optional winding bead 136 around the exterior of the pleated media 120. The winding bead 136 can include, for example, tape or a hot melt adhesive. The winding bead 136 will help to support the pleats and prevent pleat collapse.

Figure 10:
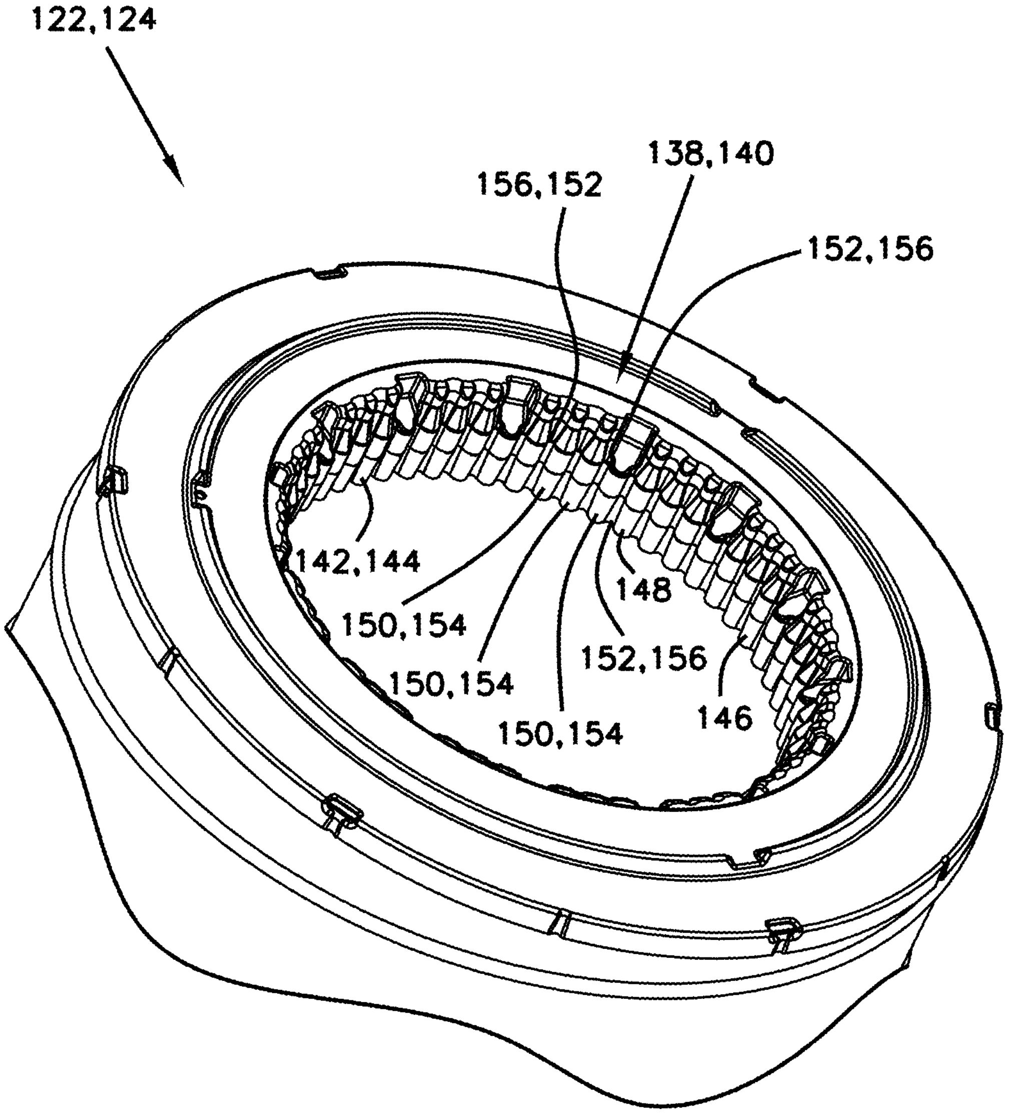
FIG. 10 is an enlarged, perspective view of one of the end caps of the filter element used in the assembly of FIG. 6.
Figure 11:
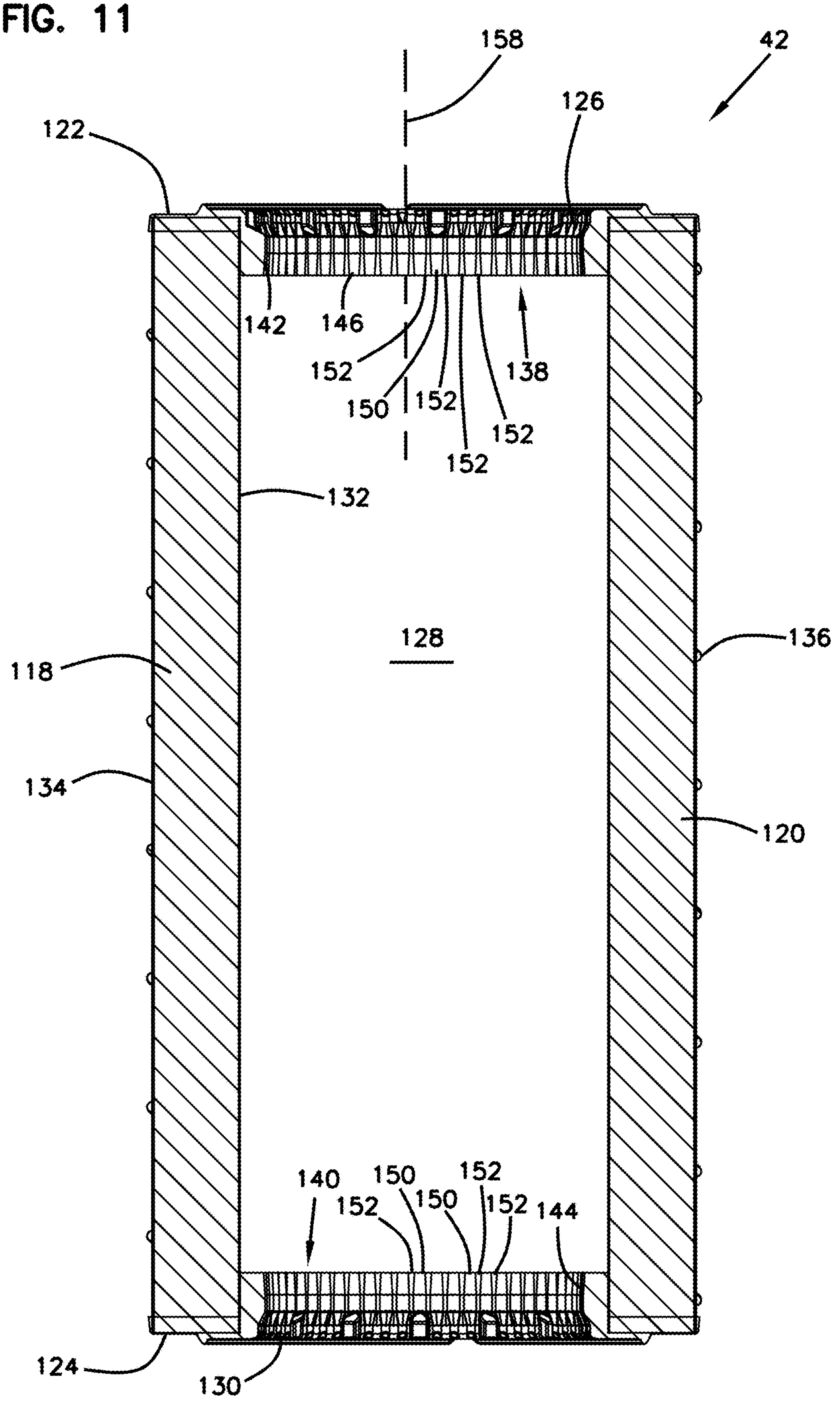
FIG. 11 is a cross-sectional view of the filter element used in the assembly of FIG. 6.

In reference now to FIGS. 10 and 11, the first and second end caps 122, 124 are further discussed. In the FIG. 24 embodiment, the conical element is illustrated as having first end cap 122' and second end cap 124'. Because these end caps 122', 124' are used with the conically shaped element 43, they vary in proportion to the end caps 122, 124. It should be understood, however, that the description of the end caps 122, 124 generally applies to the end caps 122', 124' with the exception that the end caps 122', 124' are not identical to each other, and will vary in proportions. The end caps 122', 124' will form seals in the same general way as the end caps 122, 124, as described next.

Each of the first end cap 122 and second end cap 124 has a seal arrangement 138, 140 along an inner radial surface 142, 144 of each of the end caps 122, 124. While many variations are possible, in the preferred embodiment shown, the seal arrangements 138, 140 are identical in that they have a same shape as the other. In this way, the filter element 42 can be installed in the system 20 in any orientation. That is, in this embodiment, it does not matter whether the first end cap 122 or the second end cap 124 is in connection with the tube sheet 38. (As noted above, this is not the case for the conical element 43, in which the end cap 122' is the only end that connects to the tube sheet 38.) Both the first end cap 122 and second end cap 124 are attachable to the tube sheet 38. Likewise, at the end opposite of the tube sheet 38, either one of the first end cap 122 or second end cap 124 is attachable to the other components including, for example, the assembly cover 112 (FIGS. 3 and 24) or the additional filter cartridge 116 (FIG. 17). In FIG. 24, the element 42 has end caps 122, 124 which are both attachable to assembly cover 112 or to the conical element 43.

Because in this embodiment the seal arrangements 138, 140 are identical, the same reference numerals and description will be used for each. It should be understood that in other arrangements, only one of the end caps would have the seal arrangement, while the opposite end cap could be a closed end cap or have a different configuration.

The seal arrangements 138, 140 include seal support, in the form of inner liner 132, and a seal member 146 supported by the seal support 132. The seal member 146 has an inwardly radially directed seal surface 148 and a thickness between the seal support 132 and the seal member surface 148 that varies along the seal member surface 148. The thickness of the seal member 146 can also be measured from the inner pleat tips of the pleated media 120. Example useable seal arrangements are described in US 2017/0246571, incorporated herein by reference in its entirety.

As can be appreciated by reviewing FIG. 10, the thickness between the seal support 132 (or the inner pleat tips of the pleated media 120) and the seal member 146 varies in a radial direction along the seal member surface 148. The thickness between the seal support 132 and the seal member surface 148 is constant in an axial direction. In other words, the length of the seal member surface 148 along the seal support 132 is relatively constant in the axial direction, i.e., the direction generally parallel to the inner liner 132.

While many variations are possible, the seal member thickness varies by a minimum thickness and a maximum thickness. In general, the maximum thickness is at least 1.1 times the minimum thickness. Many variations are possible. In embodiments in which the seal support is omitted, the thickness of the seal member 146 is measured from the inner pleat tips of the pleated media 120.

The seal arrangements 138, 140 can be designed in accordance with the description of the seal arrangements provided in Patent Publication No. U.S. 2017/0246571, incorporated herein by reference.

In general, the radially directed seal surface 148 includes a plurality of outwardly projecting and axially extending portions 150 and a plurality of inwardly projecting and axially extending portions 152. While many embodiments are possible, the plurality of outwardly projecting and axially extending portions 150 and the plurality of inwardly projecting and axially extending portions 152 comprise curved portions.

While many embodiments are possible, in the one shown, the plurality of outwardly projecting and axially extending portions 150 alternate with the plurality of inwardly projecting and axially extending portions 152. As such, the seal member 146 forms a plurality of compressible alternating radial projections 154 and alternating radial recesses 156.

There can be only a few or many portions 150, 152. For example, the radially directed seal surface 148 may comprise at least two of the radially outwardly projecting and axially extending portions 150 alternating with at least two of the radially inwardly projecting and axially extending portions 152 per inch along the seal support 132 extending around a central axis 158 of the filter element 42. In many instances, radially directed seal surface 148 comprises greater than 20 of the radially outwardly projecting and axially extending portions 150 alternating with greater than 20 of the radially inwardly projecting and axially extending portions 152.

In an alternative embodiment, the second end cap 124 is closed with the exception of a small opening in the center, which receives a non-removable or a removable seal. The first end cap 122 includes seal arrangement 138. The small opening in the center can have a diameter less than 20% of the outer diameter of the second end cap. In some embodiments, the small opening in the center can receive a sealing washer around a shaft, used for retention, in which the seal is formed between the shaft and the hole. Alternatively, the seal could be molded into the hole.

D. Tube Sheet Components and Yoke Assembly

Figure 7:
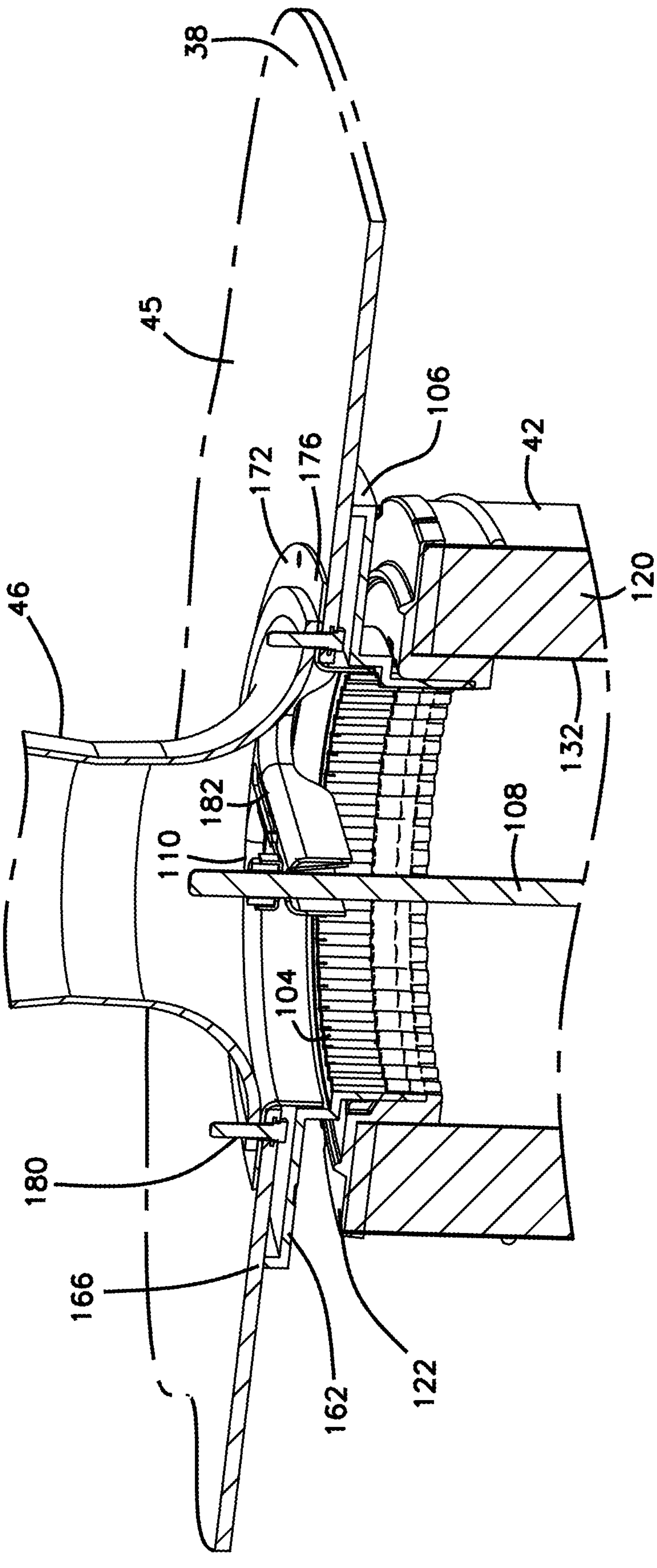
FIG. 7 is an enlarged perspective view of a portion of the filter assembly of FIG. 6 and rotated 90° from FIG. 6.
Figure 8:
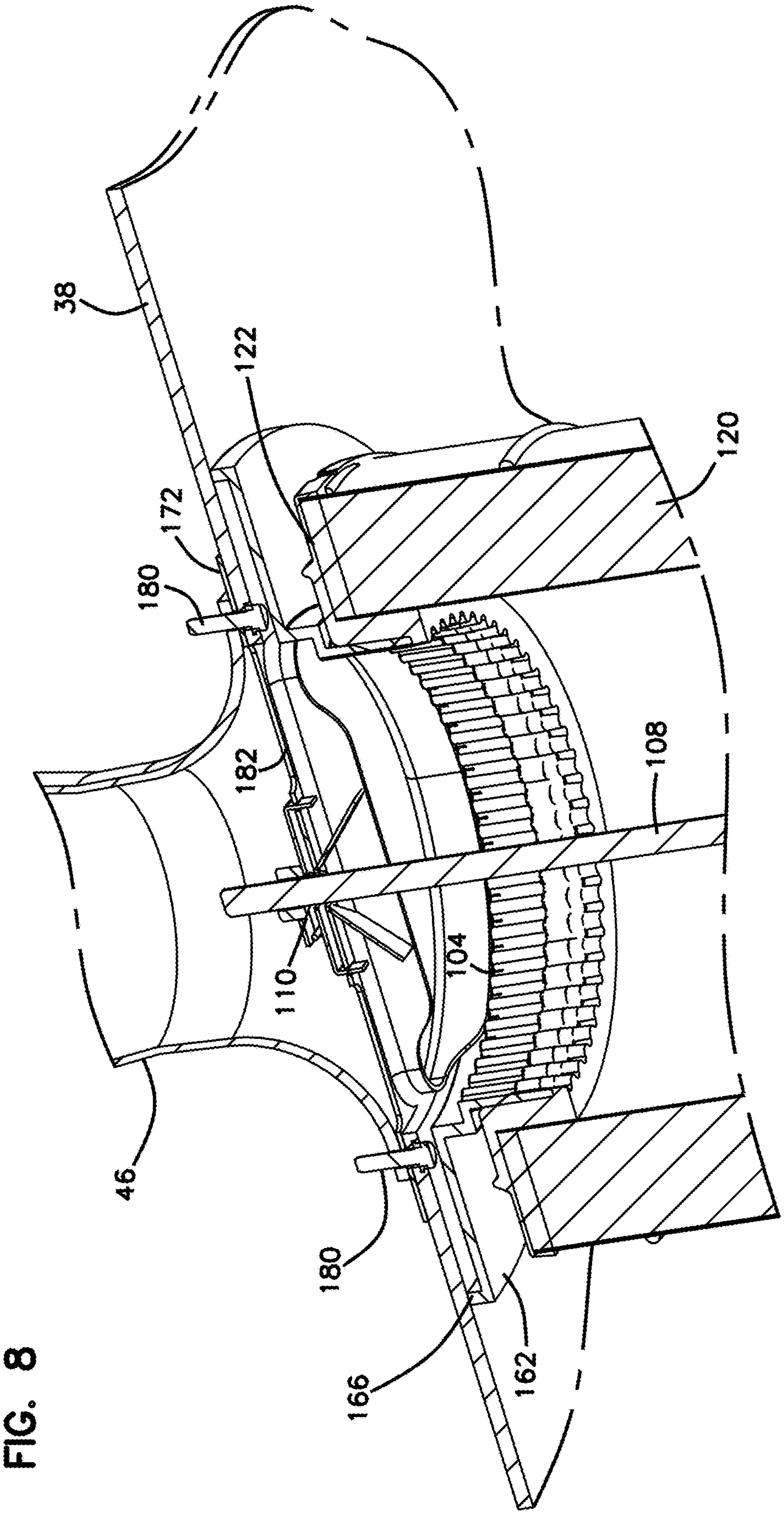
FIG. 8 is another perspective view of the portion of the assembly depicted in FIG. 7.
Figure 12:
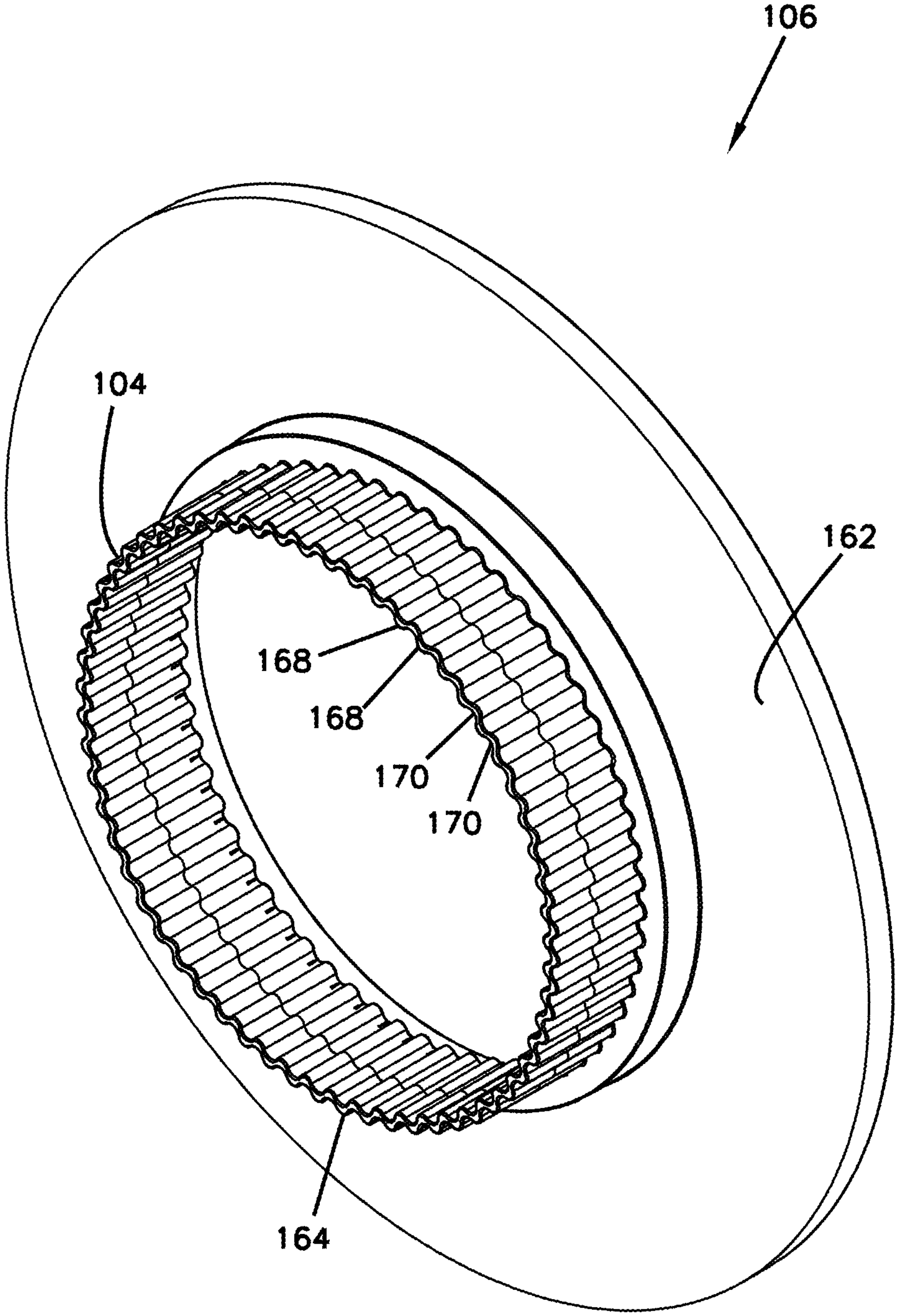
FIG. 12 is a perspective view of the seal plate shown in the assembly of FIGS. 7 and 8.
Figure 13:
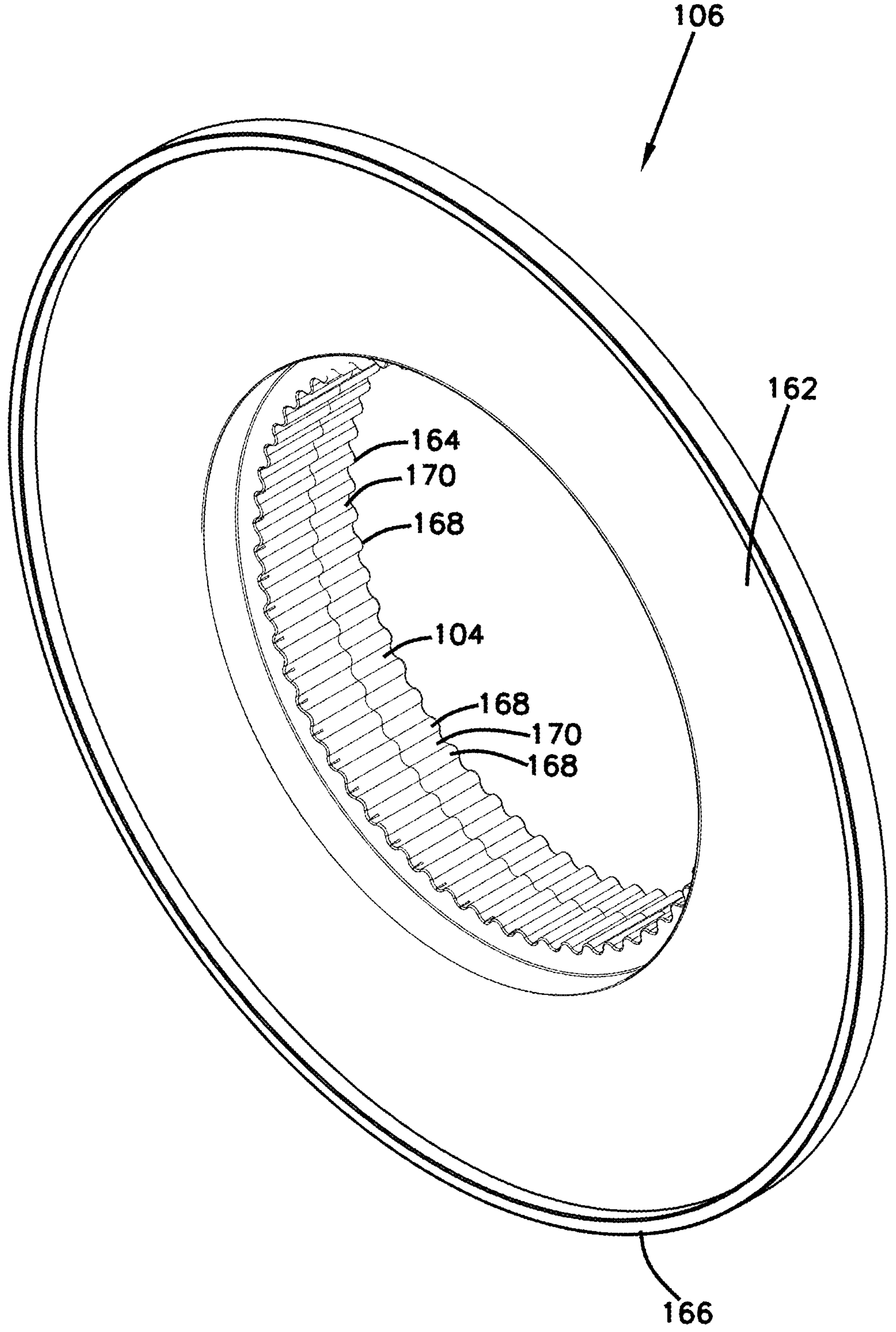
FIG. 13 is another perspective view of the seal plate of FIG. 12.
Figure 14:
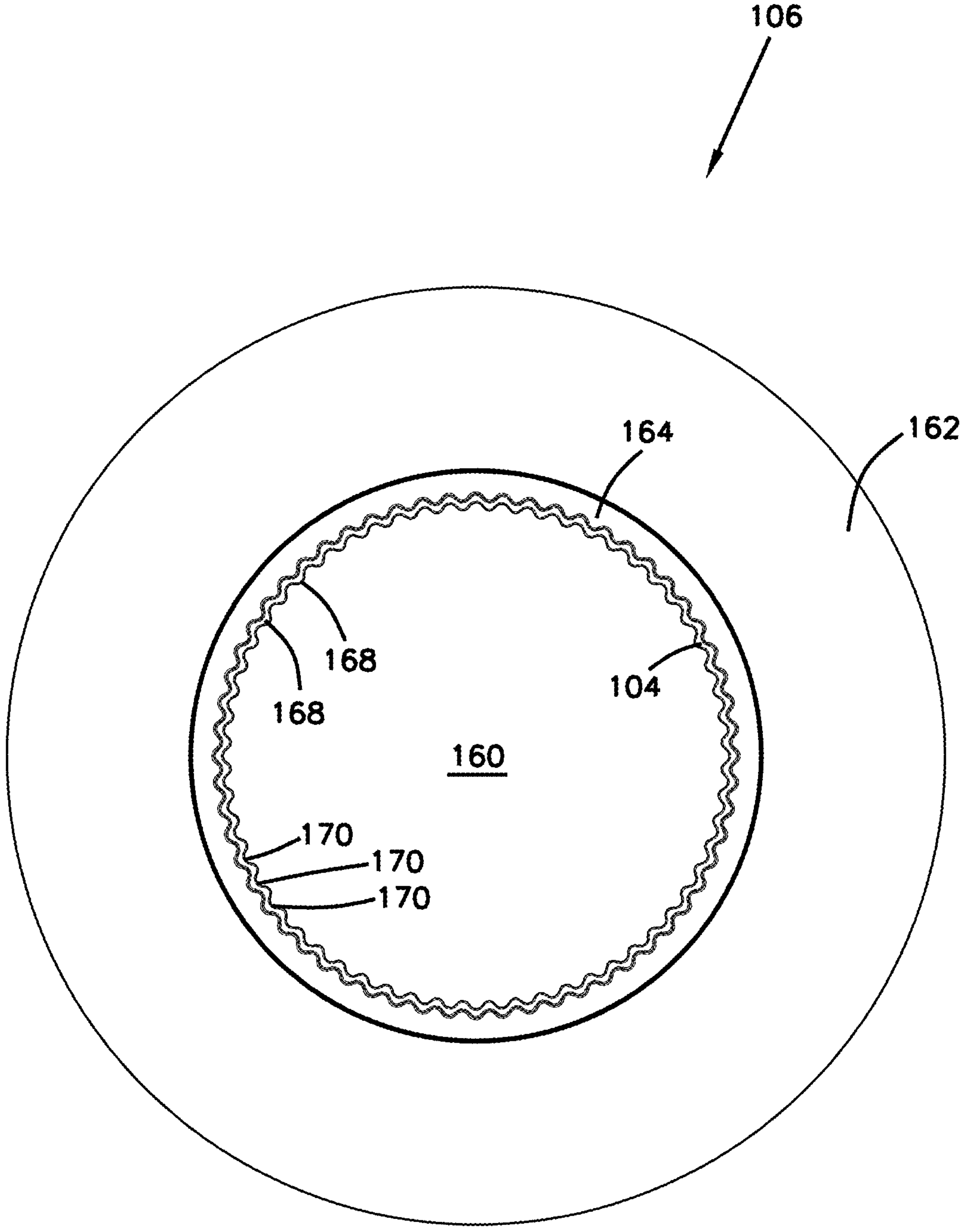
FIG. 14 is a front view of the seal plate of FIG. 12.

Attention is directed to FIGS. 7 and 8, which show an example embodiment of how the filter element 42 is releasably attached to the tube sheet 38. As previously mentioned, the assembly 100 includes seal plate 106. Further views of the seal plate 106 are shown in FIGS. 12-14.

The seal plate 106 includes the tube sheet seal member 104 the tube sheet seal member 104 defines an inner opening 160 therethrough. The opening 160 is in communication with the aperture 40 in the tube sheet 38, when the seal plate 106 is operably mounted to the tube sheet 38.

In this embodiment, the seal plate 106 includes a collar 162 and a neck 164. The collar 162 includes an outer rim 166 which is against and adjacent the tube sheet 38. The collar 162, in this embodiment, extends generally along the tube sheet 38 and can be generally parallel to the tube sheet 38, although variations are possible.

The neck 164 projects axially from the collar 162 and circumscribes the opening 160. The tube sheet seal member 104 is generally along and can be part of the neck 164. The neck 164 extends in an axial direction opposite of the direction that the rim 166 extends from the collar 162.

The tube sheet seal member 104 is shaped to releasably seal with the seal arrangements 138, 140. In this embodiment, the tube sheet seal member 104 has a plurality of alternating outward radial portions 168 and alternating inward radial portions 170. As can be seen in FIGS. 12-14, there are greater than 20 outward radial portions 168 and inward radial portions 170. The outward radial portions 168 and inward radial portions 170, in this embodiment, extend substantially a complete length of the neck 164.

When the filter element 42 is removably attached to the tube sheet 38, the seal member 146 forms a seal with the tube sheet seal member 104 in that the tube sheet seal member 104 inward radial portions 170 receive the first filter element seal member radial projections 154; and the seal member 146 having the radial recesses 156 receive the tube sheet seal member 104 outward radial portions 168. This connection helps to ensure a good seal is formed, and ensure that the correct filter element 42 is being installed within the filter assembly 100.

Figure 9:
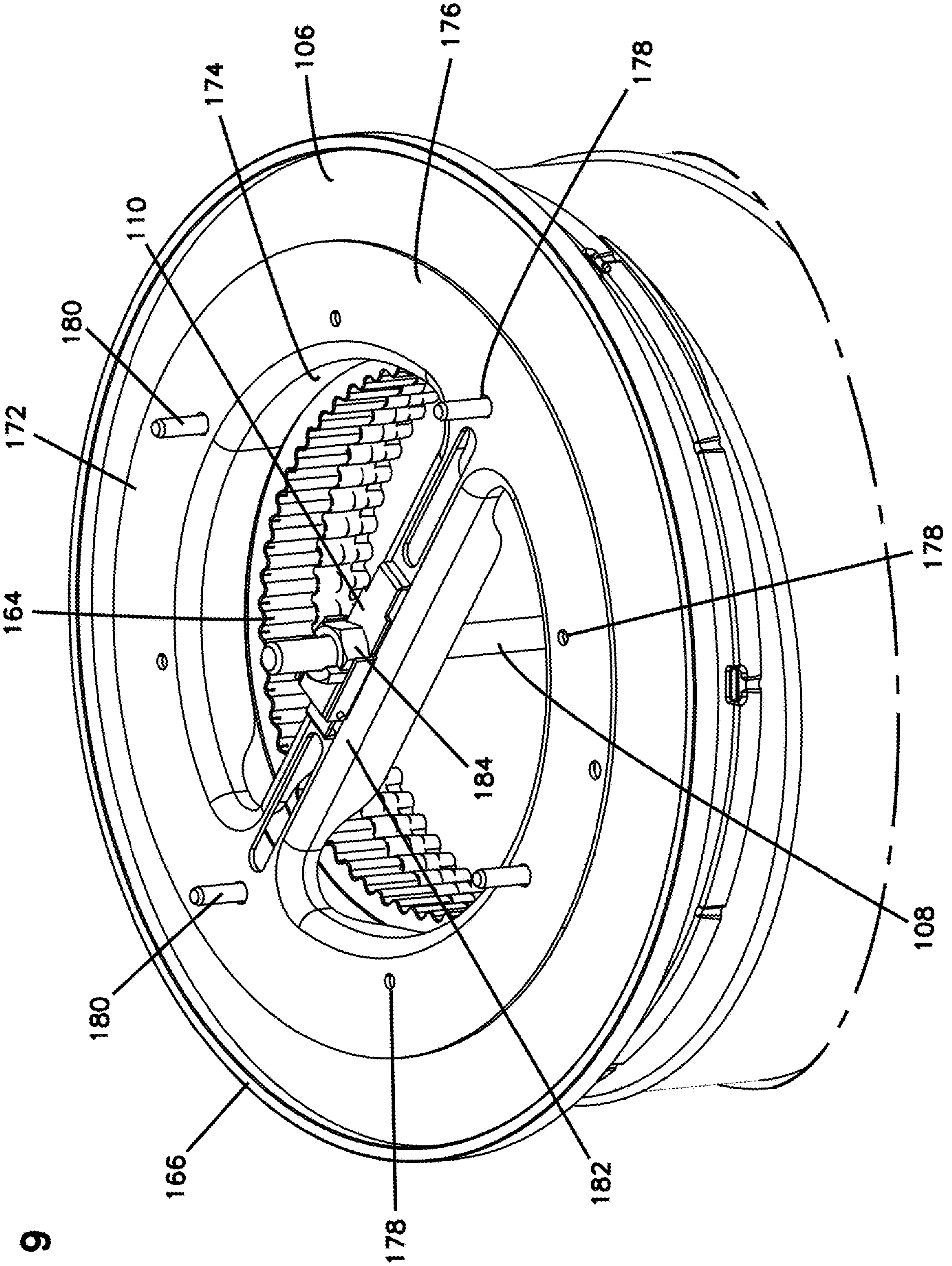
FIG. 9 is a perspective view of another portion of the assembly of FIGS. 7 and 8.

In reference again to FIGS. 7 and 8, the filter assembly 100 includes a yoke plate 172. Additional views of the yoke plate 172 can be seen in FIG. 9. The yoke plate 172 is secured to the tube sheet on the clean side of the tube sheet 38, on an opposite side from where the filter element 42 is secured. FIG. 9 omits the presence of the tube sheet from the drawing, to enhance clarity.

The yoke plate 172 defines an opening 174, which is generally coaxially aligned with the aperture 40 in the tube sheet 38 and opening 160 in the seal plate 106.

The yoke plate 172 includes a surrounding band 176, surrounding the opening 174. The band 176 generally lies flat and against the tube sheet 138, although variations are possible.

The band 176 can include a plurality of holes 178. The holes 178 accommodate fasteners, such as bolts 180. The bolts 180 extend through a portion of the venturi tube 46 and secure the venturi tube 46 to the tube sheet 38.

The yoke plate 172 includes a chord extending across the opening 174 between edges of the band 176. In this example, the chord 182 extends across the geometric center of the opening 174, although there could be variations in other embodiments. The chord 182 includes the fixture 110 for removably holding the rod 108. As can be seen in FIG. 9, there is a gasket washer 184, which is part of the fixture 110, for holding the rod 108.

The rod 108 is secured to the tube sheet 38 with the gasket washer 108 and the yoke plate 172. The rod 108 extends through the interior volume 128 of the filter element 42 and through either the assembly cover 112 or the additional filter cartridge 116, depending upon the embodiment.

Figure 4:
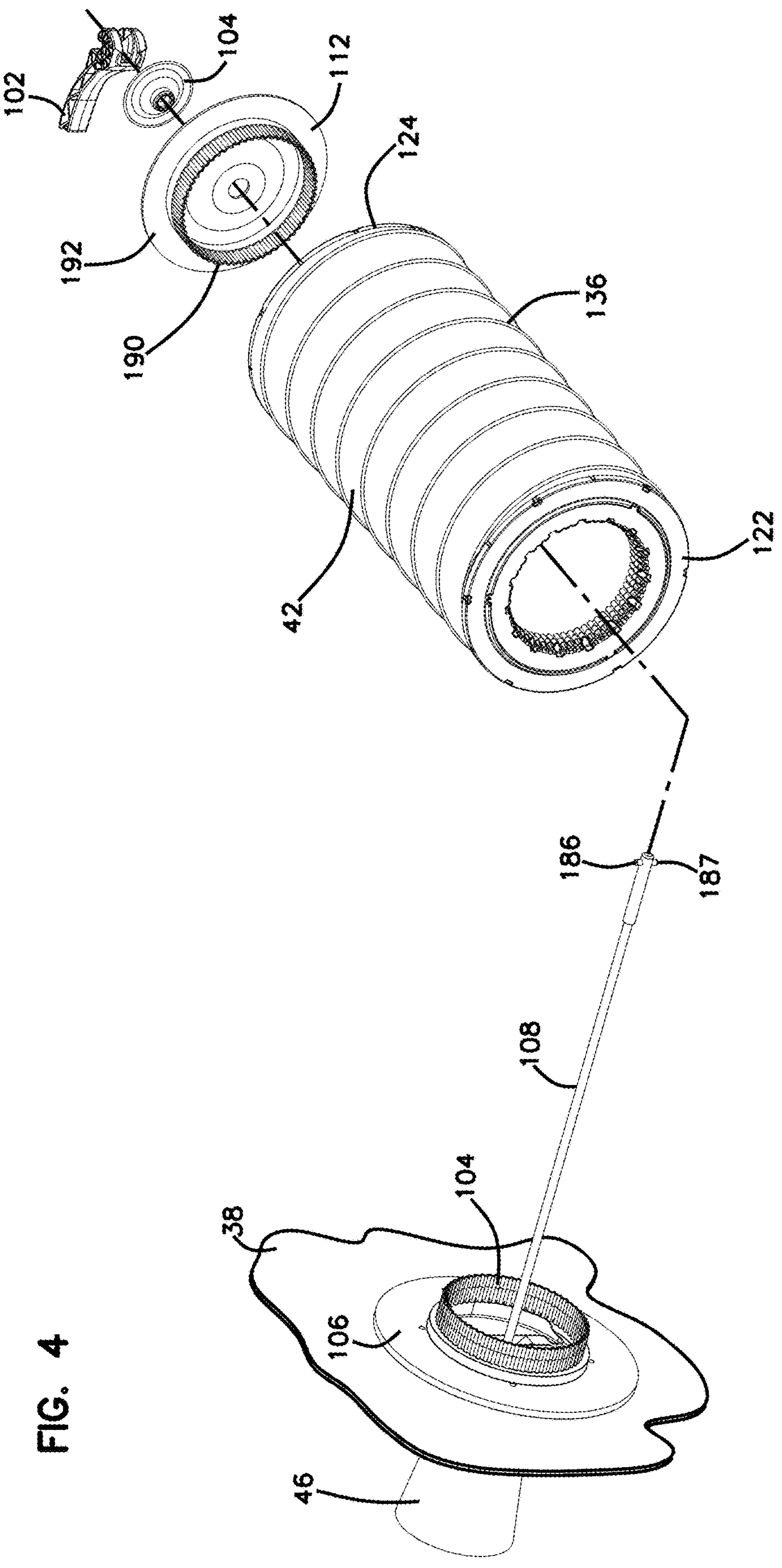
FIG. 4 is another perspective, exploded view of the assembly of FIG. 2.
Figure 5:
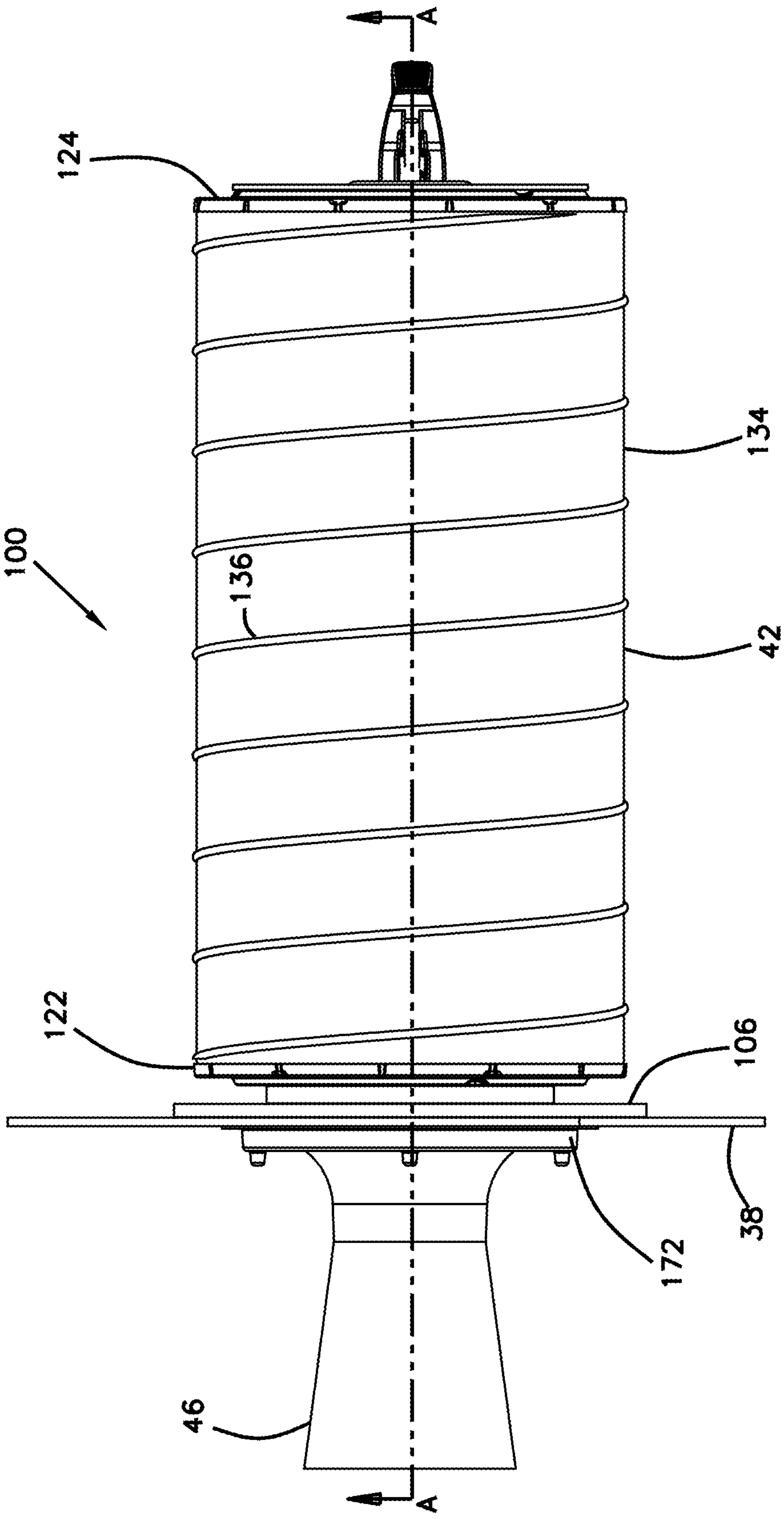
FIG. 5 is a side view of the filter assembly of FIG. 2.

The end of the rod 108 includes radial projections 186, 187 (FIGS. 3 and 4). The radially projections 186, 187 engage with the handle 102, such that when the handle 102 is pivoted in the locked position (FIG. 2), with the grasping portion 188 (FIG. 2) pointing generally radially outwardly, the filter element 42 is sealed to the tube sheet seal member 104 through a radial seal. When the handle 102 is in a released position with the grasping portion 188 pointing generally in an axial direction, the projections 186, 187 on the rod 108 are not tightly engaged with the handle 102, and the filter element 42 can be removed from the tube sheet seal member 104 and the tube sheet 38 by removing the handle 102 and removing the gasket washer 114.

In the FIG. 24, embodiment, the cylindrical element 42 and conical element 43 are sealed together along connection 52 piece. The connection piece 52 can be shaped to be received by and form seals with end cap 124' and end cap 122; alternatively, the connection piece 52 can form an axial insert between elements 42 and 43 to form an axial seal therebetween.

E. Example Assembly Cover

As mentioned previously, in the embodiment of FIGS. 3 and 4, the filter assembly 100 includes assembly cover 112. Further views of the assembly cover 112 are shown in FIGS. 15 and 16.

Figure 15:
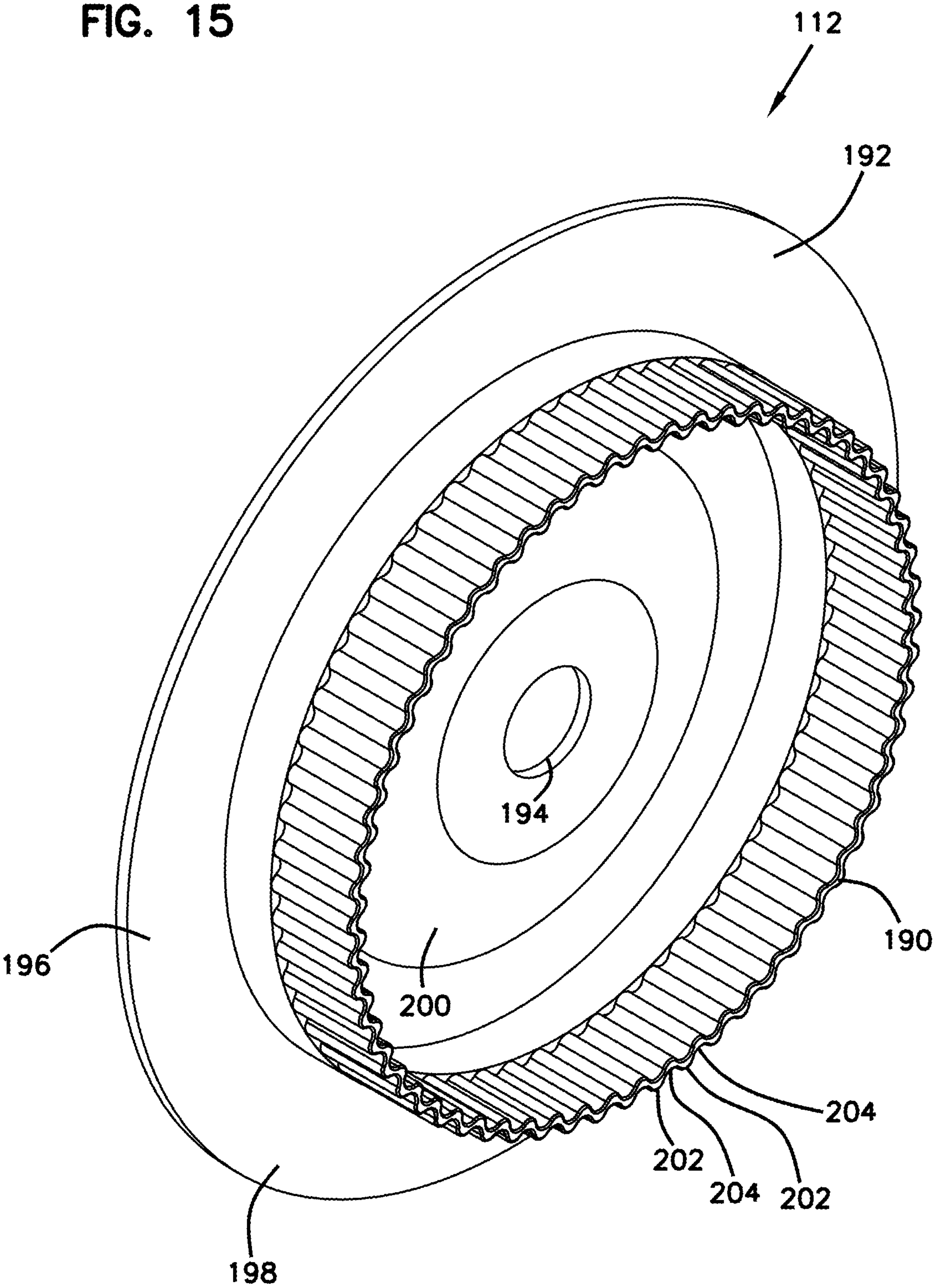
FIG. 15 is a perspective view of an assembly cover used in the filter assembly of FIGS. 3 and 4.
Figure 16:
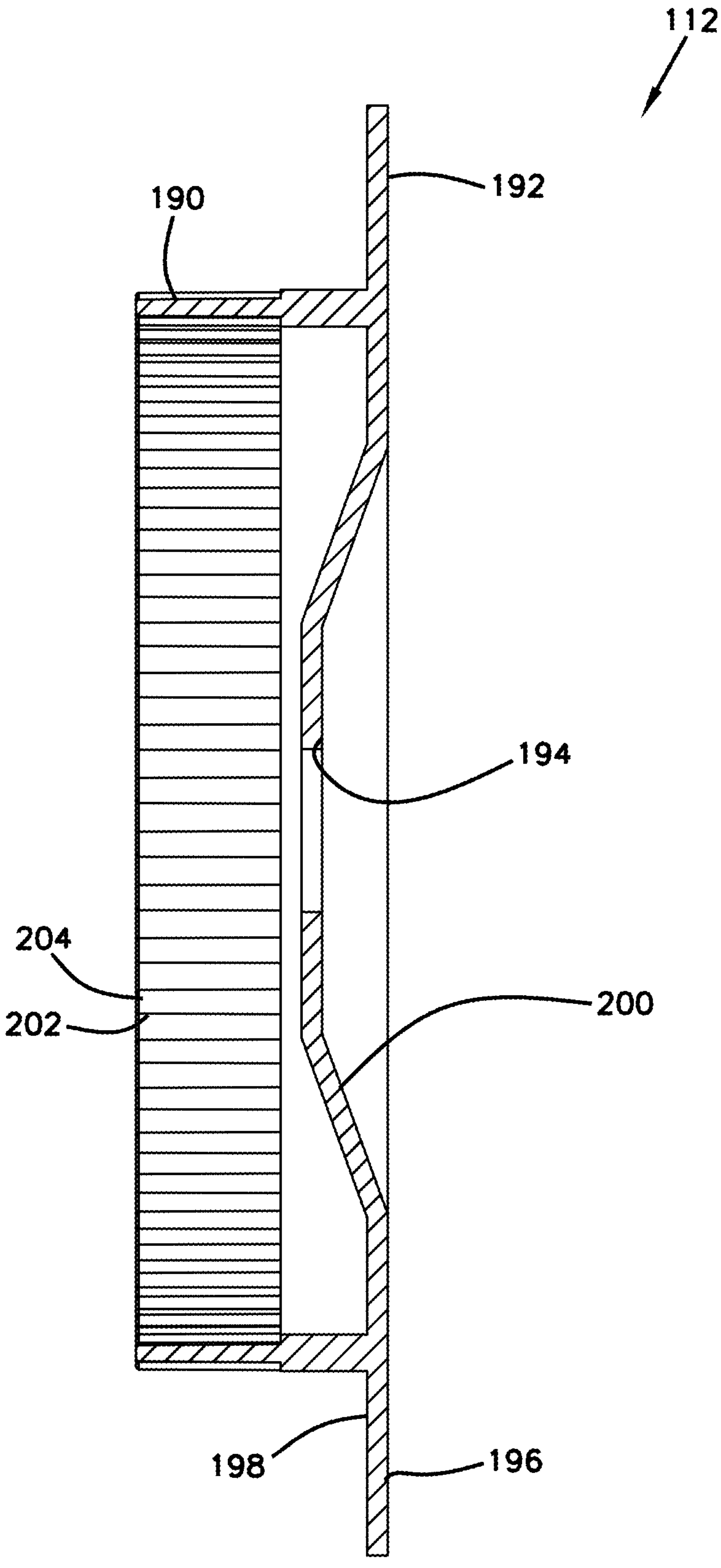
FIG. 16 is a cross-sectional view of the assembly cover of FIG. 15.

Referring now to FIGS. 15 and 16, the assembly cover 112 includes a surrounding wall 190. The wall 190 extends from an end plate 192. In general, the wall 190 is perpendicular to the end plate 192. The wall 190 is sized to extend into the opening 130 of the second end cap 124 (or alternatively, into the opening 126 of the first end cap 122, when the filter element 42 is axially reversed).

The end plate 192 is sized to extend over and cover the axial end of the second end cap 124 (or the first end cap 122, when the element 42 is reversed).

The end plate 192 includes an aperture 194 in the center therethrough. The aperture 194 allows for passage of the rod 108.

In FIG. 16, it can be seen how the end plate 192 includes an outer most brim 196, which is generally planar and flat. The surrounding wall 190 extends from an inside surface 198 of the brim 196.

Extending radially inwardly along the brim 196 and radially inwardly of where the wall 190 extends, the end plate 192 includes a concave section 200. The concave section 200 extends inwardly to be within the surrounding wall 190. In the center of the concave section 200 is the aperture 194. Many embodiments are possible.

The assembly cover 112 includes a plurality alternating outward radial portions 202 and alternating inward radial portions 204. In the embodiment shown, the outward radial portions 202 and inward radial portions 204 are part of the surrounding wall 190. As such, the assembly cover 112 can be used to form a seal with the second end cap 124 (alternatively, with the first end cap 122). A releasable seal can be formed between the element 42 and assembly cover 112 by having the inward radial portions 204 of the assembly cover 112 receive the seal member radial projections 154; and the seal member radial recesses 156 receive the outward radial portions 202 of the assembly cover 112.

F. Example Additional Filter Cartridge

Figure 19:
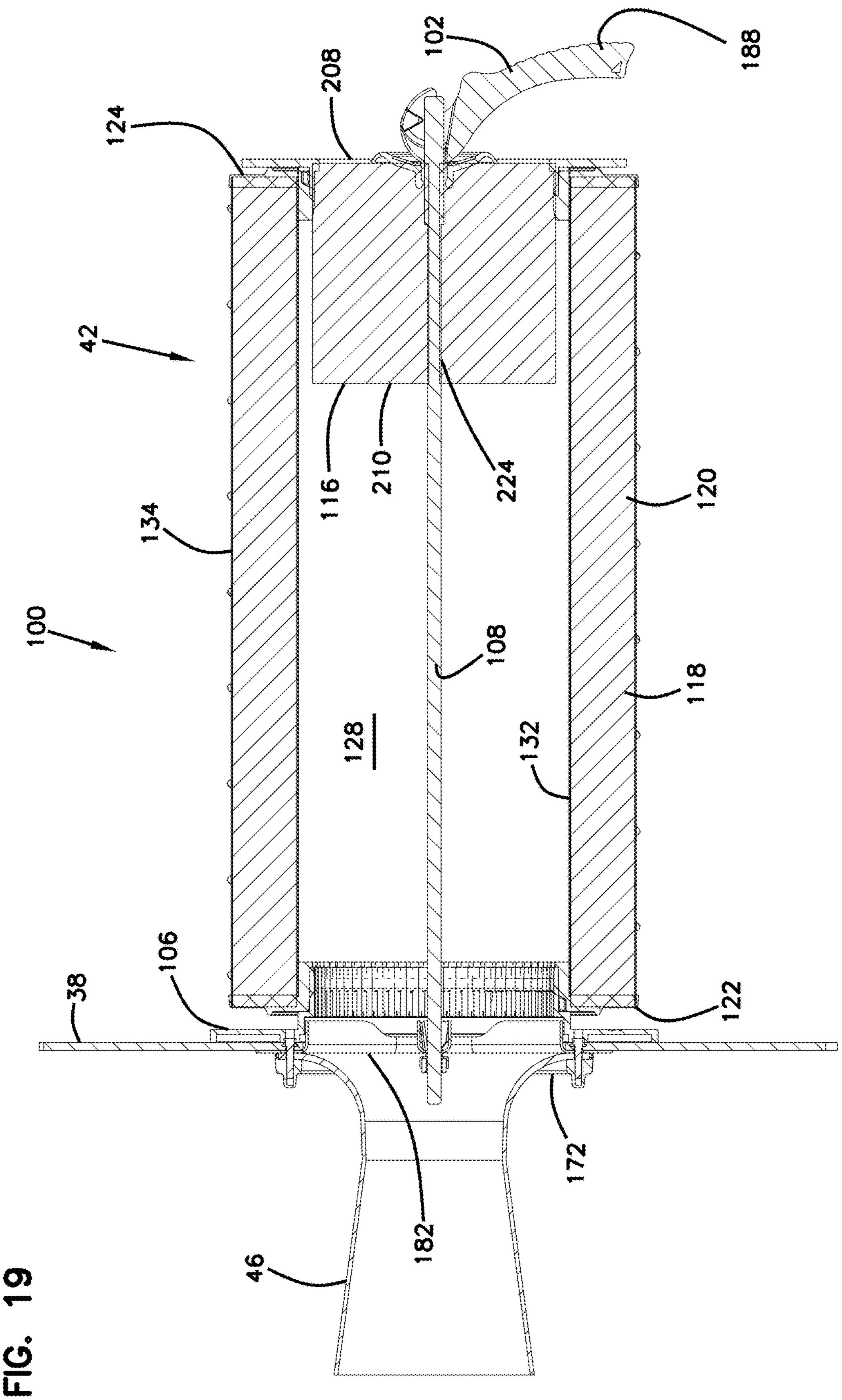
FIG. 19 is a cross-sectional view of the filter assembly of FIGS. 17 and 18, the cross section being taken along the line A-A of FIG. 5, in which FIG. 5 has the same outward assembled appearance in both the assembly of FIGS. 6 and 19.
Figure 20:
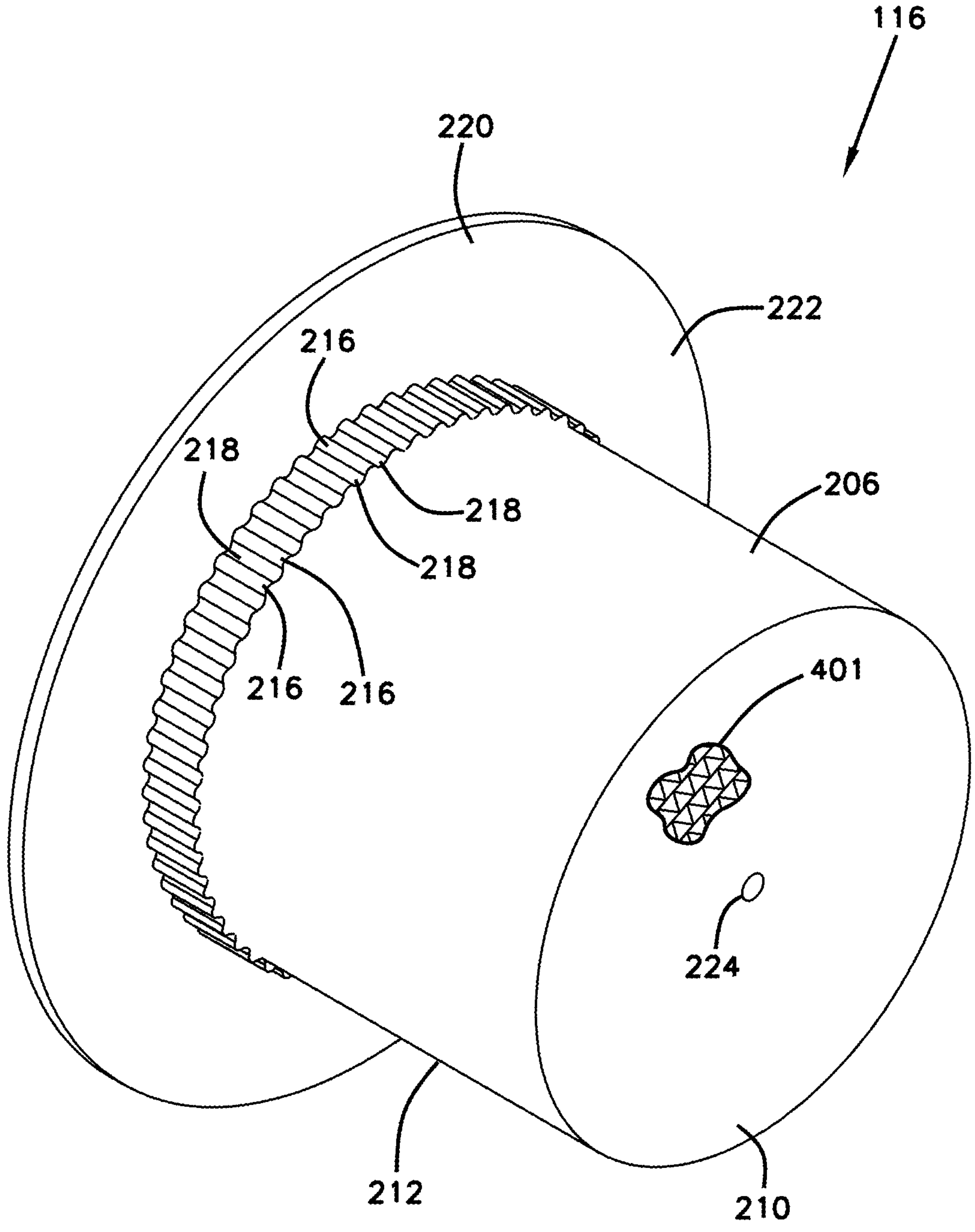
FIG. 20 is a perspective view of an additional filter cartridge used in the assembly of FIGS. 17-19.
Figure 21:
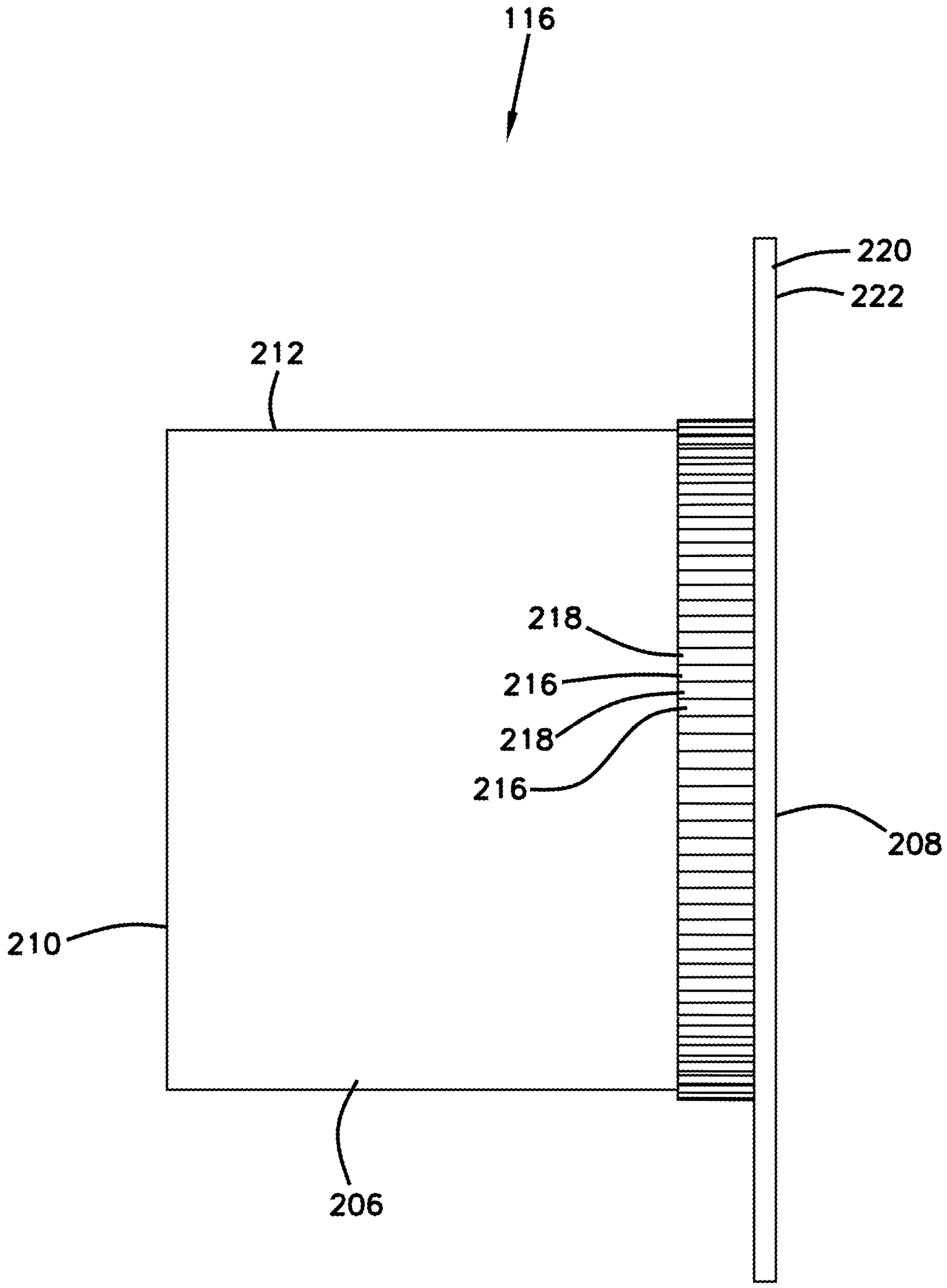
FIG. 21 is a side view of the filter cartridge of FIG. 20.
Figure 25:
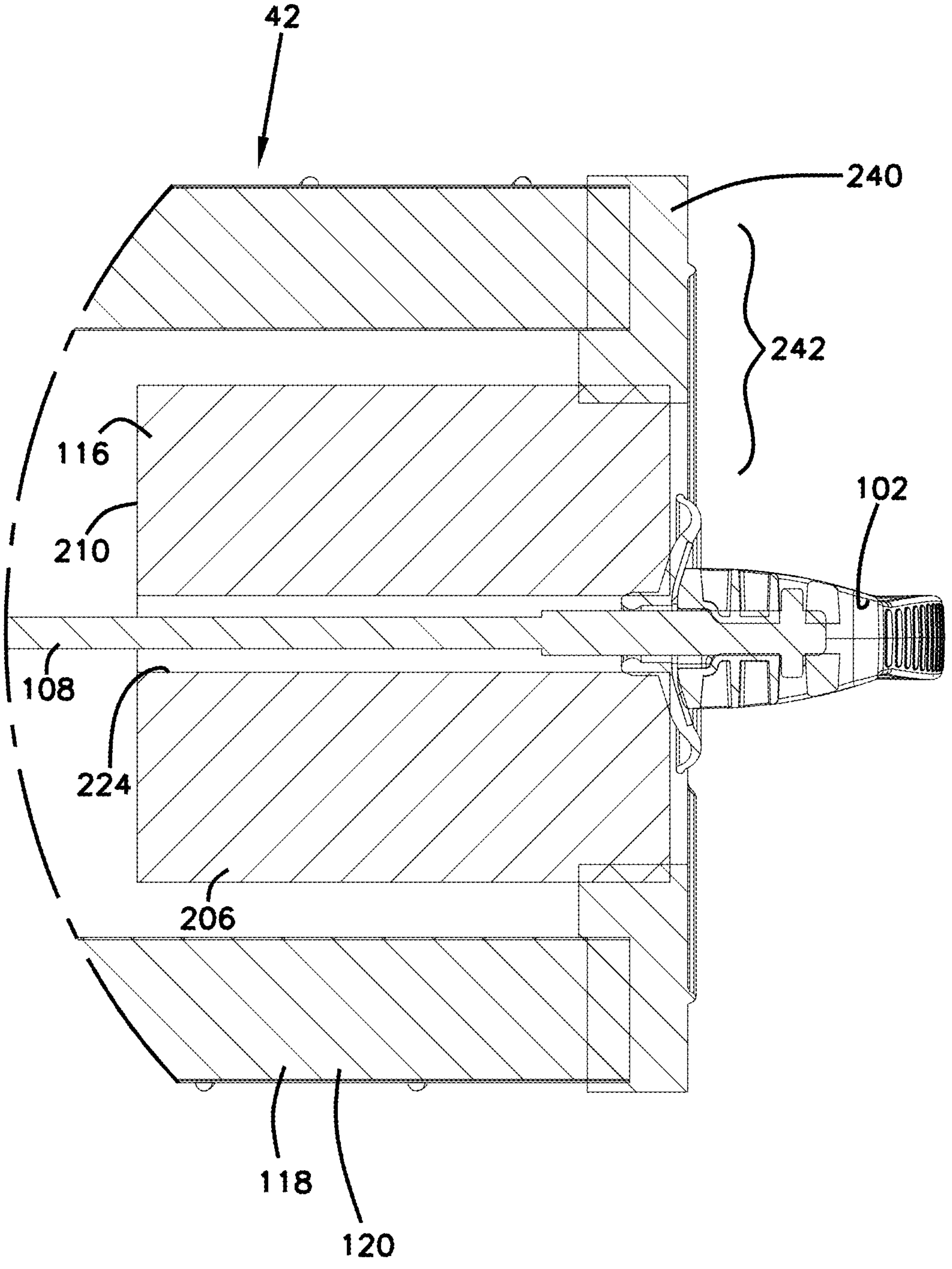
FIG. 25 is an enlarged cross-sectional view of an alternative filter assembly 100, varied from the assembly of FIGS. 17-19.
Figure 26:
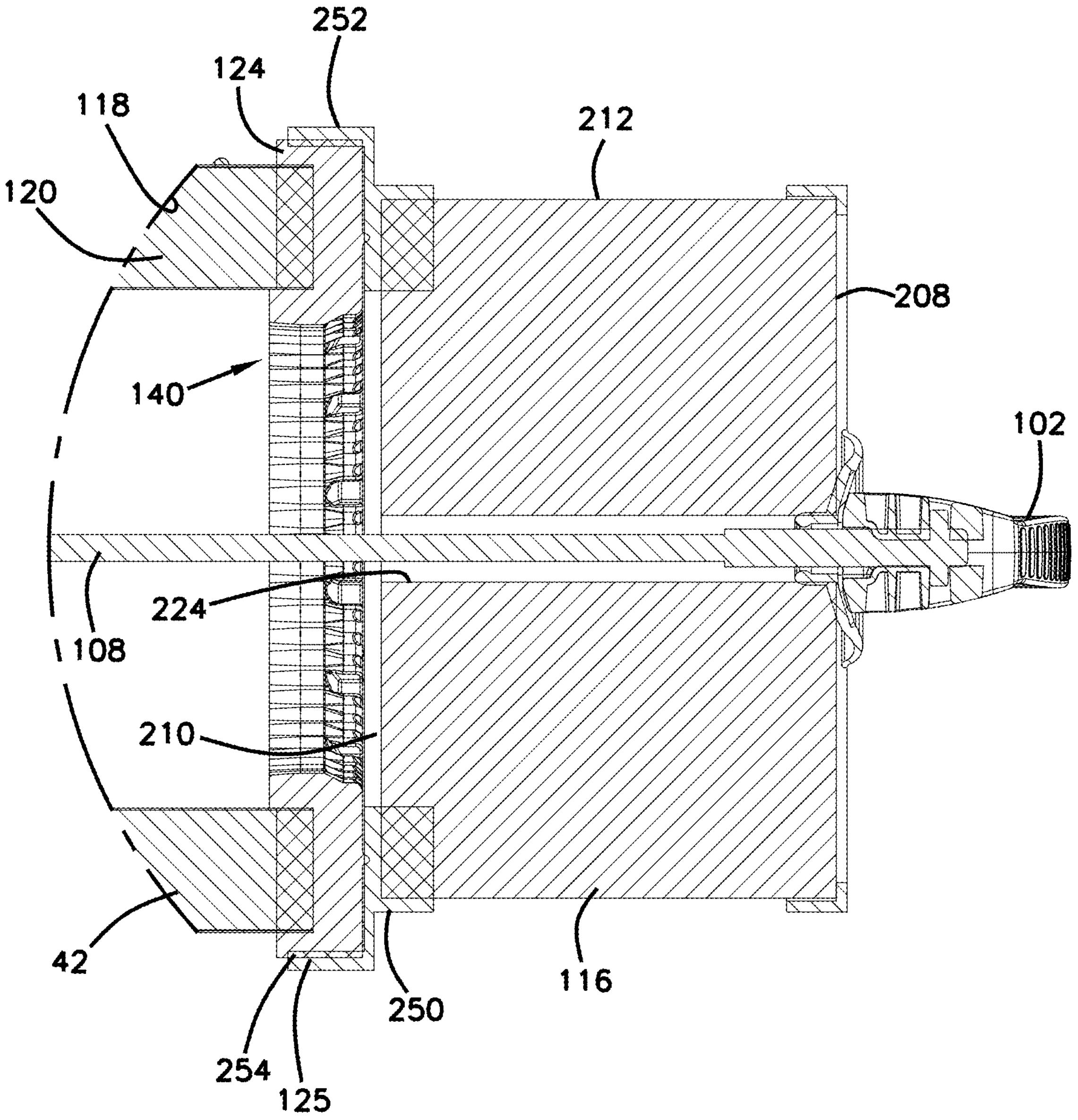
FIG. 26 is an enlarged cross-sectional view of another alternative filter assembly 100, varied from the assembly of FIGS. 17-19.

As mentioned previously, in the embodiment of FIGS. 17-19, the assembly 100 includes additional filter cartridge 116. Additional views of the additional filter cartridge 116 are depicted in FIGS. 20 and 21. Alternative embodiments are shown in FIGS. 25 and 26.

The additional filter cartridge 116 is made from z-filter media 401. The filter media 401 can be used to form a "z-filter construction." The term "z-filter construction" as used herein, is meant to include (but not be limited) a type of filter construction in which individual ones of corrugated, folded or otherwise formed filter flutes are used to define (typically in combination with facing media) sets of longitudinal, typically parallel, inlet and outlet filter flutes for fluid flow through the media. Some examples of z-filter media are provided in U.S. Pat. Nos. 5,820,646; 5,772,883; 5,902,364; 5,792,247; 5,895,574; 6,210,469; 6,190,432; 6,350,291; 6,179,890; 6,235,195; Des. 399,944; Des. 428,128; Des. 396,098; Des. 398,046; and, Des. 437,401; each of these cited references being incorporated herein by reference.

One type of z-filter media, utilizes two specific media components joined together, to form the media construction. The two components are: (1) a fluted (typically corrugated) media sheet or sheet section, and, (2) a facing media sheet or sheet section. The facing media sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted media section and facing media section can comprise separate materials between one another. However, they can also be sections of the single media sheet folded to bring the facing media material into appropriate juxtaposition with the fluted media portion of the media.

The fluted (typically corrugated) media sheet and the facing media sheet or sheet section together, are typically used to define media having parallel flutes. In some instances, the fluted sheet and facing sheet are separate and then secured together and are then coiled, as a media strip, to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked with one another, to create a filter construction. An example of this is described in FIG. 11 of U.S. Pat. No. 5,820,646, incorporated herein by reference.

Herein, strips of material comprising fluted sheet (sheet of media with ridges) secured to corrugated sheet, which are then assembled into stacks to form media packs, are sometimes referred to as "single facer strips," "single faced strips," or as "single facer" or "single faced" media. The terms and variants thereof, are meant to refer to a fact that one face, i.e., a single face, of the fluted (typically corrugated) sheet is faced by the facing sheet, in each strip.

Typically, coiling of a strip of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is often used to refer to a flute structure resulting from passing the media between two corrugation rollers, i.e., into a nip or bite between two rollers, each of which has surface features appropriate to cause corrugations in the resulting media. The term "corrugation" is however, not meant to be limited to such flutes, unless it is stated that they result from flutes that are by techniques involving passage of media into a bite between corrugation rollers. The term "corrugated" is meant to apply even if the media is further modified or deformed after corrugation, for example by the folding techniques described in PCT WO 04/007054, and published Jan. 22, 2004, incorporated herein by reference.

Corrugated media is a specific form of fluted media. Fluted media is media which has individual flutes or ridges (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a substantial turn as its passes into and out of the media. That is, in a U.S. Pat. No. 6,039,778 filter, the flow enters the cylindrical filter cartridge through a cylindrical side, and then turns to exit through an open end of the media (in forward-flow systems). In a typical reverse-flow system, the flow enters the serviceable cylindrical cartridge through an open end of the media and then turns to exit through a side of the cylindrical filter media. An example of such a reverse-flow system is shown in U.S. Pat. No. 5,613,992, incorporated by reference herein.

The term "z-filter media construction" and variants thereof as used herein, without more, is meant to include, but not necessarily be limited to, any or all of: a web of corrugated or otherwise fluted media (media having media ridges) secured to (facing) media, whether the sheets are separate or part of a single web, with appropriate sealing (closure) to allow for definition of inlet and outlet flutes; and/or a media pack constructed or formed from such media into a three dimensional network of inlet and outlet flutes; and/or, a filter cartridge or construction including such a media pack.

Figure 22:
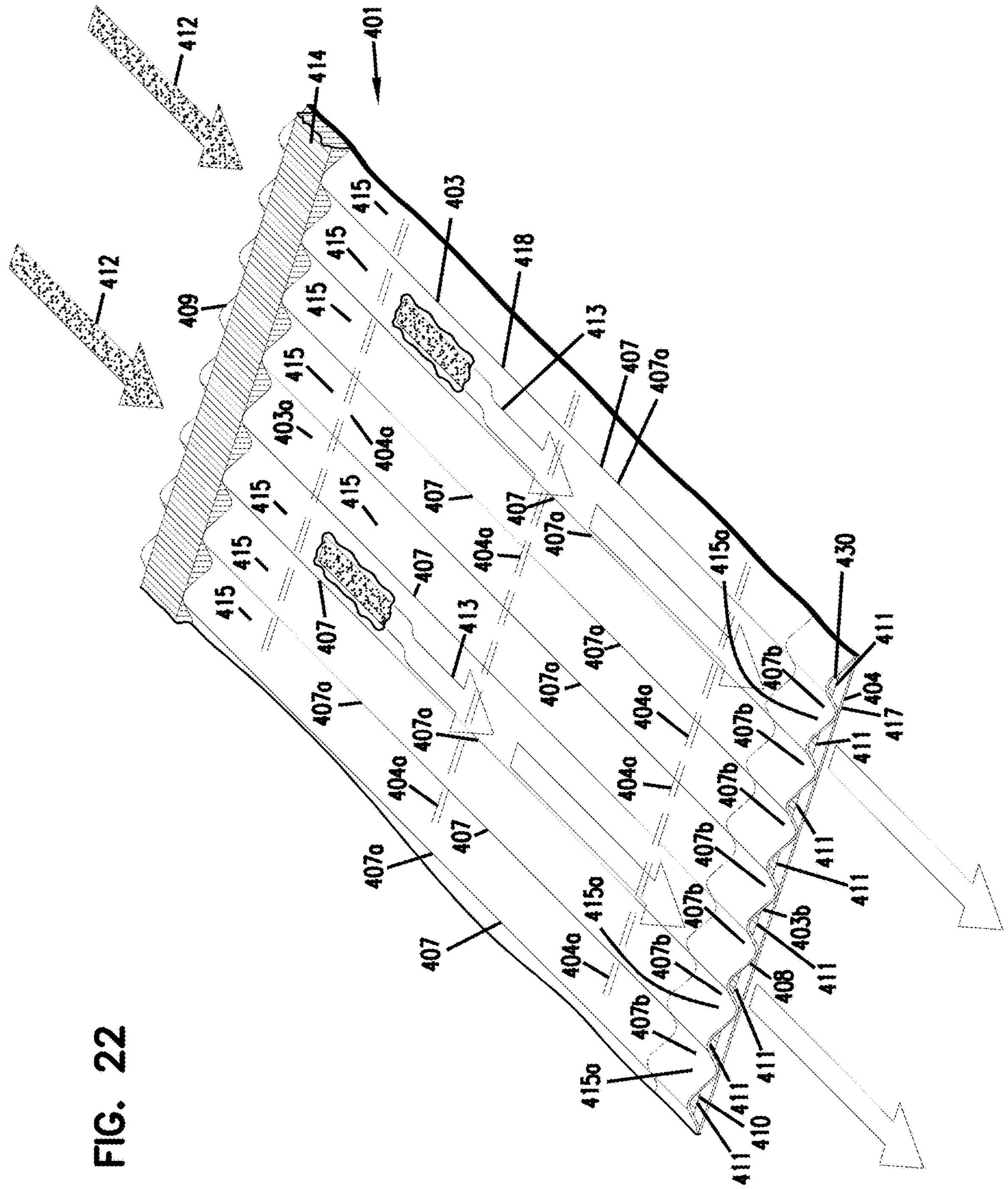
FIG. 22 is a schematic, perspective view of filter media used in the additional filter cartridge of FIGS. 20 and 21.

In FIG. 22, an example of media 401 useable in z-filter media is shown. The media 401 is formed from a corrugated (fluted) sheet 403 and a facing sheet 404.

In general, the corrugated sheet 403, FIG. 22, is of a type generally characterized herein as having a regular, curved, wave pattern of flutes or corrugations 407. The term "wave pattern" in this context, is meant to refer to a flute or corrugated pattern of alternating troughs 407*b* and ridges 407*a*. The term "regular" in this context is meant to refer to the fact that the pairs of troughs and ridges (407*b*, 407*a*) alternate with generally the same repeating corrugation (or flute) shape and size. (Also, typically in a regular configuration each trough 407*b* is substantially an inverse of each ridge 407*a*.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 403 is flexible. With respect to the characterization of a repeating pattern, it is not meant that in any given filter construction, an equal number of ridges and troughs is necessarily present. The media 401 could be terminated, for example, between a pair comprising a ridge and a trough, or partially along a pair comprising a ridge and a trough. (For example, in FIG. 22 the media 401 depicted in fragmentary has eight complete ridges 407*a* and seven complete troughs 407*b*.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 407*a* of each ridge and the bottom 407*b* of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 22, for the corrugated sheet 403, is that at approximately a midpoint 430 between each trough and each adjacent ridge, along most of the length of the flutes 407, is located a transition region where the curvature inverts. For example, viewing back side or face 403*a*, FIG. 22, trough 407*b* is a concave region, and ridge 407*a* is a convex region. Of course when viewed toward front side or face 403*b*, trough 407*b* of side 403*a* forms a ridge; and, ridge 407*a* of face 403*a*, forms a trough. (In some instances, region 430 can be a straight segment, instead of a point, with curvature inverting at ends of the straight segment 430.)

A characteristic of the particular regular, curved, wave pattern corrugated sheet 403 shown in FIG. 22, is that the individual corrugations are generally straight. By "straight" in this context, it is meant that through at least 70% (typically at least 80%) of the length between edges 408 and 409, the ridges 407*a* and troughs 407*b* do not change substantially in cross-section. The term "straight" in reference to corrugation pattern shown in FIG. 22, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 22 and as referenced above, the media 401 has first and second opposite edges 408 and 409. When the media 401 is coiled and formed into a media pack, in general edge 409 will form an inlet end for the media pack and edge 408 an outlet end, although an opposite orientation is possible as discussed below with respect to FIG. 24.

Adjacent edge 408 the sheets 403, 404 are sealed to one another, for example by sealant, in this instance in the form of a sealant bead 410, sealing the corrugated (fluted) sheet 403 and the facing sheet 404 together. Bead 410 will sometimes be referred to as a "single facer" bead, when it is applied as a bead between the corrugated sheet 403 and facing sheet 404, to form the single facer or media strip 401. Sealant bead 410 seals closed individual flutes 411 adjacent edge 408, to passage of air therefrom.

Adjacent edge 409, is provided sealant, in this instance in the form of a seal bead 414. Seal bead 414 generally closes flutes 415 to passage of unfiltered fluid therein, adjacent edge 409. Bead 414 would typically be applied as the media 401 is coiled about itself, with the corrugated sheet 403 directed to the inside. Thus, bead 414 will form a seal between a back side 417 of facing sheet 404, and side 418 of the corrugated sheet 403. The bead 414 will sometimes be referred to as a "winding bead" when it is applied as the strip 401 is coiled into a coiled media pack. If the media 401 were cut in strips and stacked, instead of coiled, bead 414 would be a "stacking bead."

In some applications, the corrugated sheet 403 is also tacked to the facing sheet 4 at various points along the flute length, as shown at lines 404*a*.

Referring to FIG. 22, once the media 401 is incorporated into a media pack, for example by coiling or stacking, it can be operated as follows. First, air in the direction of arrows 412, would enter open flutes 411 adjacent end 409. Due to the closure at end 408, by bead 410, the air would pass through the media shown by arrows 413. It could then exit the media pack, by passage through open ends 415*a* of the flutes 415, adjacent end 408 of the media pack. Of course operation could be conducted with air flow in the opposite direction, as discussed for example with respect to FIG. 24. The point being that in typical air filter applications, at one end or face of the media pack unfiltered air flow goes in, and at an opposite end or face the filtered air flow goes out, with no unfiltered air flow through the pack or between the faces.

For the particular arrangement shown herein in FIG. 22, the parallel corrugations 7*a*, 7*b* are generally straight completely across the media, from edge 708 to edge 709. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 403, facing sheet 404 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Attention is again directed to FIGS. 20 and 21. The filter cartridge 116 includes a media pack 206 of straight flow through media, such as z-media 401. The media pack 206 includes a first flow face 208 and an opposite second flow face 210. The flutes 411, 415 (FIG. 22) extend in a direction between the opposite first and second flow faces 208, 210. A side wall 212 extends between the first and second flow faces 208, 210.

In this embodiment, the first flow face 208 corresponds to an inlet flow face, while the second flow face 210 corresponds to an outlet flow face.

The filter cartridge 116 includes a band 214 around the side wall 212. In one example embodiment, the band 214 is circumscribing and against the side wall 212, although alternatives are possible. The band 214 includes a plurality of alternating outward radial portions 216 and alternating inward radial portions 218.

When the additional filter cartridge 116 is received within the second end cap 124 (alternatively, within the first end cap 122), it forms a seal with the seal member 146 of the end cap 122, 124 such that the inward radial portions 218 of the band 214 receive the seal member radial projections 154; and the seal member radial recesses 156 receive the outward radial portions 216 of the band 214. An alternative seal arrangement between the filter cartridge 116 and element 42 is discussed further below in connection with FIG. 26.

As can be seen in FIGS. 20 and 21, the band 214 is oriented between the first flow face 208 and second flow face 210. In this embodiment, the band 214 is also adjacent the first flow face 208. Many embodiments are possible.

The band 214 can be part of an end piece 220. The end piece 220 has a plate 222 extending radially from the first flow face 208. The band 214 extends axially from the plate 222 and along the side wall 212. In this example embodiment, the band 214 is generally perpendicular to the plate 222. The plate 222 will extend over and cover an axial end of the second end cap 124, when operably installed.

In an alternative embodiment of FIG. 25, the element 42 and additional filter cartridge 116 are molded together in a single continuous end piece 240, so that they are one unitary element pair 242. In this embodiment, only the element 42 first end cap 122 includes the seal arrangement 138.

The media pack 206 is preferably a coiled media pack. In this embodiment, the media pack 206 defines a central, open channel 224 extending between and through the first and second flow faces 208, 210. This channel 224 allows the rod 108 to extend through the filter cartridge 116 in order to engage the handle 102. See FIG. 19.

In this embodiment, the media pack 206 has a cross-sectional shape that matches the cross-sectional shape of the openings 126, 130 of the end caps 122, 124. In this example, the shape is round.

The additional filter cartridge 116 allows for flow of unfiltered air through the first flow face 208. The media pack 206 removes particulate, and filtered air the flows through the second flow face 210 to reach the interior volume 128 of the filter element 42. From there, the filtered air flows through the aperture 40 and the tube sheet 38, through the venturi tube 46, and into the downstream volume 36 (FIG. 1) of the system 20.

In general, the additional filter cartridge 116 helps to balance the filter gradient through the assembly 100 and add life to both elements 42, 116. Without the filter cartridge 116, the element 42 would load in the region nearest the tube sheet 38, but when the filter cartridge 116 is used, in some systems, the air will flow initially through the additional filter cartridge 116 first before flowing through the pleated media 120 of the element 42. This leads to a more balanced filter gradient through the pleated media 120 and lengthens the life of the element 42.

In the FIG. 26 embodiment, instead of a seal being formed between the additional filter cartridge 116 and filter element 42 at seal member 146, the filter cartridge 116 has an end piece 250 secured to the second flow face 210. The end piece 250 has an axially projecting ring 252, which extends axially in a direction away from a remaining portion of the cartridge 116. The ring 252 extend radially outwardly from sidewall 212 of the cartridge 116 and is sized to fit snuggly around (e.g., circumscribe) an outer diameter 125 of the end cap 124 to form a releasable radial seal 254 between and against an inside surface of the ring 252 and the outer diameter 125 of the end cap 124 of the element 42.

G. Example Operations and Methods

In general, air to be filtered flows into the system 20 under the hoods 26 and into the upstream volume 34. From there, the filtered air flows through the filter elements 42. The media 118 filters the air, and the filtered air exits the filter elements 42 through the aperture 40 in the tube sheet 38 and then through the venturi tube 46. The filtered air enters the downstream volume 36, where it then flows to the downstream equipment a gas turbine.

In embodiments that include the additional filter cartridge 116, if the filter elements 42 become clogged, the unfiltered air will bypass the pleated media 120 and flow through the media pack 206 of the additional filter cartridge 116. The media pack 206 will filter the air, and the filtered air will flow into the interior volume 128 of the element 42 and then exit through the aperture 40 in the tube sheet 38.

Periodically, the system 20 will pulse clean the elements 42 by emitting a pulse of air through the venturi tube 46, where it will enter the interior volume 128 and knock of or blow off any dust or debris that has collected on the upstream side of the pleated media 120.

After a period of operation, the system 20 will require servicing. To service the system 120, the filter elements 42 will need to be removed and replaced with new filter elements 42. To do that, the filter element 42 is released by pivoting the quick release handle 102 from a locked position (FIGS. 2 and 19) to an unlocked position, in which the handle 102 is pivoted to extend axially. The gasket washer 114 and handle 102 are removed from the rod 108. In the embodiment of FIGS. 3 and 4, the assembly cover 112 is removed, and then the filter element 42 is removed from the tube sheet 38. A new filter element 42 is provided. In embodiments that have elements 42 with identical seal members 138, 140, either end of the filter element 42 is oriented toward the tube sheet 38. The new filter element 42 is sealed against the tube sheet 38 by creating a seal between the first (or second) end cap 122 and the tube sheet seal member 104. This is done by engaging the outward radial portions 168 and inward radial portions 170 of the tube sheet seal member 104 with the radial recesses 156 and radial projections 154 of the seal member 146 of the filter element 42.

The rod 108 is extended through the aperture 194 of the assembly cover 112, while the outward radial portions 202 and inner radial portions 204 of the assembly cover form a seal with the radial recesses 156 and radial projections 154 of the seal member 146 of the second (or first) end cap 124 of the filter element 42. The gasket washer 114 and handle 102 are then put in engagement with the rod 108, and the handle 102 is pivoted into the locked position of FIGS. 2 and 19 to secure the new filter element 42 in place.

Figure 18:
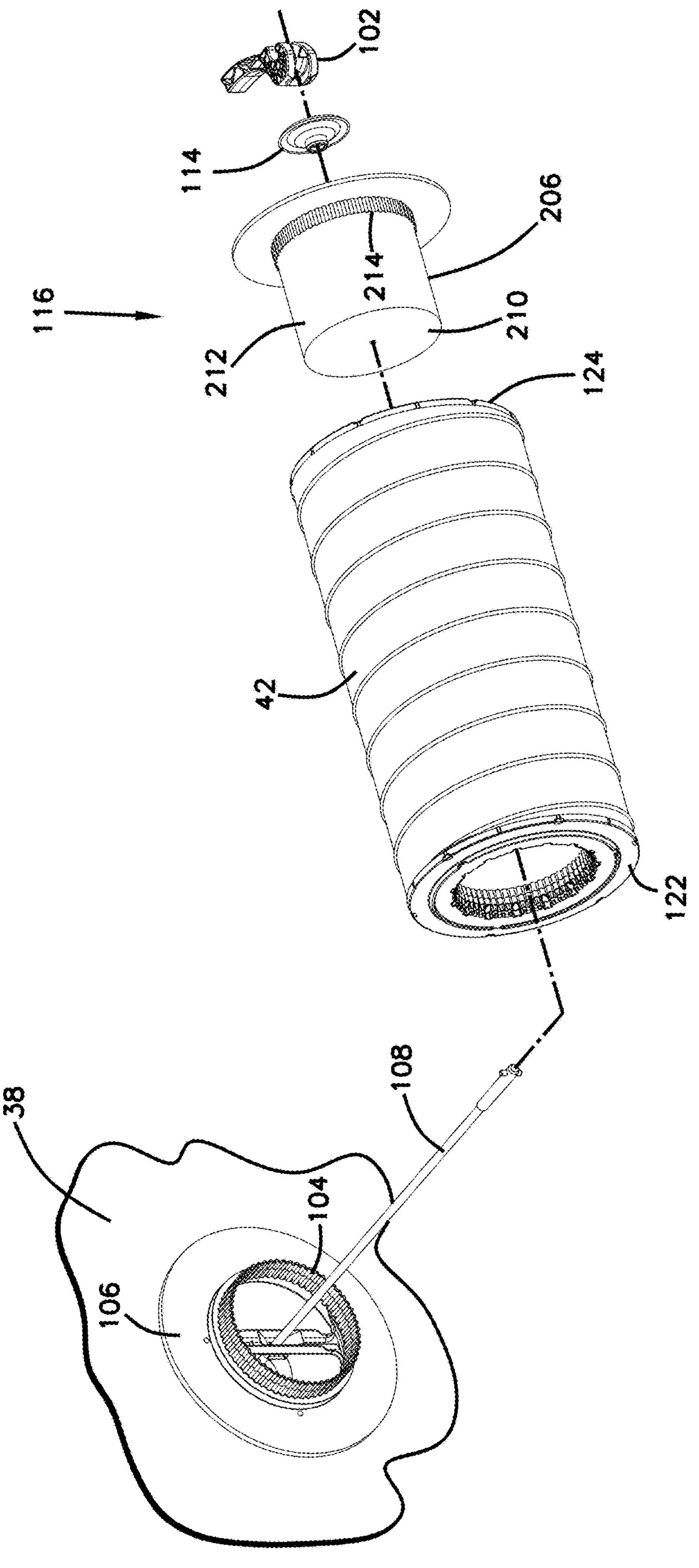
FIG. 18 is another perspective view of the assembly of FIG. 17.

For the embodiment of FIGS. 17 and 18, instead of forming a seal with the assembly cover 112, the filter element 42 forms a seal with the additional filter cartridge 116. This is done by engaging the outward radial portions 216 and inward radial portions 218 of the band 214 with the radial recesses 156 and radial projections 154 of the seal member 146 of the element 42. The rod 108 passes through the channel 224 and engages the gasket washer 114 and handle 102, in which the handle 102 is pivoted into the locked position to secure the element 42 to the tube sheet 38. In FIG. 26, the filter element 42 seals with the additional filter cartridge 116 at outer radial seal 254 along the outer diameter 125 of the end cap 124.

H. Additional Example Arrangements, FIGS. 54-56

In addition to the arrangement described above, all of which whose descriptions are incorporated here by reference, the following elements and systems are provided. The following arrangements can have any of the end caps, seal arrangements, and other various features as was previously described. Those features are not again described here.

Figure 54:
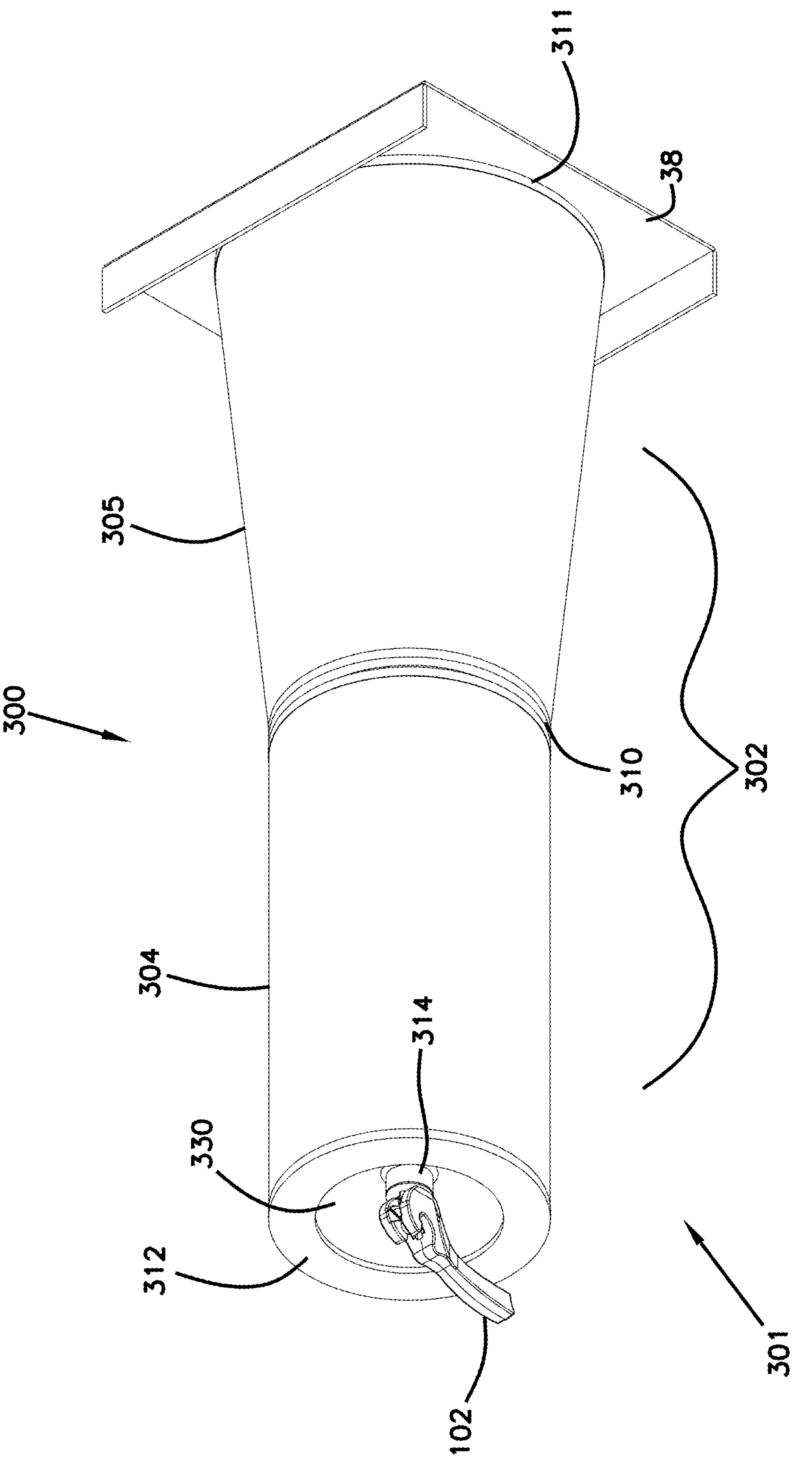
FIG. 54 is a perspective view of an alternative embodiment of a filter arrangement useable with a gas turbine air intake system.
Figure 55:
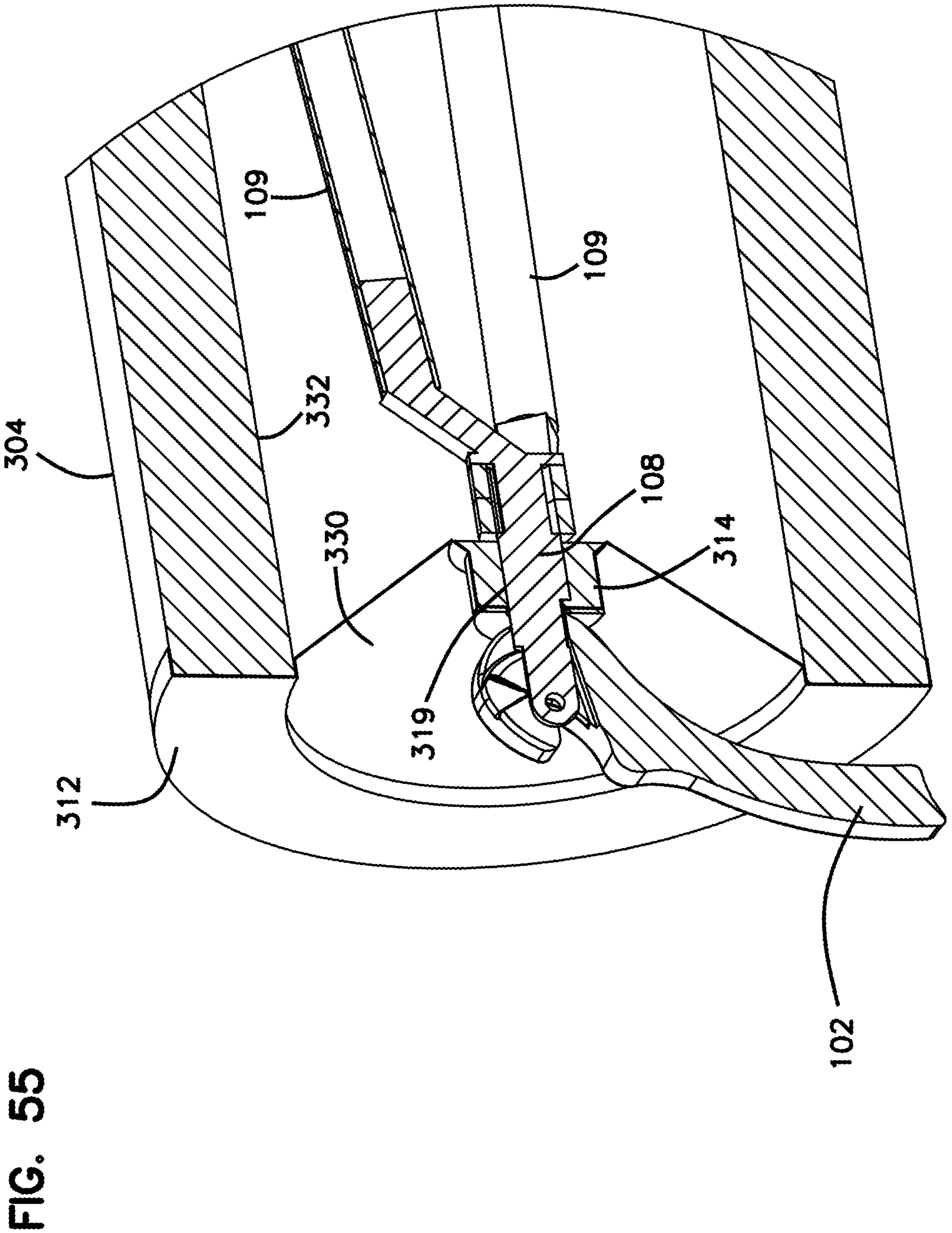
FIG. 55 is a perspective, cross-sectional view of a portion of the filter arrangement of FIG. 54.
Figure 56:
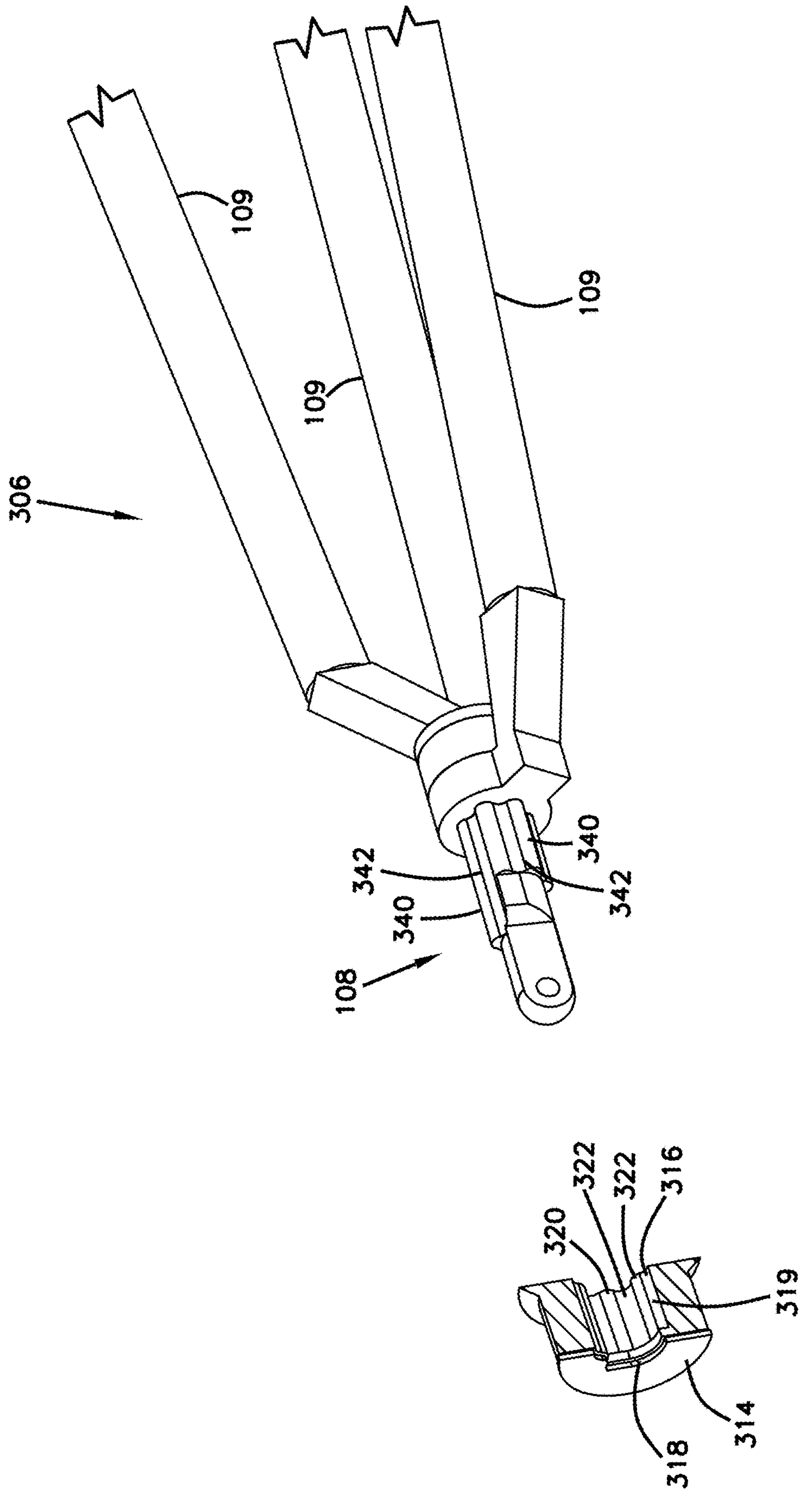
FIG. 56 is an exploded, perspective and partially cross-sectional view of portions of the filter arrangement of FIGS. 54 and 55.
Figure 57:
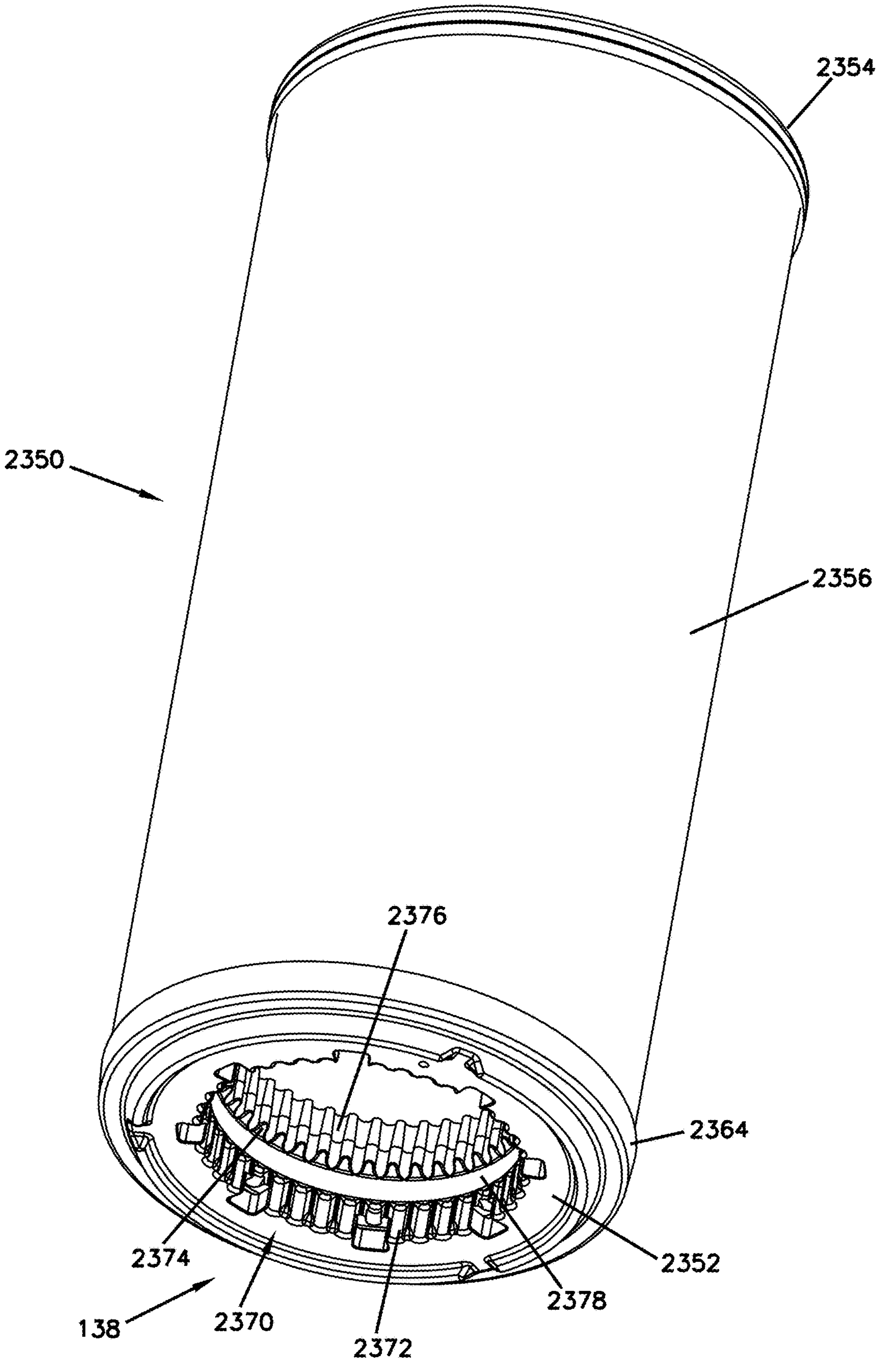
FIG. 57 is a perspective view of a filter cartridge constructed to engage the seal plate of the tube sheet of FIG. 10.
Figure 58:
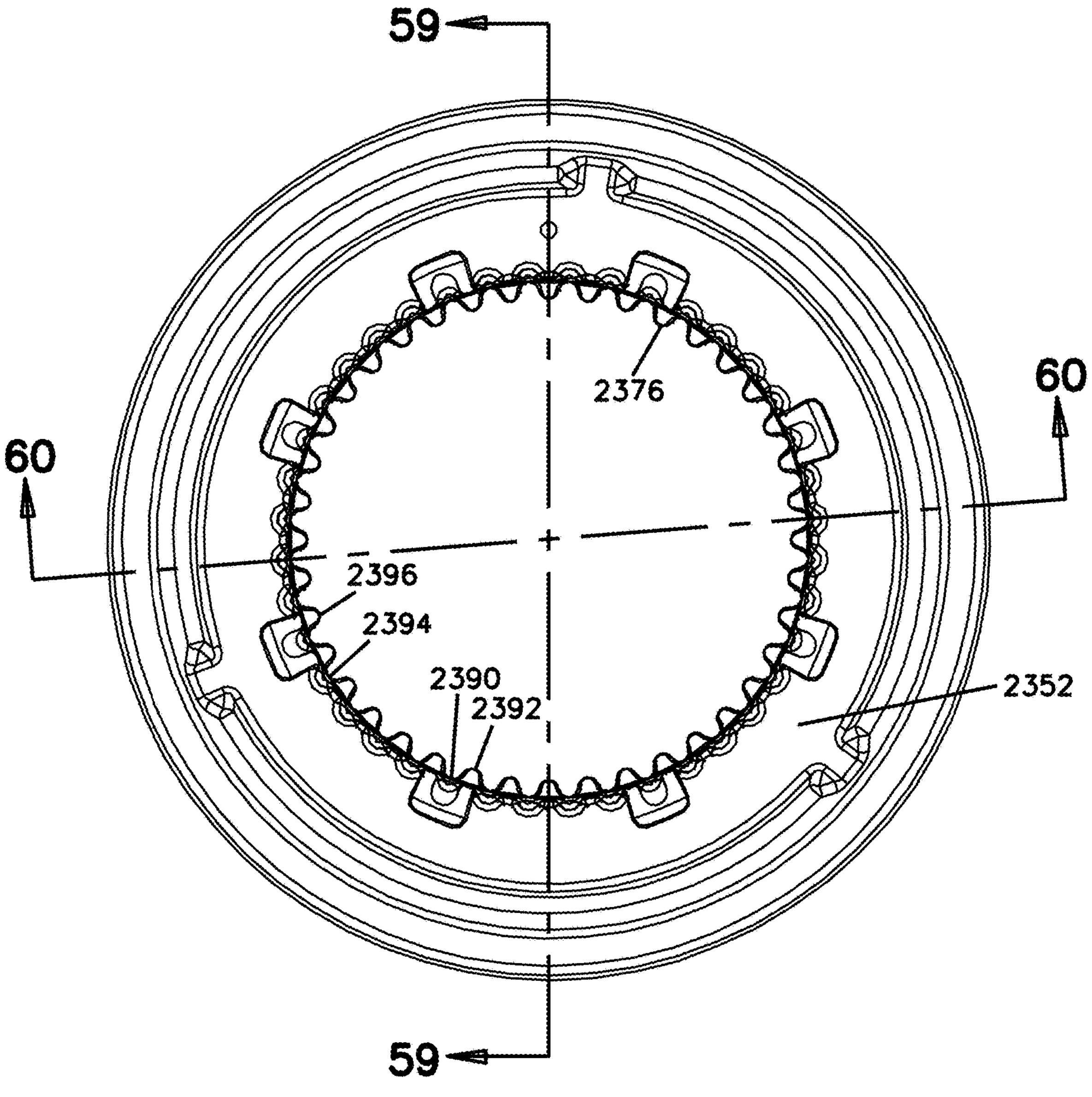
FIG. 58 is an end view of the filter cartridge of FIG. 57.
Figure 59:
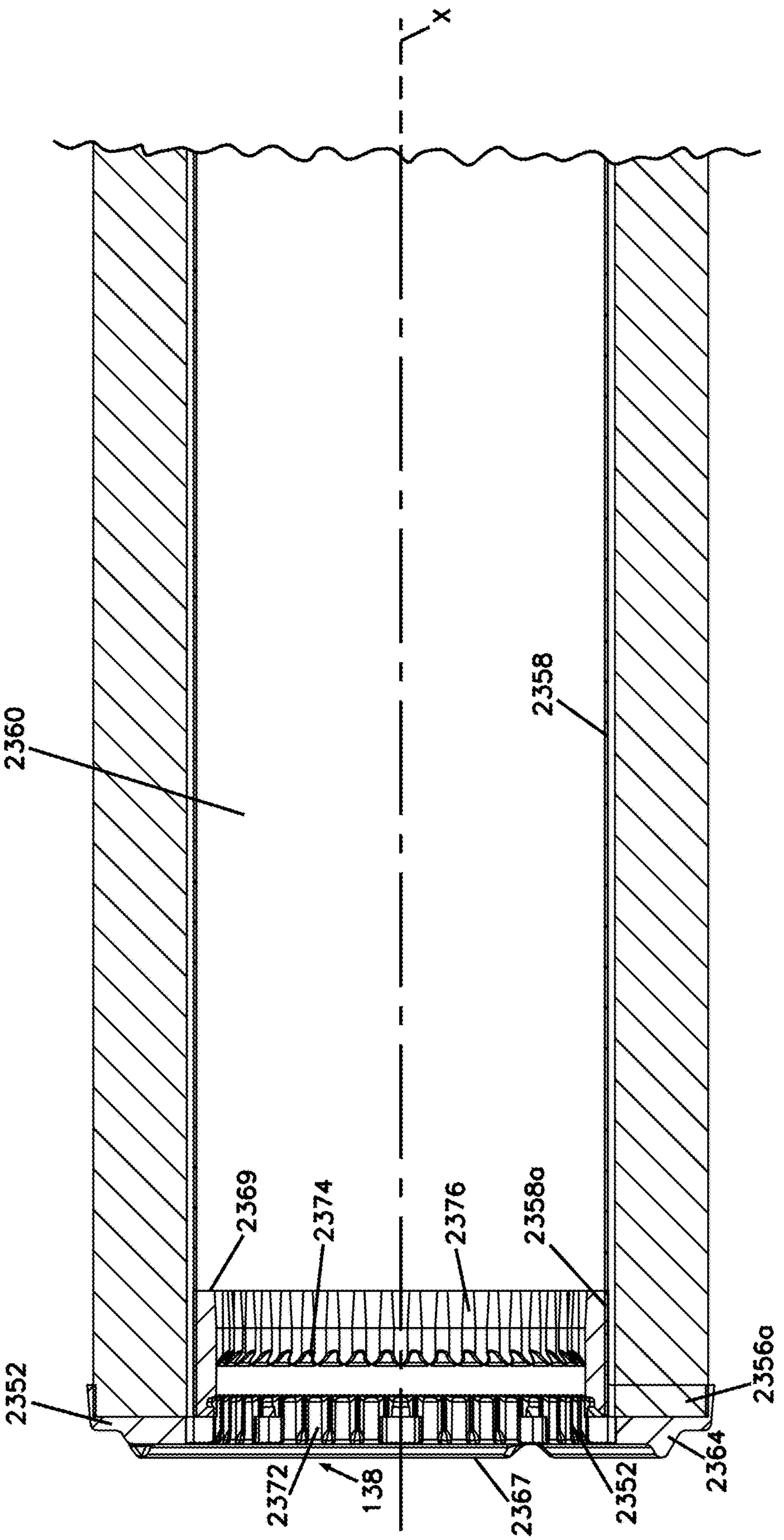
FIG. 59 is a sectional view of the filter cartridge of FIG. 58 taken along line 59-59.

In FIGS. 54-56, an alternate system is shown at 300. The system 300 includes a filter arrangement 301. The filter arrangement 301 can be embodied as a single element 42 (as described previously), or it can be an element pair 302 operably installed adjacent the tube sheet 38. The filter element pair 302 includes a cylindrical element 304 and a conical element 305, axially aligned and stacked end-to-end. Alternatively, the element pair 302 can include two cylindrical elements.

Yoke assembly 306 (FIG. 56) releasably holds the filter arrangement 301 to the tube sheet 38. The yoke assembly 306 includes tri-pod of legs 109. Rod 108 extends from the leg tripod 109 at an end remote from the tube sheet 38. Pivotable handle 102, which is part of the yoke assembly 306, is secured to the free end of the rod 108 and operates to removably secure the filter arrangement 301 to the tube sheet 38. The handle 102 can be similar to the handle as described in U.S. Pat. No. 8,956,434 and U.S. 2017/0173512, each of which is incorporated herein by reference in its entirety.

The filter element 304 has a first end cap 310 and an opposite second end cap 312. In embodiments in which the filter arrangement 301 includes only a single element (such as element 42), the first end cap 310 will form a seal with the tube sheet 38, and can include the seal arrangement 138 described above in connection with FIGS. 4-15. In the embodiment shown, the first end cap 310 is against the non-tube sheet end of the element 305. The tube sheet end 311 of the element 305 may include any of the various seal arrangements described above in connection with FIGS. 4-15, such as seal arrangement 138. Alternatively, it may be a standard axial seal.

The second end cap 312 of the filter element 304 includes a center, integrated gasket 314. The gasket 314 is made from a soft material and includes a seal member 316. The seal member 316 surrounds a rod-receiving through-aperture 318, through which the rod 108 passes.

The seal member 316 has an inwardly radially directed seal surface 319 and a thickness that varies along the seal member surface 319. The thickness varies in a radial direction along the seal member surface 319. It should be understood that the seal surface 319 surrounds the through-aperture 318.

In FIG. 56, the radially directed seal surface 319 can be seen to include a plurality of outwardly projecting projections 320 and a plurality of inwardly projecting recesses 322. These projections 320 and recesses 322 can be curved. In this example, a length of the seal member surface 319 is constant in an axial direction.

The second end cap 312 has a recessed section 330 projecting inwardly into the filter interior 332. The integrated gasket 314 is centered in the recessed section 330.

In the example shown, the integrated gasket 314 has an outer diameter less than that of the outer diameter of the second end cap 312. For example, the diameter of the integrated gasket 314 is less than 50%, indeed less than 30%, and often less than 20% of an outer diameter of the second end cap 312.

In the system 300, a portion of the rod 108 has a plurality of alternating outward radial sections 340 and alternating inward radial sections 342. The second end cap 312 receives the rod 108 through aperture 318 in the gasket 314 in that: the rod inward radial sections 342 receive the seal member radial projections 320; and the seal member radial recesses 322 receive the rod outward radial sections 340.

The contact between the rod 108 and the gasket 314 helps to increase the contact between the filter element gasket 314 and the rod 108 to ensure good sealing over the entire life time of the filter element 304. The number of projections 320 and recesses 322 can vary according to the sealing compression factor that is needed. A pressure washer can be used to help spread the load of the clamping system onto the second end cap 312 of the filter element 304.

I. Additional Example Arrangements, FIGS. 57-61

In addition to the arrangement described above, all of which whose descriptions are incorporated here by reference, the following elements and systems are provided. The following arrangements can have any of the end caps, seal arrangements, and other various features as was previously described. Those features are not again described here.

Now referring to FIGS. 57-61, a filter cartridge or element (e.g., primary or main) is shown at reference number 2350. The filter cartridge 2350 as shown includes a first end piece (e.g., cap) 2352, a second end piece (e.g., cap) 2354, filter media 2356, and a liner 2358. The filter media 2356 includes a first end 2356*a* and a second end 2356*b*. In general, the filter media first end 2356*a* can be embedded in the first end cap 2352, and the filter media second end 2356*b* can be embedded in the second end cap 2354. In addition, the liner 2358 includes a liner first end 2358*a* and a liner second end 2358*b*. The liner first end 2358*a* can also be embedded in the first end cap 2352, and the liner second end 2358*b* can be embedded in the second end cap 2354. In addition, the filter media 2256 can be provided as supported by the liner 2258. The filter media 2256 can be provided as cylindrical or conical pleated media, or as any other type of media configuration that provides the filter cartridge 2350 with a central open volume 2360.

Figure 60:
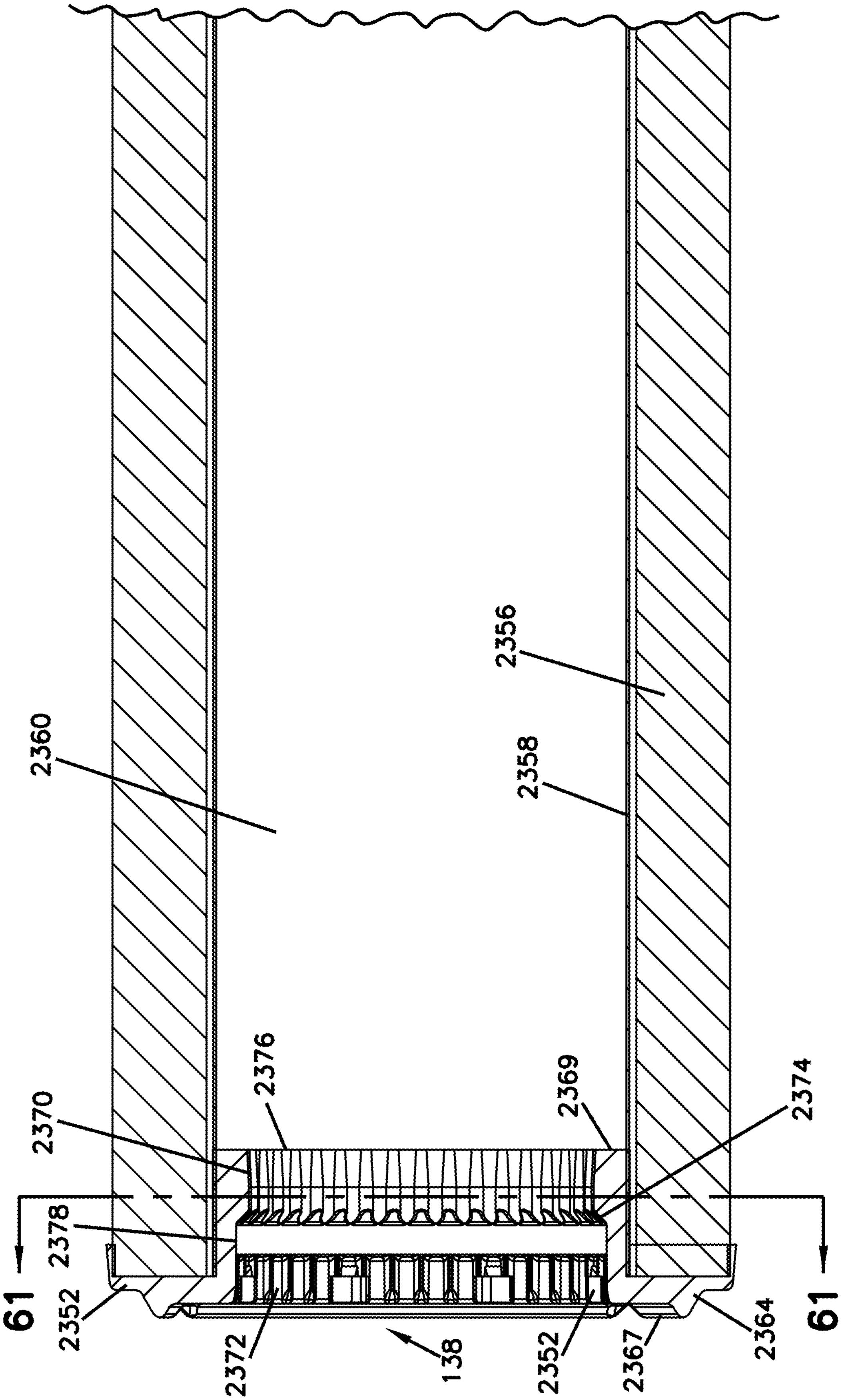
FIG. 60 is a sectional view of the filter cartridge of FIG. 58 taken along line 60-60.
Figure 61:
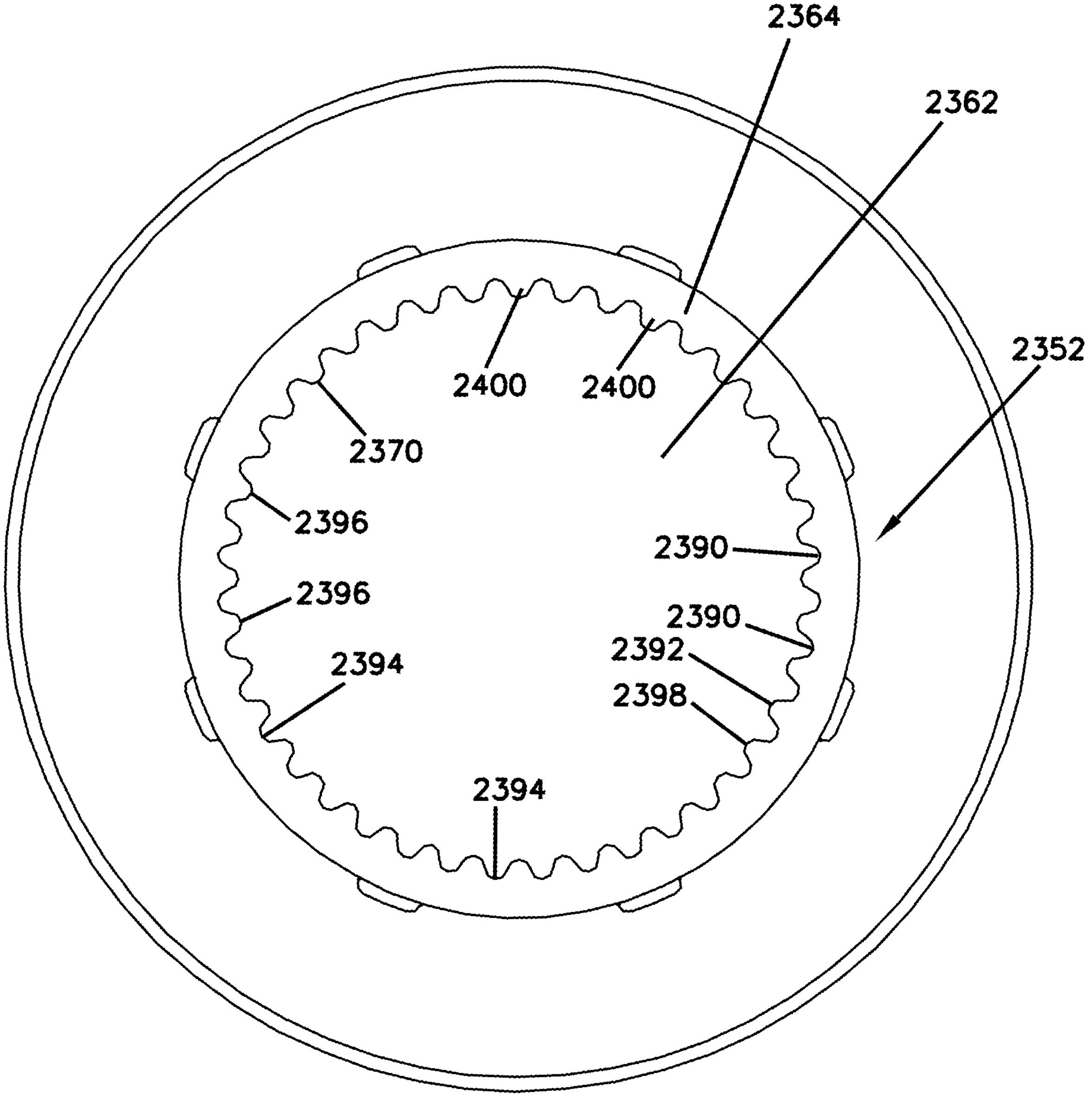
FIG. 61 is a sectional view of the end piece of the filter cartridge of FIG. 60 taken along line 61-61.

Now referring to FIGS. 60-61, the first end piece (e.g., cap) 2352 is shown in detail. The first end cap 2352 includes a central open volume 2362 that is in communication with the filter element central open volume 2360. Accordingly, the first end cap 2352 can be characterized as an open end cap 364. The second end cap 2354 can also be an open end cap.

The filter element 2350 can be used in, for example, the system 20 of FIG. 1 or 23. The seal members 138, 140, as characterized above, are further defined below, and this further definition can apply to any of the previously described seal members 138, 140.

The open end cap 2364 includes a first end 2367, a second end 2369, and an internal surface 2370 extending between the first end 2367 and the second end 2369. The internal surface 2370 forms the central open volume 2362, and can be constructed to engage and seal against the tube sheet seal member 104 (FIGS. 12-14) having a wavy wall. The internal surface 2370 can form an internally directed radial seal.

The internal surface 2370 as shown includes a lead in region 2372, an optional peripherally uniform radial seal region 2378, a transition region 2374, and a peripherally non-uniform radial seal region 2376. The optional peripherally uniform seal radial seal region 2378 can be omitted from the filter element 2350, and is provided in the event it is desirable for the filter element 2350 to fit both a filter cartridge seal surface that can be characterized as a wavy wall tube sheet seal member and a prior art air tube sheet seal member having a peripherally uniform seal surface about an axis X.

The lead in region 2372, the transition region 2374, and the peripherally non-uniform radial seal region 2376 can be characterized as having a plurality of radially outwardly projecting and axially extending portions 2390 alternating with a plurality of radially inwardly projecting and axially extending portions 2392. These portions 2390 and 2392 can be provided extending axially along each of regions 2372, 2374, and 2376 and not along region 2378 if region 2378 is present. The radially outwardly projecting and axially extending portions 2390 can be characterized as troughs 2394, and the and the radially inwardly projecting and axially extending portions 2392 can be characterized as peaks or ridges 2396. The lobes 2400 formed by the peaks 2396 between adjacent troughs 2394 can be provided so that they fit into the corresponding troughs (inward radial portions) 170 in the tube sheet seal member 104 (FIGS. 12-14). Similarly, the troughs 2394 are provided so that they receive the peaks (outward radial portions) 168 in the tube sheet seal member 104. It should be appreciated that the reference to "outwardly" and "inwardly" refer to a direction either away from or toward the central axis X. Thus, the outwardly projecting and axially extending portions 2390 can be referred to as troughs 2394, and the inwardly projecting and axially extending portions 2392 can be referred to as peaks 2396. The size and shape of the troughs 2394 and peaks 2396 can be altered and adjusted throughout the lead in region 2372, the transition region 2374, and the radially seal region 2376 in order to case the insertion of the filter element 2350 onto the tube sheet seal member 104.

The radial seal region 2376 includes a wavy wall seal member surface 2398 that also includes a plurality of lobes 2400. The wavy wall seal member surface can be characterized in terms of "pitch" which is the distance from peak to adjacent peak of the lobes 2400. In the case of the wavy wall seal member surface 2376, the pitch can be defined as the distance between adjacent peaks. Alternatively, the pitch can be defined as the distance between the adjacent troughs. The wavy wall seal member surface 2376 can be characterized as having a pitch that allows the service provider (installer of the filter element) with a degree of indexing that allows the service provider to correctly index the filter element within the housing without having to re-grip the filter element. As the filter cartridge 2350 is introduced into the wavy tube sheet seal member, the lead in region 2372 engages the wavy wall of the tube sheet seal member 104 thereby indexing the filter cartridge 2350 into the correct orientation for further axial insertion. The peripherally uniform radial seal surface 2378, if present, engages the wavy wall of the tube sheet seal member 104 with continued axial insertion. Further axial insertion results in the transition region 2374 engaging the wavy wall to help further orient the filter cartridge 2350 and ease the transition to the radial seal region 2376 engaging the wavy wall of the tube sheet seal member 104 where a radially directed seal is created.

It should be appreciated that for the filter cartridge 2350, the peripherally non-uniform radial seal surface 2376 and the peripherally uniform radial seal surface 2378 (if present) are recessed from the first end 2367 of the open end cap 2364. Furthermore, the seal surfaces 2376 and 2378 can be characterized as provided inside of the filter media 2356. In addition, by recessing the seal surfaces 2376 and 2378 from the first end 2367, the seal surfaces 2376 and 2378 are protected from dust or debris when the filter cartridge 2350 is set on a dirty surface. For example, the seal surfaces 2376 and 2378 can be axially recessed at least about 1 millimeter from the first end 2367.

In some embodiments, the second end cap 2354 can have an identical construction as the first end cap 2356 as characterized above.

II. Additional Media Configurations

A. Introduction

Principles according to the present disclosure relate to interactions between filter cartridges and air cleaner systems, in advantageous manners to achieve certain, selected, desired results discussed below. The filter cartridge would generally include a filter media therein, through which air and other gases pass, during a filtering operation. The media can be of a variety of types and configurations, and can be made from using a variety of materials. For example, pleated media arrangements can be used in cartridges according to the principles of the present disclosure, as discussed below.

The principles are particularly well adapted for use in situations in which the media is quite deep in extension between the inlet and outlet ends of the cartridge, but alternatives are possible. Also, the principles are often used in cartridges having relatively large cross-dimension sizes. With such arrangements, alternate media types to pleated media will often be desired.

In this section, examples of some media arrangements that are usable with the techniques described herein are provided. It will be understood, however, that a variety of alternate media types can be used. The choice of media type is generally one of preference for: availability; function in a given situation of application, ease of manufacturability, etc. and the choice is not necessarily specifically related to the overall function of selected ones of various filter cartridge/air cleaner interaction features characterized herein.

Media pack arrangements using filter media having media ridges (flutes) secured to facing media is described above with respect to FIG. 22.

Figure 27:
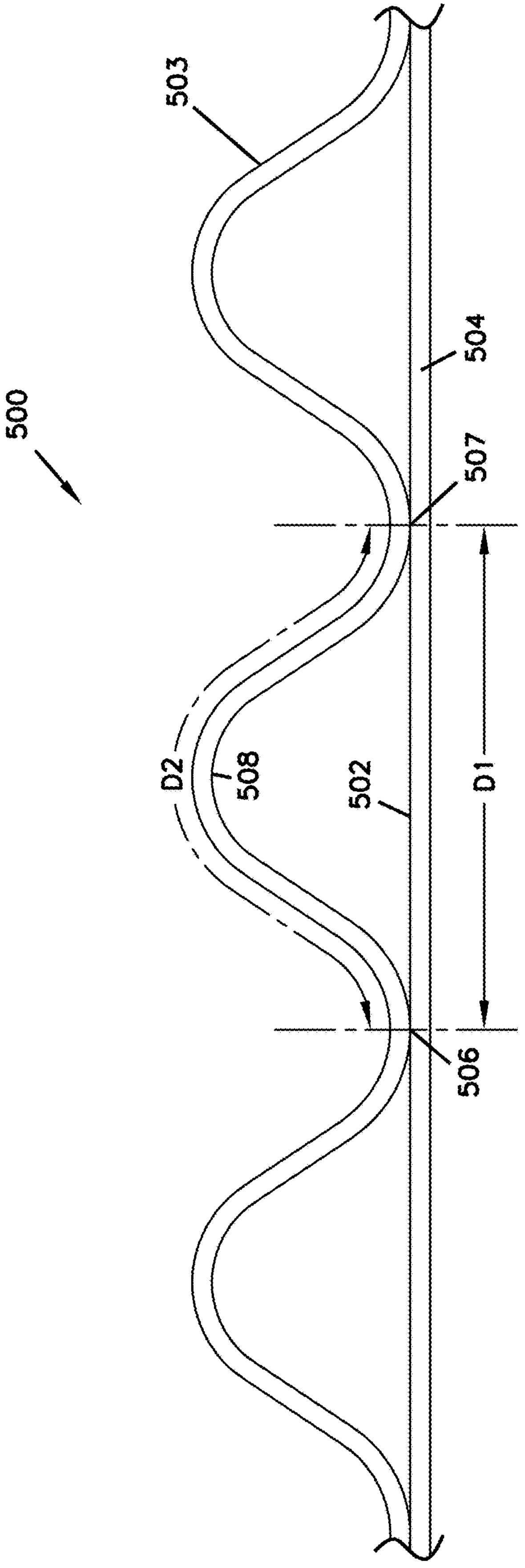
FIG. 27 is an enlarged, schematic, cross-sectional view of a portion of the media type depicted in FIG. 22.

Attention is now directed to FIG. 27, in which z-filter media; i.e., a z-filter media construction 500, utilizing a regular, curved, wave pattern corrugated sheet 503, and a non-corrugated flat sheet 504, i.e., a single facer strip is schematically depicted. The distance D1, between points 506 and 507, defines the extension of flat media 504 in region 502 underneath a given corrugated flute 508. The length D2 of the arcuate media for the corrugated flute 508, over the same distance D1 is of course larger than D1, due to the shape of the corrugated flute 508. For a typical regular shaped media used in fluted filter applications, the linear length D2 of the media 508 between points 506 and 507 will often be at least 1.2 times D1. Typically, D2 would be within a range of 1.2-2.0 times D1, inclusive. One particularly convenient arrangement for air filters has a configuration in which D2 is about 1.25-1.35×D1. Such media has, for example, been used commercially in Donaldson Powercore™ Z-filter arrangements. Another potentially convenient size would be one in which D2 is about 1.4-1.6 times D1. Herein the ratio D2/D1 will sometimes be characterized as the flute/flat ratio or media draw for the corrugated media.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Figure 28:
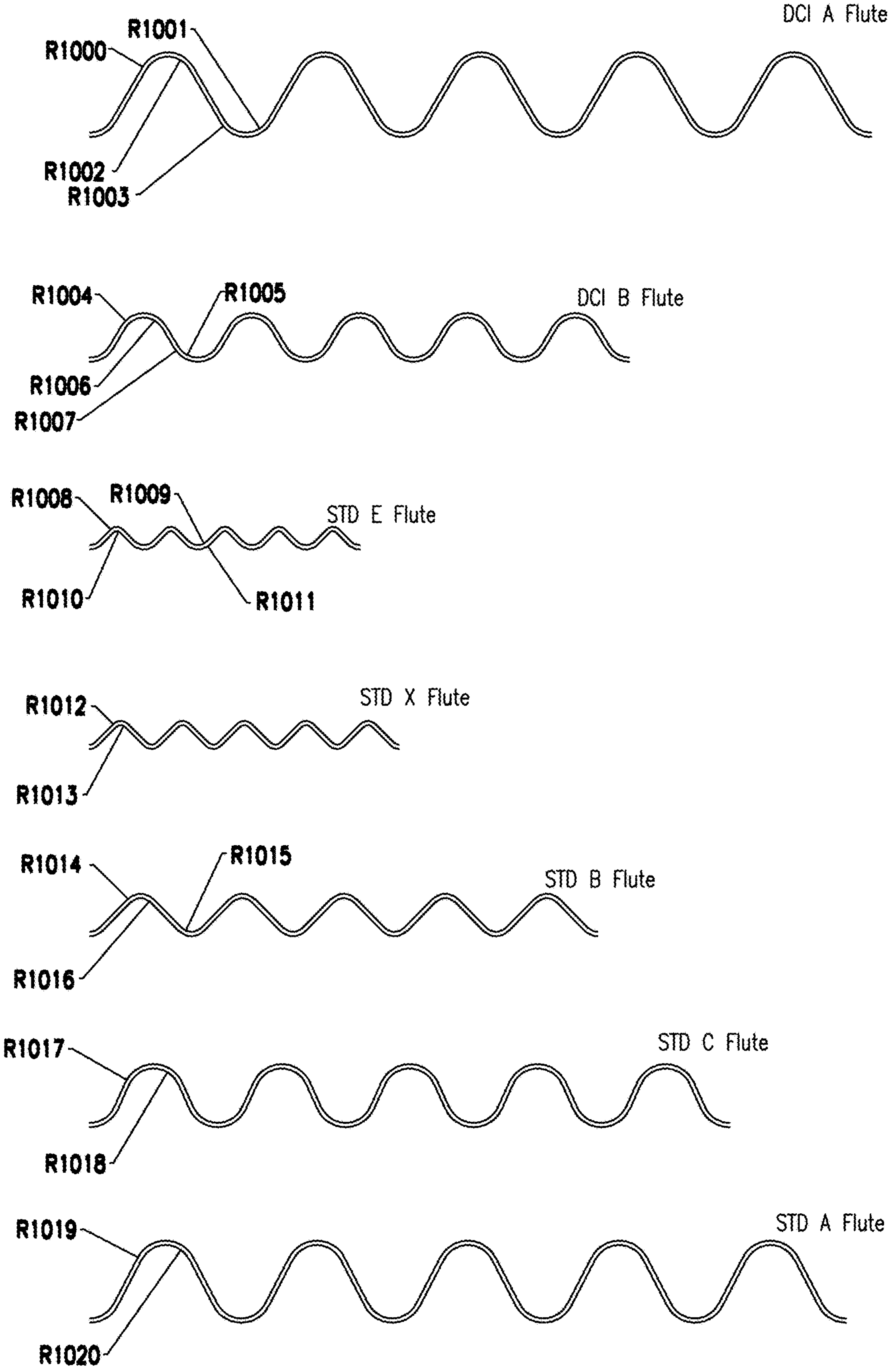
FIG. 28 includes schematic views of examples of various fluted media definitions, for media of the type of FIGS. 22 and 27.

Donaldson Company, Inc., (DCI) the assignee of the present disclosure, has used variations of the standard A and standard B flutes, in a variety of z-filter arrangements. These flutes are also defined in Table A and FIG. 28.

TABLE A

| (Flute definitions for FIG. 3) | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm); |
| Std. C Flute: | Flute/flat = 1.46:1; The Radii (R) are as follows: R1017 = .0720 inch (1.829 mm); R1018 = .0620 inch (1.575 mm); |
| Std. A Flute: | Flute/flat = 1.53:1; The Radii (R) are as follows: R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and published as US 2009/0127211; U.S. Ser. No. 12/012,785, filed Feb. 4, 2008 and published as US 2008/0282890; and/or U.S. Ser. No. 12/537,069 published as US 2010/0032365 can be used, with air cleaner features as characterized herein below. The complete disclosures of each of US 2009/0127211, US 2008/0282890 and US 2010/0032365 are incorporated herein by reference.

Another media variation comprising fluted media with facing media secured thereto, can be used in arrangements according to the present disclosure, in either a stacked or coiled form, is described in US 2014/0208705 A1, owned by Baldwin Filters, Inc., published Jul. 31, 2014, and incorporated herein by reference.

B. Manufacture of Media Pack Configurations Including the Media of FIGS. 22, 27 & 28, See FIGS. 29-32

Figure 29:
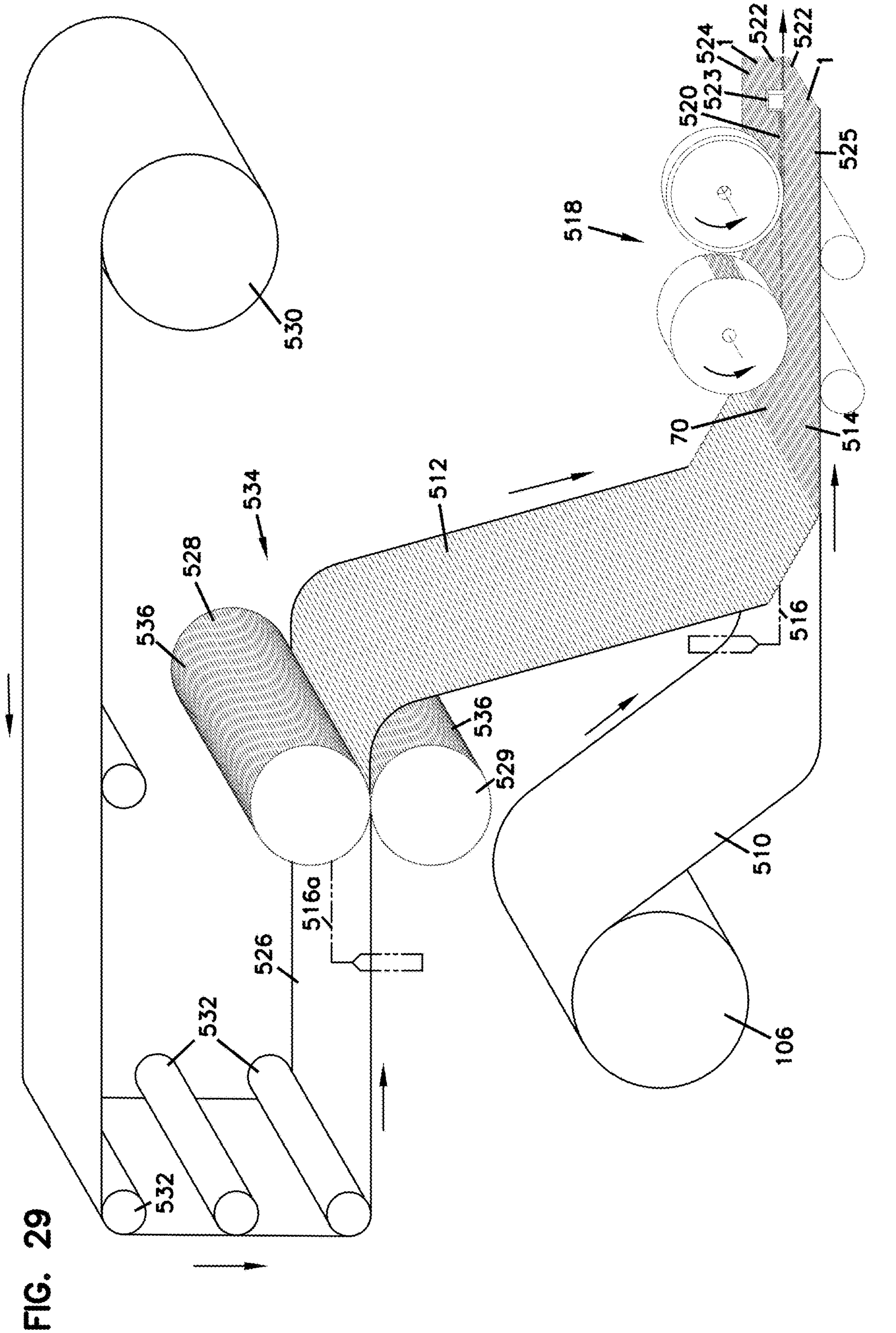
FIG. 29 is a schematic view of an example process for manufacturing media of the type of FIGS. 22, 27, and 28.

In FIG. 29, one example of a manufacturing process for making a media strip (single facer) corresponding to strip 1, FIG. 22 is shown. In general, facing sheet 510 and the fluted (corrugated) sheet 512 having flutes 514 are brought together to form a media web 515, with an adhesive bead located therebetween at 516. The adhesive bead 516 will form a single facer bead 414, FIG. 22. An optional darting process occurs at station 518 to form center darted section 520 located mid-web. The z-filter media or Z-media strip 522 can be cut or slit at 523 along the bead 516 to create two pieces or strips 524, 525 of z-filter media 522, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 29 are described in PCT WO 04/007054, published Jan. 22, 2004 incorporated herein by reference.

Still in reference to FIG. 29, before the z-filter media 522 is put through the darting station 518 and eventually slit at 523, it must be formed. In the schematic shown in FIG. 29, this is done by passing a sheet of filter media 526 through a pair of corrugation rollers 528, 529. In the schematic shown in FIG. 29, the sheet of filter media 526 is unrolled from a roll 530, wound around tension rollers 532, and then passed through a nip or bite 534 between the corrugation rollers 528, 529. The corrugation rollers 528, 529 have teeth 536 that will give the general desired shape of the corrugations after the flat sheet 526 passes through the nip 534. After passing through the nip 534, the sheet 526 becomes corrugated across the machine direction and is referenced at 512 as the corrugated sheet. The corrugated sheet 512 is then secured to facing sheet 510. (The corrugation process may involve heating the media, in some instances.)

Still in reference to FIG. 29, the process also shows the facing sheet 510 being routed to the darting process station 518. The facing sheet 510 is depicted as being stored on a roll 106 and then directed to the corrugated sheet 512 to form the Z-media 522. The corrugated sheet 512 and the facing sheet 510 would typically be secured together by adhesive or by other means (for example by sonic welding).

Referring to FIG. 29, an adhesive line 516 is shown used to secure corrugated sheet 512 and facing sheet 510 together, as the sealant bead. Alternatively, the sealant bead for forming the facing bead could be applied as shown as 516*a*. If the sealant is applied at 516*a*, it may be desirable to put a gap in the corrugation roller 529, and possibly in both corrugation rollers 528, 529, to accommodate the bead 516*a*.

Of course the equipment of FIG. 29 can be modified to provide for the tack beads 20, FIG. 22, if desired.

The type of corrugation provided to the corrugated media is a matter of choice, and will be dictated by the corrugation or corrugation teeth of the corrugation rollers 528, 529. One useful corrugation pattern will be a regular curved wave pattern corrugation, of straight flutes or ridges, as defined herein above. A typical regular curved wave pattern used, would be one in which the distance D2, as defined above, in a corrugated pattern is at least 1.2 times the distance D1 as defined above. In example applications, typically D2=1.25-1.35×D1, although alternatives are possible. In some instances the techniques may be applied with curved wave patterns that are not "regular," including, for example, ones that do not use straight flutes. Also, variations from the curved wave patterns shown, are possible.

Figure 30:
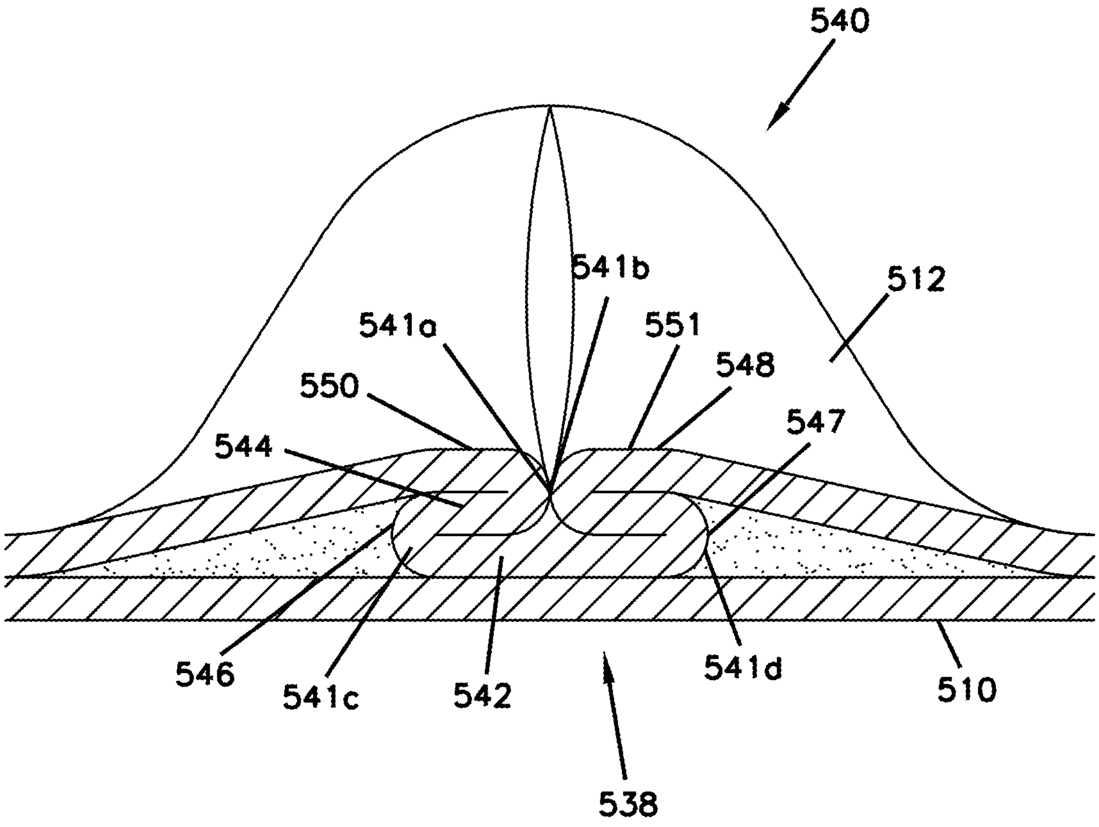
FIG. 30 is a schematic cross-sectional view of an optional end dart for media flutes of the type of FIGS. 22 and 27-29.

As described, the process shown in FIG. 29 can be used to create the center darted section 520. FIG. 30 shows, in cross-section, one of the flutes 514 after darting and slitting.

A fold arrangement 538 can be seen to form a darted flute 540 with four creases 541*a*, 541*b*, 541*c*, 541*d*. The fold arrangement 538 includes a flat first layer or portion 542 that is secured to the facing sheet 510. A second layer or portion 544 is shown pressed against the first layer or portion 542. The second layer or portion 544 is preferably formed from folding opposite outer ends 546, 547 of the first layer or portion 542.

Still referring to FIG. 30, two of the folds or creases 541*a*, 541*b* will generally be referred to herein as "upper, inwardly directed" folds or creases. The term "upper" in this context is meant to indicate that the creases lie on an upper portion of the entire fold 540, when the fold 540 is viewed in the orientation of FIG. 30. The term "inwardly directed" is meant to refer to the fact that the fold line or crease line of each crease 541*a*, 541*b*, is directed toward the other.

In FIG. 30, creases 541*c*, 541*d*, will generally be referred to herein as "lower, outwardly directed" creases. The term "lower" in this context refers to the fact that the creases 541*c*, 541*d* are not located on the top as are creases 541*a*, 541*b*, in the orientation of FIG. 30. The term "outwardly directed" is meant to indicate that the fold lines of the creases 541*c*, 541*d* are directed away from one another.

The terms "upper" and "lower" as used in this context are meant specifically to refer to the fold 540, when viewed from the orientation of FIG. 30. That is, they are not meant to be otherwise indicative of direction when the fold 540 is oriented in an actual product for use.

Based upon these characterizations and review of FIG. 30, it can be seen that a regular fold arrangement 538 according to FIG. 30 in this disclosure is one which includes at least two "upper, inwardly directed, creases." These inwardly directed creases are unique and help provide an overall arrangement in which the folding does not cause a significant encroachment on adjacent flutes.

A third layer or portion 548 can also be seen pressed against the second layer or portion 544. The third layer or portion 548 is formed by folding from opposite inner ends 550, 551 of the third layer 548.

Another way of viewing the fold arrangement 538 is in reference to the geometry of alternating ridges and troughs of the corrugated sheet 512. The first layer or portion 542 is formed from an inverted ridge. The second layer or portion 544 corresponds to a double peak (after inverting the ridge) that is folded toward, and in preferred arrangements, folded against the inverted ridge.

Techniques for providing the optional dart described in connection with FIG. 30, in a preferred manner, are described in PCT WO 04/007054, incorporated herein by reference. Techniques for coiling the media, with application of the winding bead, are described in PCT application US 04/07927, filed Mar. 17, 2004 and published as WO 04/082795 and incorporated herein by reference.

Alternate approaches to darting the fluted ends closed are possible. Such approaches can involve, for example: darting which is not centered in each flute; and, rolling, pressing or folding over the various flutes. In general, darting involves folding or otherwise manipulating media adjacent to fluted end, to accomplish a compressed, closed, state.

Techniques described herein are particularly well adapted for use in media packs that result from a step of coiling a single sheet comprising a corrugated sheet/facing sheet combination, i.e., a "single facer" strip. However, they can also be made into stacked arrangements.

Coiled media or media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media or media pack. Typical shapes are circular as described in PCT WO 04/007054. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054, and PCT application US 04/07927, published as WO 04/082795, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media or media pack can be provided with a variety of different definitions. In many arrangements, the ends or end faces are generally flat (planer) and perpendicular to one another. In other arrangements, one or both of the end faces include tapered, for example, stepped, portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 31:
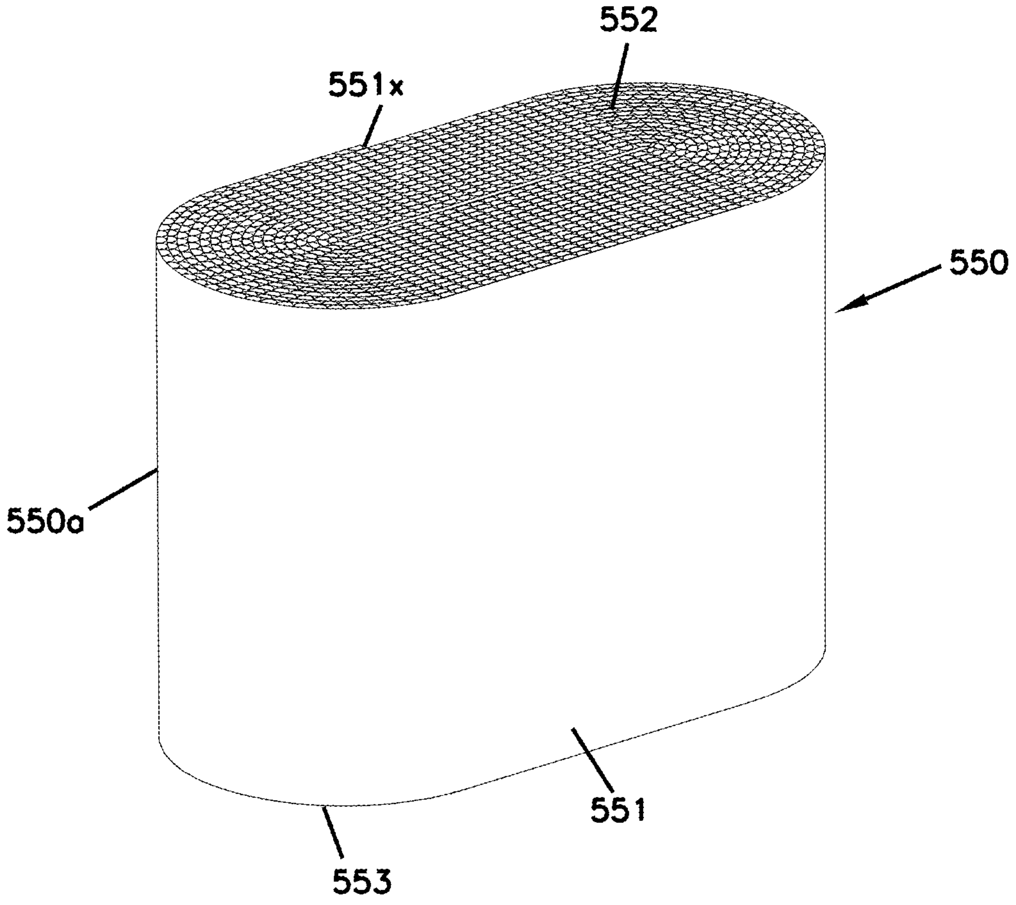
FIG. 31 is a schematic perspective view of a coiled filter arrangement usable in a filter cartridge having features in accord with the present disclosure, and made with a strip of media for example in accord with FIG. 22.

In FIG. 31, a coiled media pack (or coiled media) 550 constructed by coiling a single strip of single faced media is depicted, generally. The particular coiled media pack depicted is an oval media pack 550*a*, specifically a racetrack shaped media pack 551. The tail end of the media, at the outside of the media pack 550 is shown at 551*x*. It will be typical to terminate that tail end along straight section of the media pack 550 for convenience and sealing. Typically, a hot melt seal bead or seal bead is positioned along that tail end to ensure sealing. In the media pack 550, the opposite flow (end) faces are designated at 552, 553. One would be an inlet flow face, the other an outlet flow face.

Figure 6:
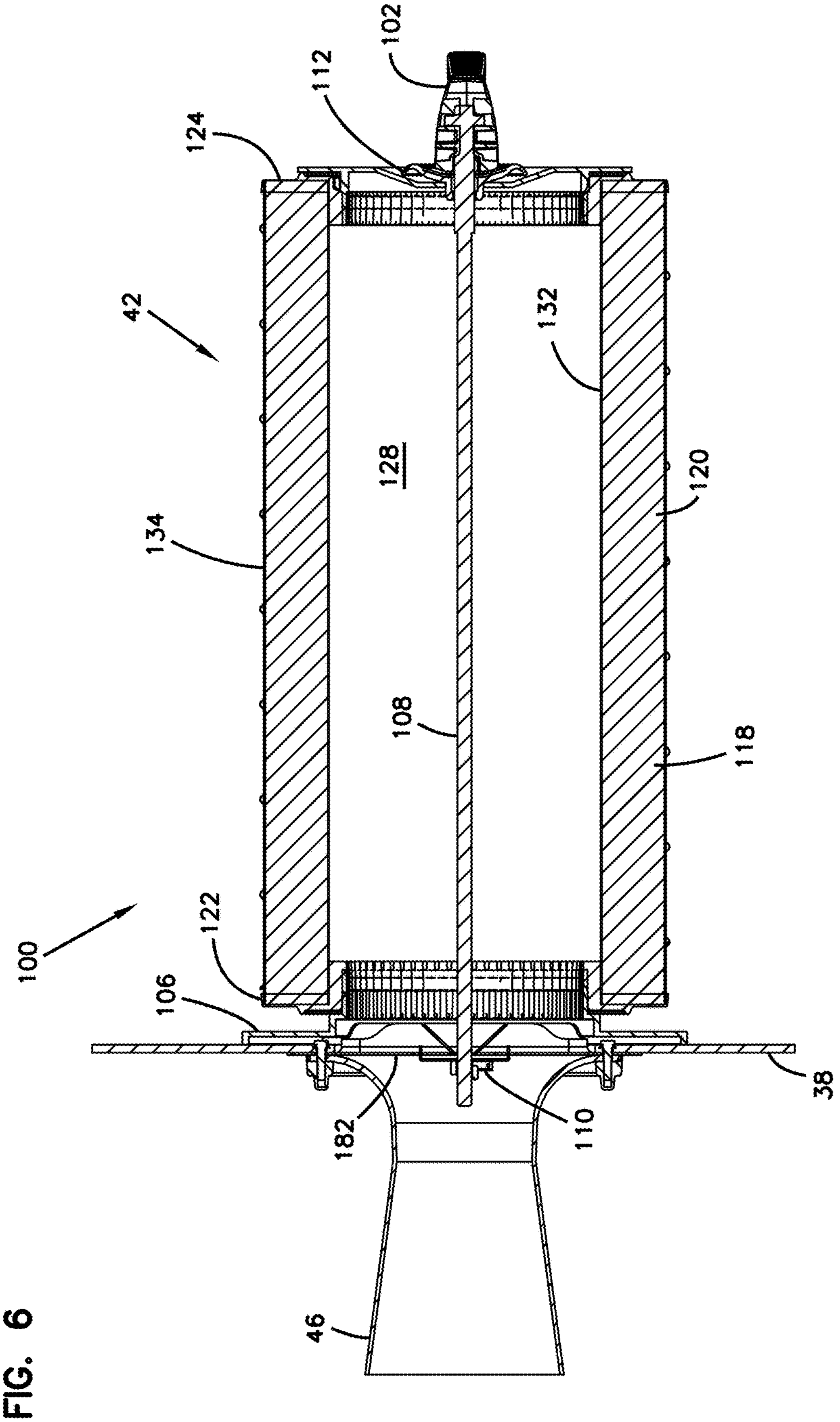
FIG. 6 is a cross-sectional view of a first embodiment of the filter assembly of FIG. 2, the cross section being taken along the line A-A of FIG. 5.
Figure 32:
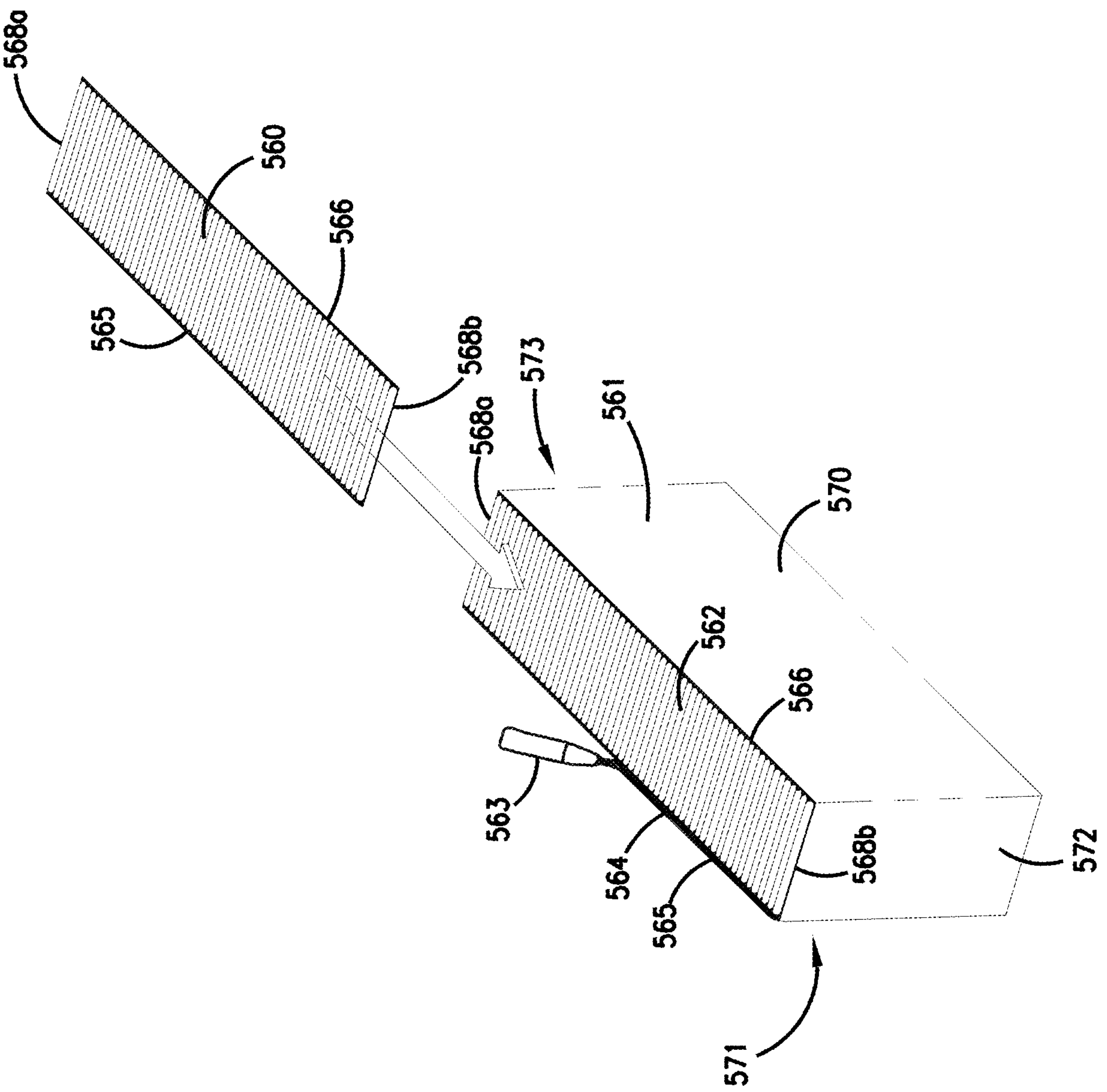
FIG. 32 is a schematic perspective view of a stacked media pack arrangement usable in a filter arrangement having selected features in accord with the present disclosure and made from a strip of media for example in accord with FIG. 22.

In FIG. 32, there is (schematically) shown a step of forming stacked z-filter media (or media pack) from strips of z-filter media, each strip being a fluted sheet secured to a facing sheet. Referring to FIG. 6, single facer strip 560 is being shown added to a stack 561 of strips 562 analogous to strip 560. Strip 560 can be cut from either of strips 524, 525, FIG. 29. At 563, FIG. 31, application of a stacking bead 564 is shown, between each layer corresponding to a strip 560, 562 at an opposite edge from the single facer bead or seal. (Stacking can also be done with each layer being added to the bottom of the stack, as opposed to the top.)

Referring to FIG. 32, each strip 560, 562 has front and rear edges 565, 566 and opposite side edges 568*a*, 568*b*. Inlet and outlet flutes of the corrugated sheet/facing sheet combination comprising each strip 560, 562 generally extend between the front and rear edges 207, 566, and parallel to side edges 568*a*, 568*b*.

Still referring to FIG. 32, in the media or media pack 561 being formed, opposite flow faces are indicated at 570, 571. The selection of which one of faces 570, 571 is the inlet end face and which is the outlet end face, during filtering, is a matter of choice. In some instances the stacking bead 564 is positioned adjacent the upstream or inlet face 571; in others the opposite is true. The flow faces 570, 571, extend between opposite side faces 572, 573.

The stacked media configuration or pack 561 shown being formed in FIG. 32, is sometimes referred to herein as a "blocked" stacked media pack. The term "blocked" in this context, is an indication that the arrangement is formed to a rectangular block in which all faces are 90° relative to all adjoining wall faces. For example, in some instances the stack can be created with each strip 560 being slightly offset from alignment with an adjacent strip, to create a parallelogram or slanted block shape, with the inlet face and outlet face parallel to one another, but not perpendicular to upper and bottom surfaces.

In some instances, the media or media pack will be referenced as having a parallelogram shape in any cross-section, meaning that any two opposite side faces extend generally parallel to one another.

It is noted that a blocked, stacked arrangement corresponding to FIG. 32 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003 and published as 2004/0187689. Each of these latter references is incorporated herein by reference. It is noted that a stacked arrangement shown in U.S. Ser. No. 10/731,504, published as 2005/0130508 is a slanted stacked arrangement.

It is also noted that, in some instances, more than one stack can be incorporated into a single media pack. Also, in some instances, the stack can be generated with one or more flow faces that have a recess therein, for example, as shown in U.S. Pat. No. 7,625,419 incorporated herein by reference.

Figure 33:
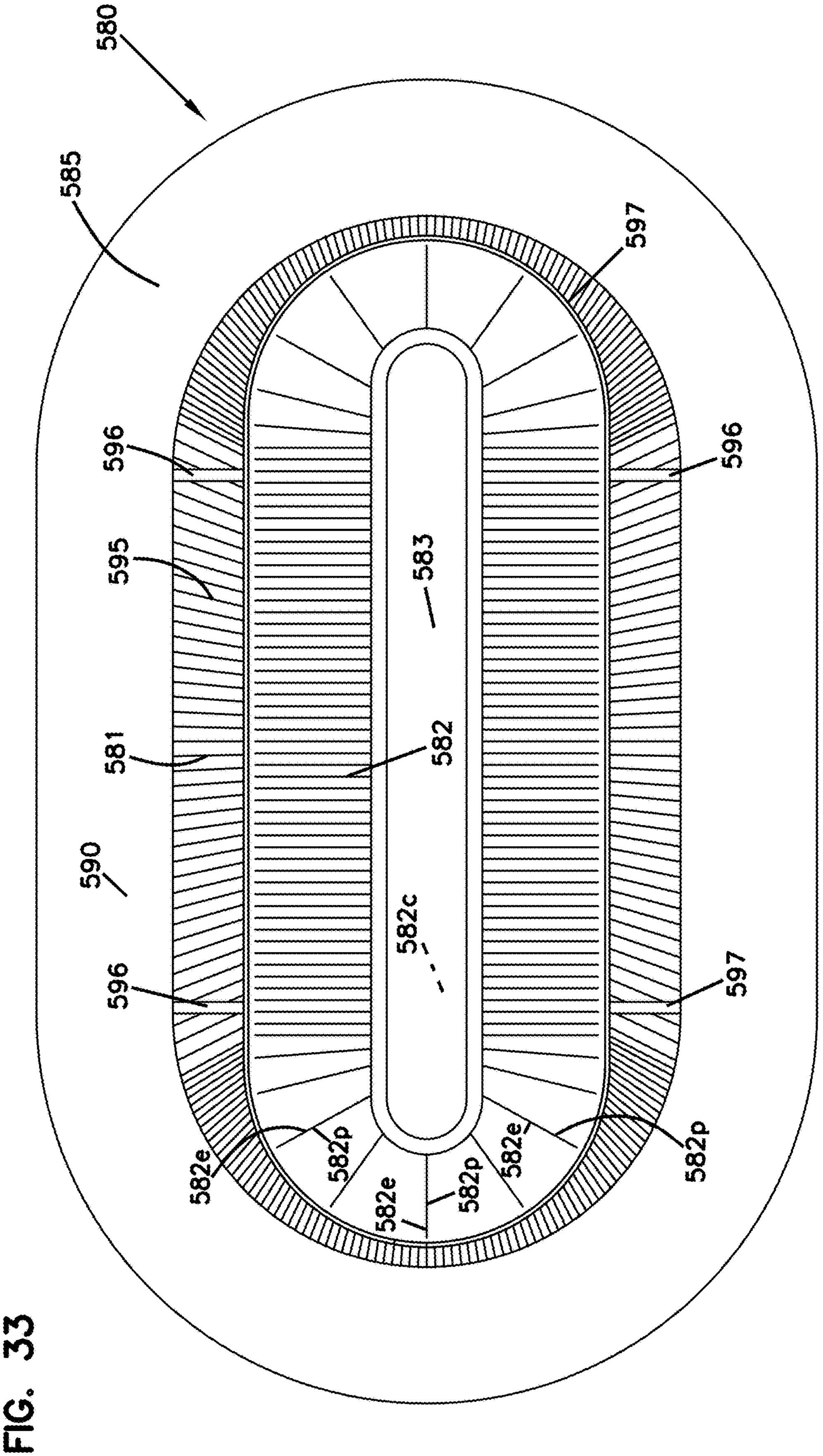
FIG. 33 is a schematic flow end view of a filter media pack using an alternate media to the media of FIG. 22, and alternately usable in selected filter cartridges in accord with the present disclosure.
Figure 34:
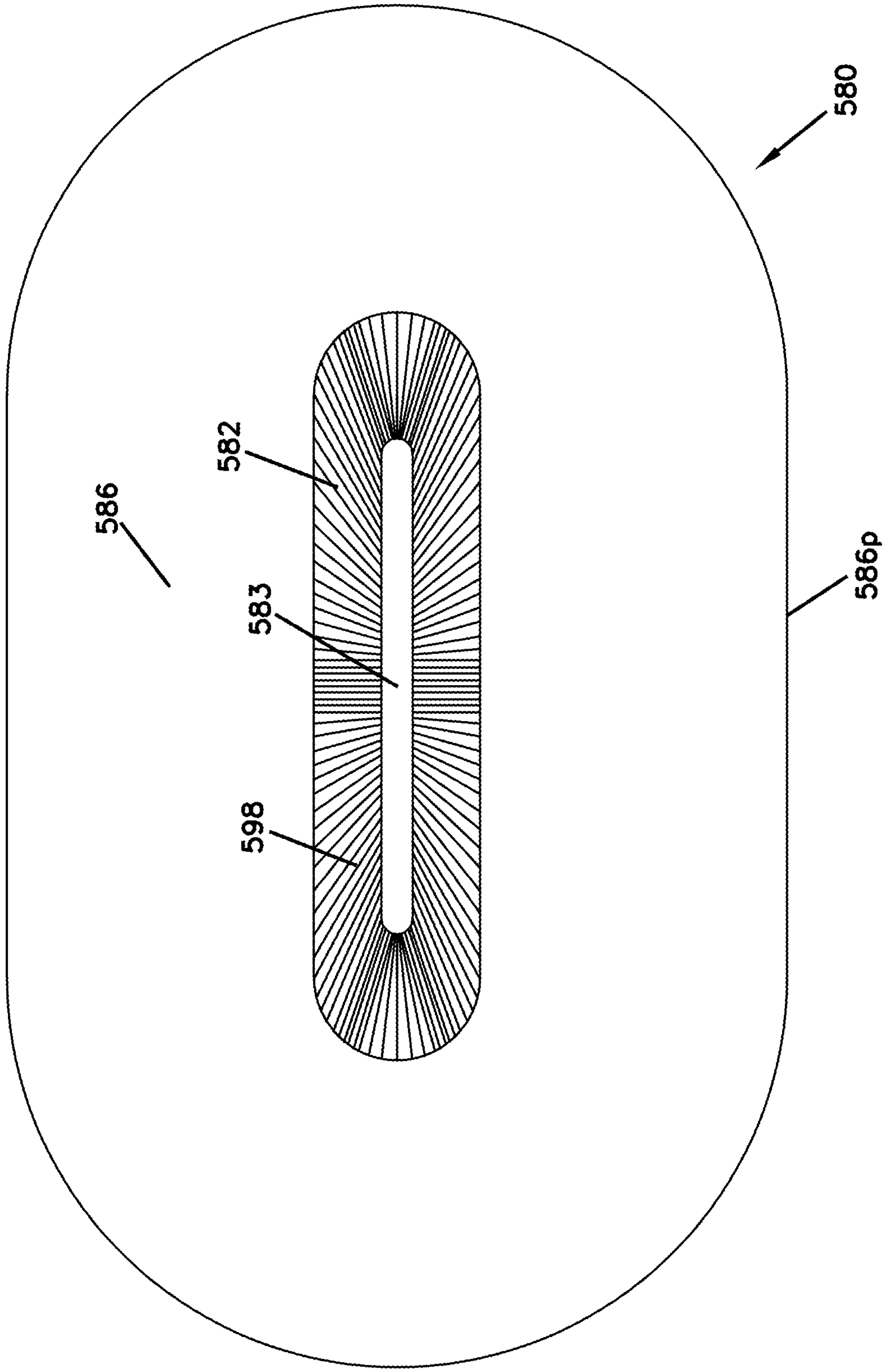
FIG. 34 is a schematic opposite flow end view to the view of FIG. 33.
Figure 35:
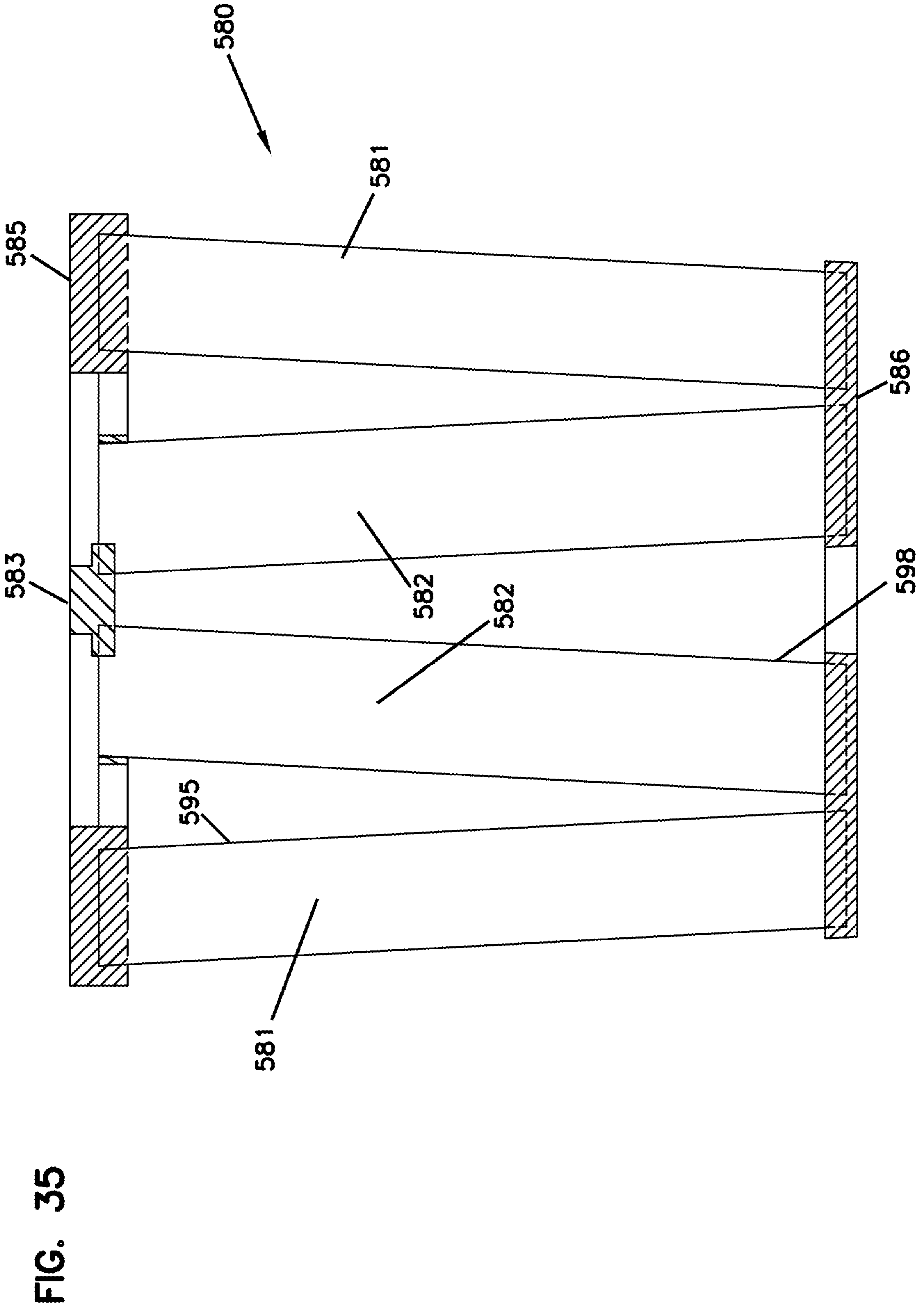
FIG. 35 is a schematic cross-sectional view of the media pack of FIGS. 33 and 34.

C. Selected Media or Media Pack Arrangements Comprising Multiple Spaced Coils of Fluted Media; FIGS. 33-35

Alternate types of media arrangements or packs that involve flutes between opposite ends extending between can be used with selected principles according to the present disclosure. An example of such alternate media arrangement or pack is depicted in FIGS. 33-35. The media of FIGS. 33-35 is analogous to one depicted and described in DE 20 2008 017 059 U1; and as can sometimes found in arrangements available under the mark "IQORON" from Mann & Hummel.

Referring to FIG. 33, the media or media pack is indicated generally at 580. The media or media pack 580 comprises a first outer pleated (ridged) media loop 581 and a second, inner, pleated (ridged) media loop 582, each with pleat tips (or ridges) extending between opposite flow ends. The view of FIG. 33 is toward a media pack (flow) end 585. The end 585 depicted, can be an inlet (flow) end or an outlet (flow) end, depending on selected flow direction. For many arrangements using principles characterized having the media pack 580 would be configured in a filter cartridge such that end 585 is an inlet flow end.

Still referring to FIG. 33, the outer pleated (ridged) media loop 581 is configured in an oval shape, though alternatives are possible. At 590, a pleat end closure, for example molded in place, is depicted closing ends of the pleats or ridges 581 at media pack end 585.

Pleats, or ridges 582 (and the related pleat tips) are positioned surrounded by and spaced from loop 581, and thus pleated media loop 582 is also depicted in a somewhat oval configuration. In this instance, ends 582*e* of individual pleats or ridges 582*p* in a loop 582 are sealed closed. Also, loop 582 surrounds the center 582*c* that is closed by a center strip 583 of material, typically molded-in-place.

During filtering, when end 585 is an inlet flow end, air enters gap 595 between the two loops of media 581, 582. The air then flows either through loop 581 or loop 582, as it moves through the media pack 580, with filtering.

In the example depicted, loop 581 is configured slanting inwardly toward loop 582, in extension away from end 585. Also spacers 596 are shown supporting a centering ring 597 that surrounds an end of the loop 582, for structural integrity.

In FIG. 34, an end 586 of the cartridge 580, opposite end 585 is viewable. Here, an interior of loop 582 can be seen, surrounding an open gas flow region 598. When air is directed through cartridge 580 in a general direction toward end 586 and away from end 585, the portion of the air that passes through loop 582 will enter central region 598 and exit therefrom at end 586. Of course air that has entered media loop 581, FIG. 33 during filtering would generally pass around (over) an outer perimeter 586*p* of end 586.

In FIG. 35 a schematic cross sectional view of cartridge 580 is provided. Selected identified and described features are indicated by like reference numerals It will be understood from a review of FIGS. 33-35, the above description, that the cartridge 580 described, is generally a cartridge which has media tips extending in a longitudinal direction between opposite flow ends 585, 586.

In the arrangement of FIGS. 33-35, the media pack 580 is depicted with an oval, in particular racetrack, shaped perimeter. It is depicted in this manner, since the air filter cartridges in many examples below also have an oval or racetrack shaped configuration. However, the principles can be embodied in a variety of alternate peripheral shapes.

D. Other Media Variations, FIGS. 36-43

Herein, in FIGS. 36-43, some schematic, fragmentary, cross-sectional views are provided of still further alternate variations of media types that can be used in selected applications of the principles characterized herein. Certain examples are described in U.S. Ser. No. 62/077,749, filed Nov. 10, 2014 and owned by the Assignee of the present disclosure, Donaldson Company, Inc. In general, each of the arrangements of FIGS. 36-43 represents a media type that can be stacked or coiled into an arrangement that has opposite inlet and outlet flow ends (or faces), with straight through flow.

Figure 36:
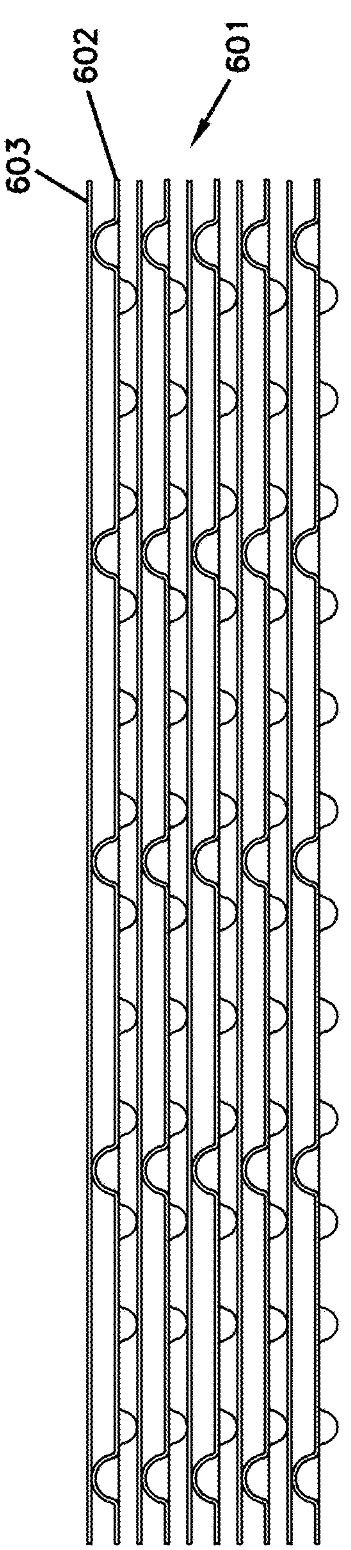
FIG. 36 is a schematic, fragmentary, cross-sectional view of a further alternate media type usable in a media pack of a filter cartridge having features in accord with the present disclosure.

In FIG. 36, an example media arrangement 601 from U.S. Ser. No. 62/077,749 (2658) is depicted, in which an embossed sheet 602 is secured to a non-embossed sheet 603, then stacked and coiled into a media pack, with seals along opposite edges of the type previously described for FIG. 22 herein.

Figure 37:
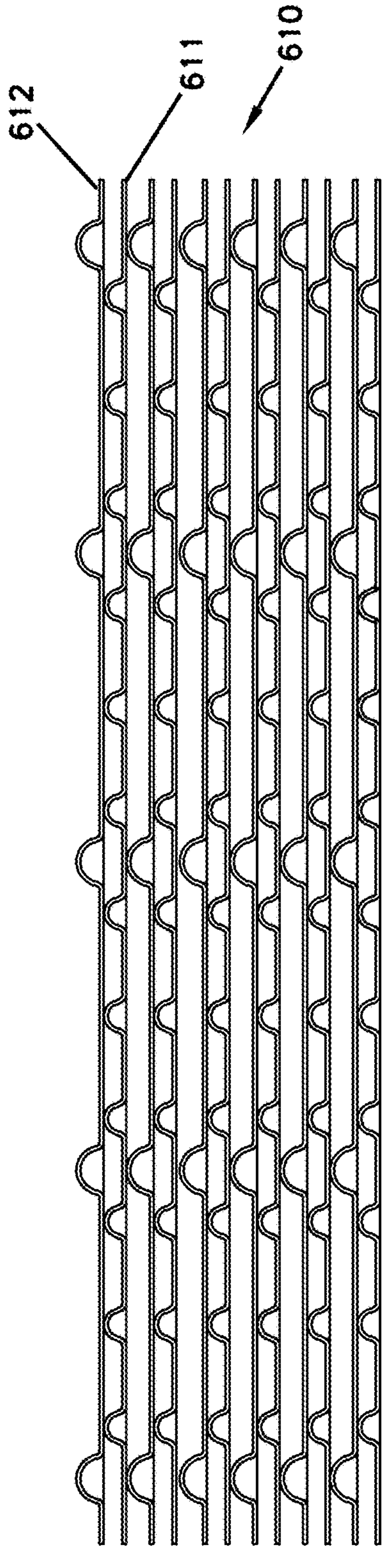
FIG. 37 is a schematic, fragmentary cross-sectional view, of a first variation of the media type of FIG. 36.

In FIG. 37, an alternate example media pack 610 from U.S. Ser. No. 62/077,749 is depicted, in which a first embossed sheet 611 is secured to a second embossed sheet 612 and then formed into a stacked or coiled media pack arrangement, having edge seals generally in accord with FIG. 22 herein.

Figure 38:
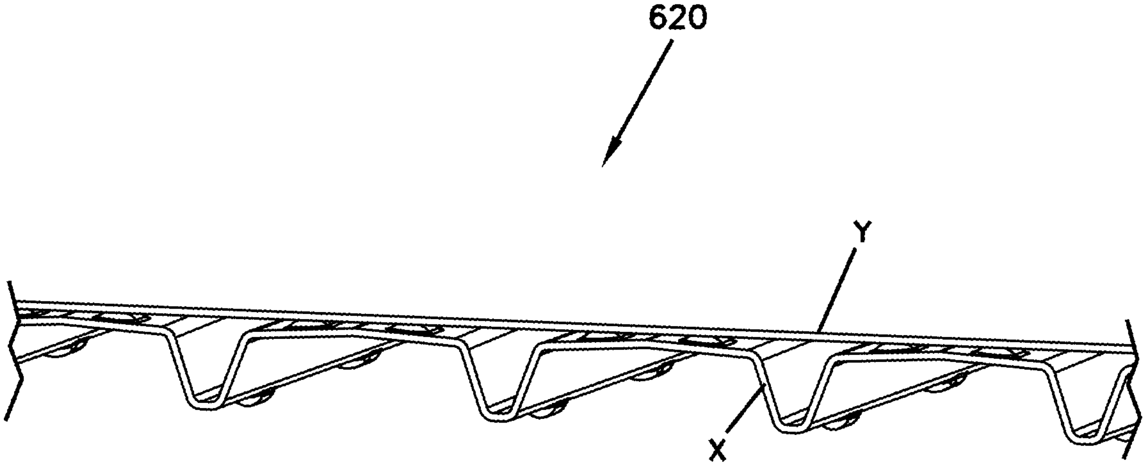
FIG. 38 is a schematic fragmentary depiction of another usable fluted sheet/facing sheet combination in accord with the present disclosure.
Figure 39:
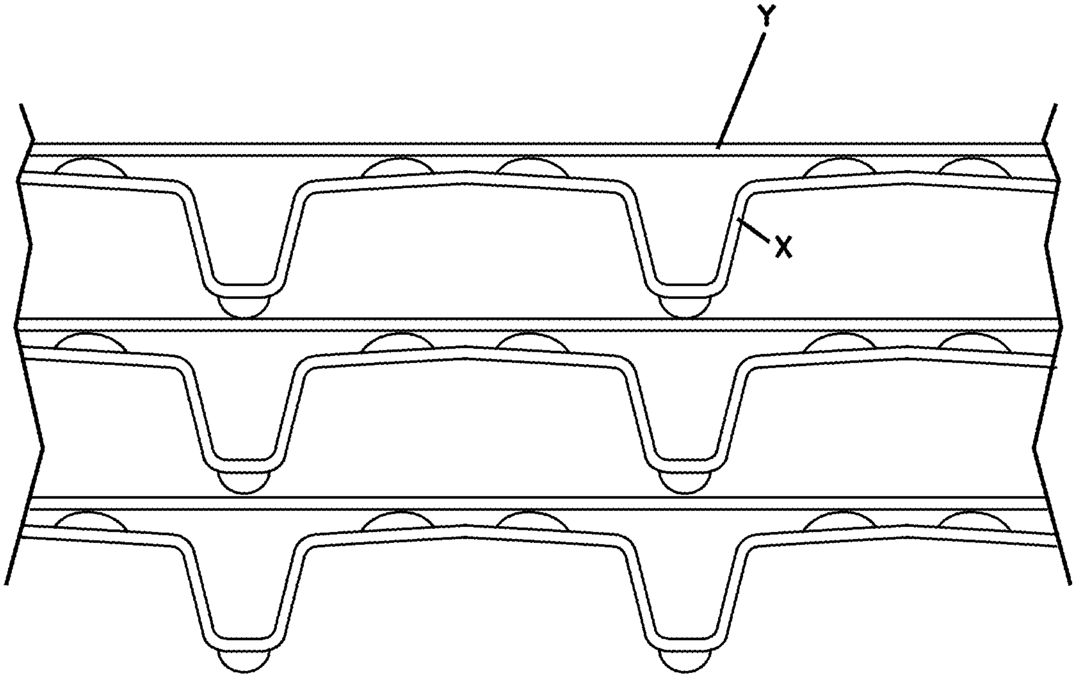
FIG. 39 is a fragmentary second schematic view of the type of media in FIG. 38 shown in a media pack.
Figure 40:
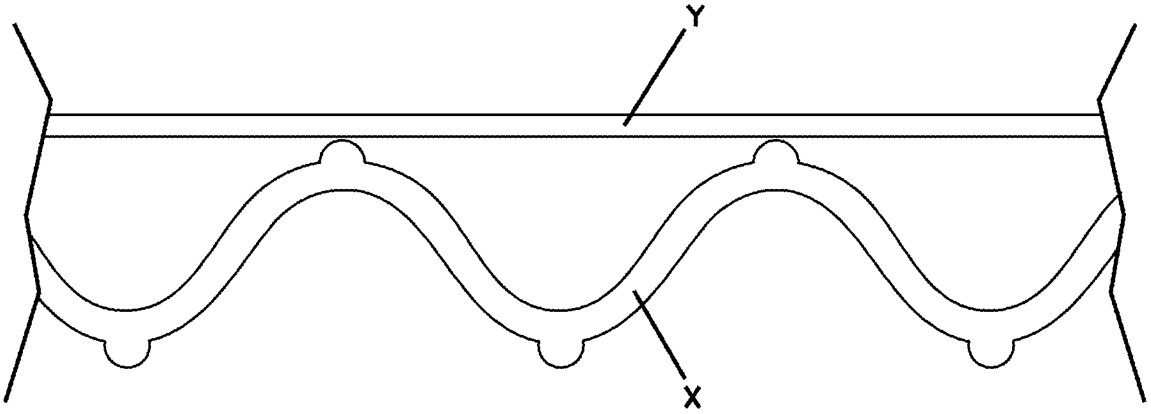
FIG. 40 is a schematic, fragmentary, plan view of still another media variation usable in arrangements according to the present disclosure.

In FIG. 38-40, a third example media arrangement 620 from U.S. Ser. No. 62/077,749 is depicted. Edge seals can be conducted in either the upstream end or the downstream end, or in some instances both. Especially when the media is likely to encounter chemical material during filtering, it may be desirable to avoid a typical adhesive or sealant.

In FIG. 38, a cross-section is depicted in which the fluted sheet X has various embossments on it for engagement with the facing sheet Y. Again these can be separate, or sections of the same media sheet.

In FIG. 39, a schematic depiction of such an arrangement between the fluted sheet X and facing sheet Y is also shown.

In FIG. 40, a still further variation of such a principle is shown between a fluted sheet X and a facing sheet Y. These are meant to help understand how a wide variety of approaches are possible.

Figure 41:
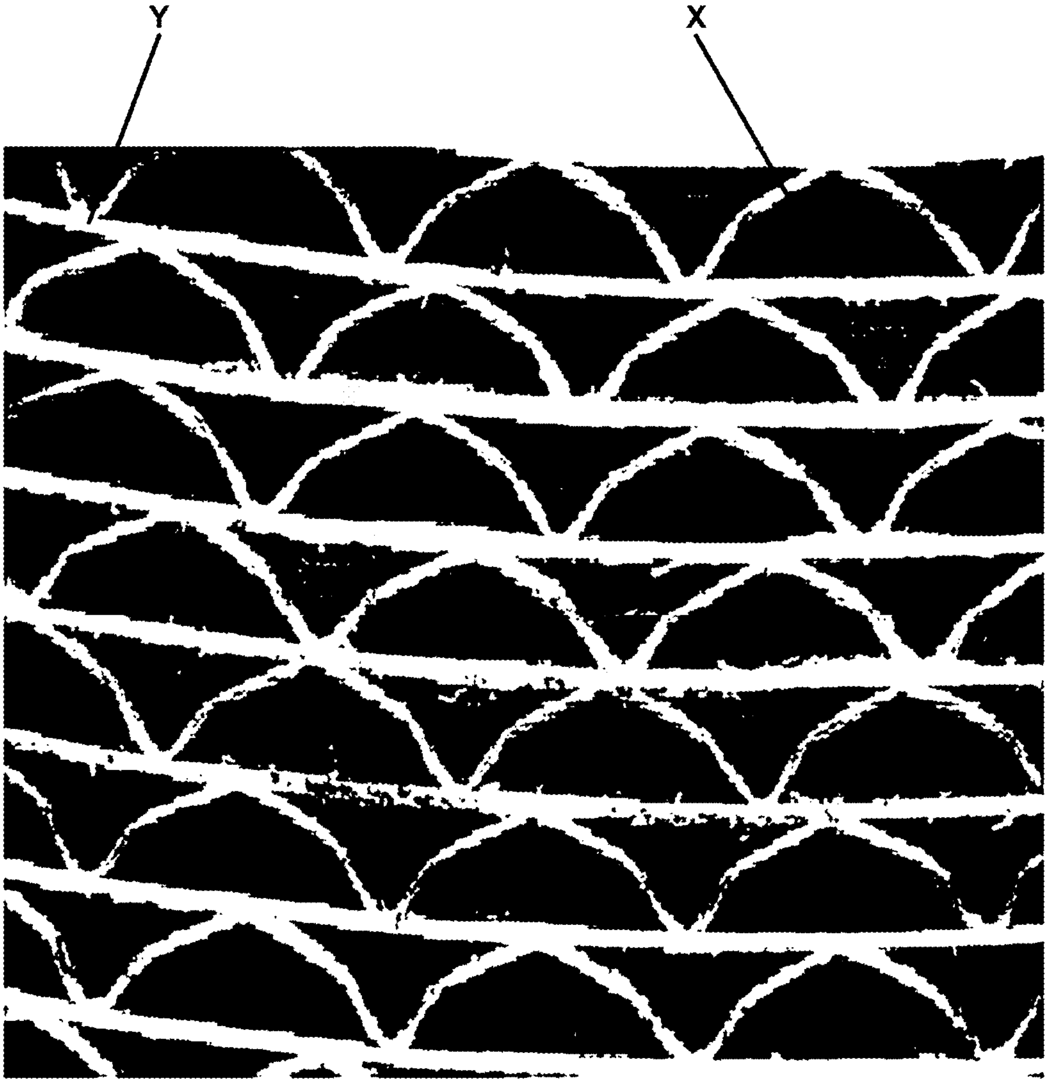
FIG. 41 is a schematic view of another variation of usable media in accord with the present disclosure.
Figure 42:
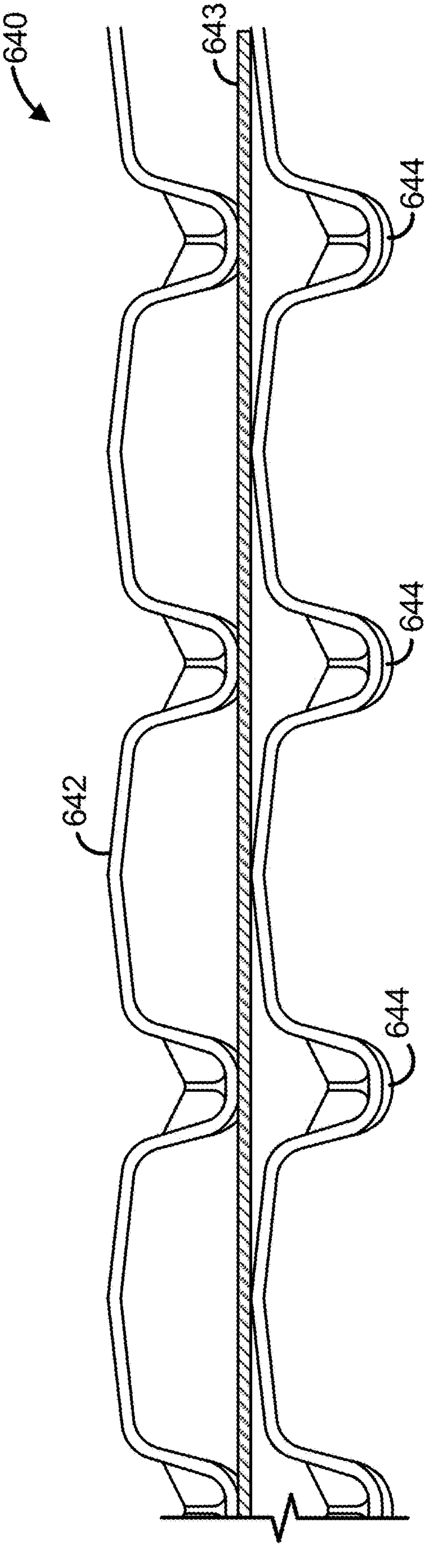
FIG. 42 is a schematic depiction of another usable fluted sheet/facing sheet combination in accord with the present disclosure.
Figure 43:
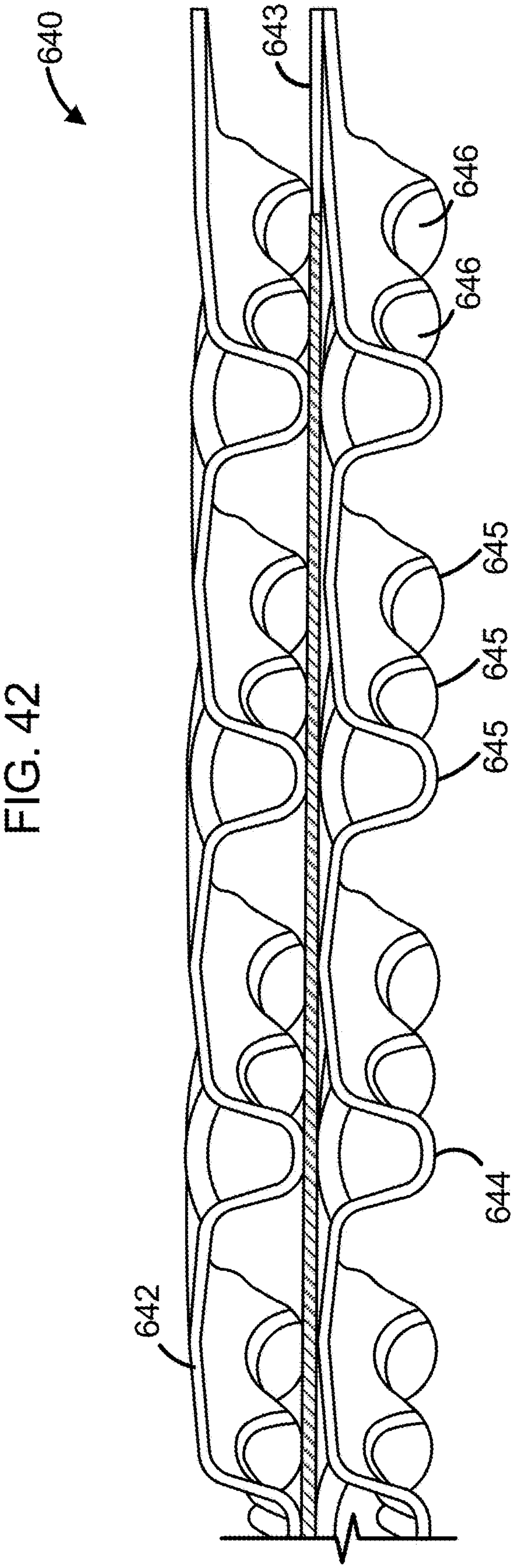
FIG. 43 is a perspective view of a portion of the usable fluted sheet/facing sheet combination depicted in FIG. 42.

In FIG. 41-43, still another possible variation in fluted sheet X and facing sheet Y is shown.

In FIGS. 41-43, an example media arrangement 640 is depicted, in which a fluted sheet 642 is secured to a facing sheet 643. The facing sheet 643 may be a flat sheet. The media arrangement 6401 can then be stacked or coiled into a media pack, with seals along opposite edges of the type previously described for FIG. 22 herein. In the embodiment shown, the flutes 644 of fluted sheet 642 have an undulating ridgeline including a series of peaks 645 and saddles 646. The peaks 645 of adjacent flutes 644 can be either aligned as shown in FIGS. 42 and 43 or offset. Further the peak height and/or density can increase, decrease, or remain constant along the length of the flutes 644. The ratio of the peak flute height to saddle flute height can vary from about 1.5, typically from 1.1 to about 1.

It is noted that there is no specific requirement that the same media be used for the fluted sheet section and the facing sheet section. A different media can be desirable in each, to obtain different effects. For example, one may be a cellulose media, while the other is a media containing some non-cellulose fiber. They may be provided with different porosity or different structural characteristics, to achieve desired results.

A variety of materials can be used. For example, the fluted sheet section or the facing sheet section can include a cellulose material, synthetic material, or a mixture thereof. In some embodiments, one of the fluted sheet section and the facing sheet section includes a cellulose material and the other of the fluted sheet section and facing sheet section includes a synthetic material.

Synthetic material(s) can include polymeric fibers, such as polyolefin, polyamide, polyester, polyvinyl chloride, polyvinyl alcohol (of various degrees of hydrolysis), and polyvinyl acetate fibers. Suitable synthetic fibers include, for example, polyethylene terephthalate, polyethylene, polypropylene, nylon, and rayon fibers. Other suitable synthetic fibers include those made from thermoplastic polymers, cellulosic and other fibers coated with thermoplastic polymers, and multi-component fibers in which at least one of the components includes a thermoplastic polymer. Single and multi-component fibers can be manufactured from polyester, polyethylene, polypropylene, and other conventional thermoplastic fibrous materials.

The examples of FIGS. 36-43, are meant to indicate generally that a variety alternate media packs can be used in accord with the principles herein. Attention is also directed to U.S. Ser. No. 62/077,749 incorporated herein by reference, with respect to the general principles of construction and application of some alternates media types.

Figure 44:
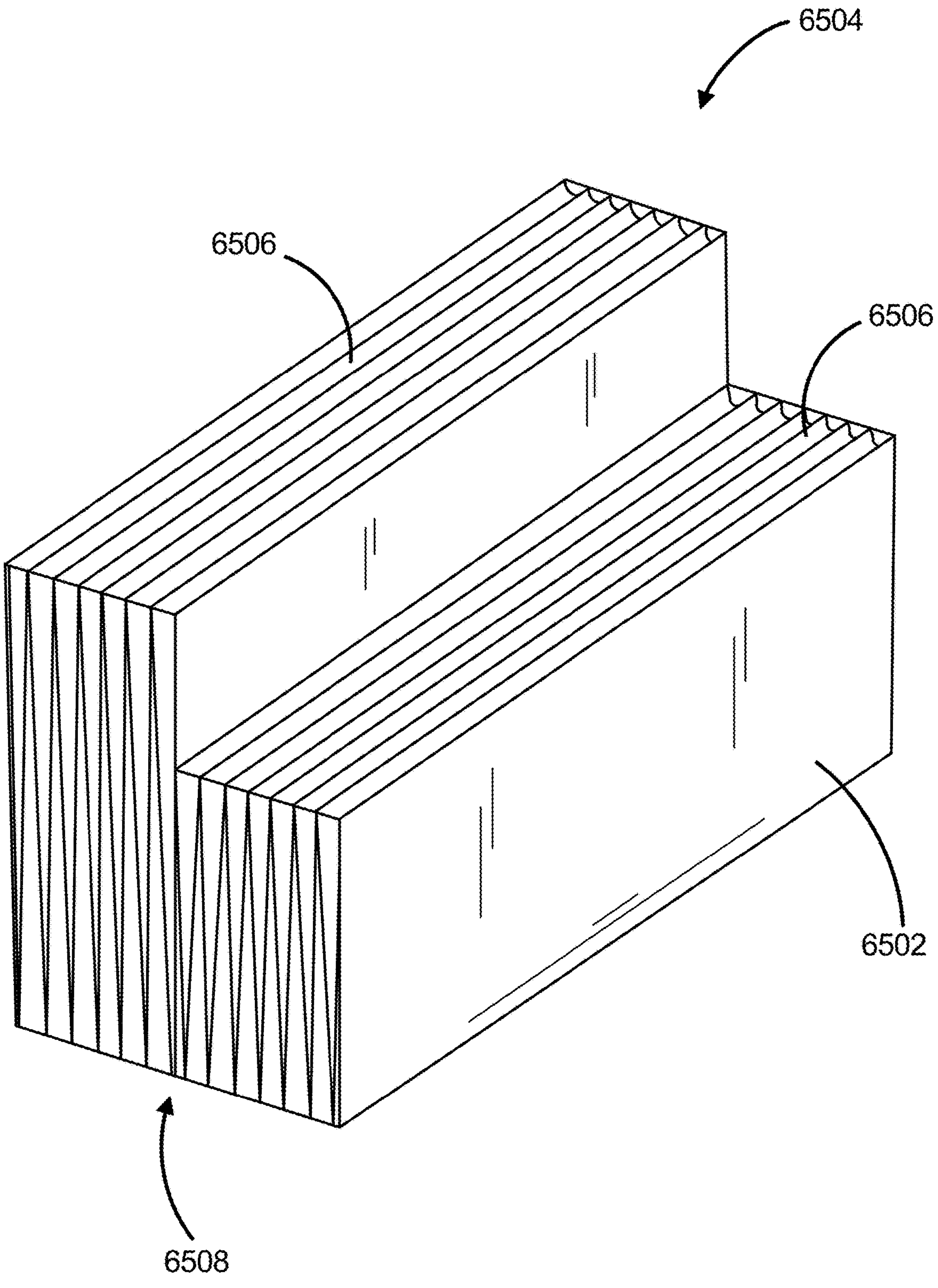
FIG. 44 is a perspective view of another media variation useable in arrangements according to the present disclosure.
Figure 45A:
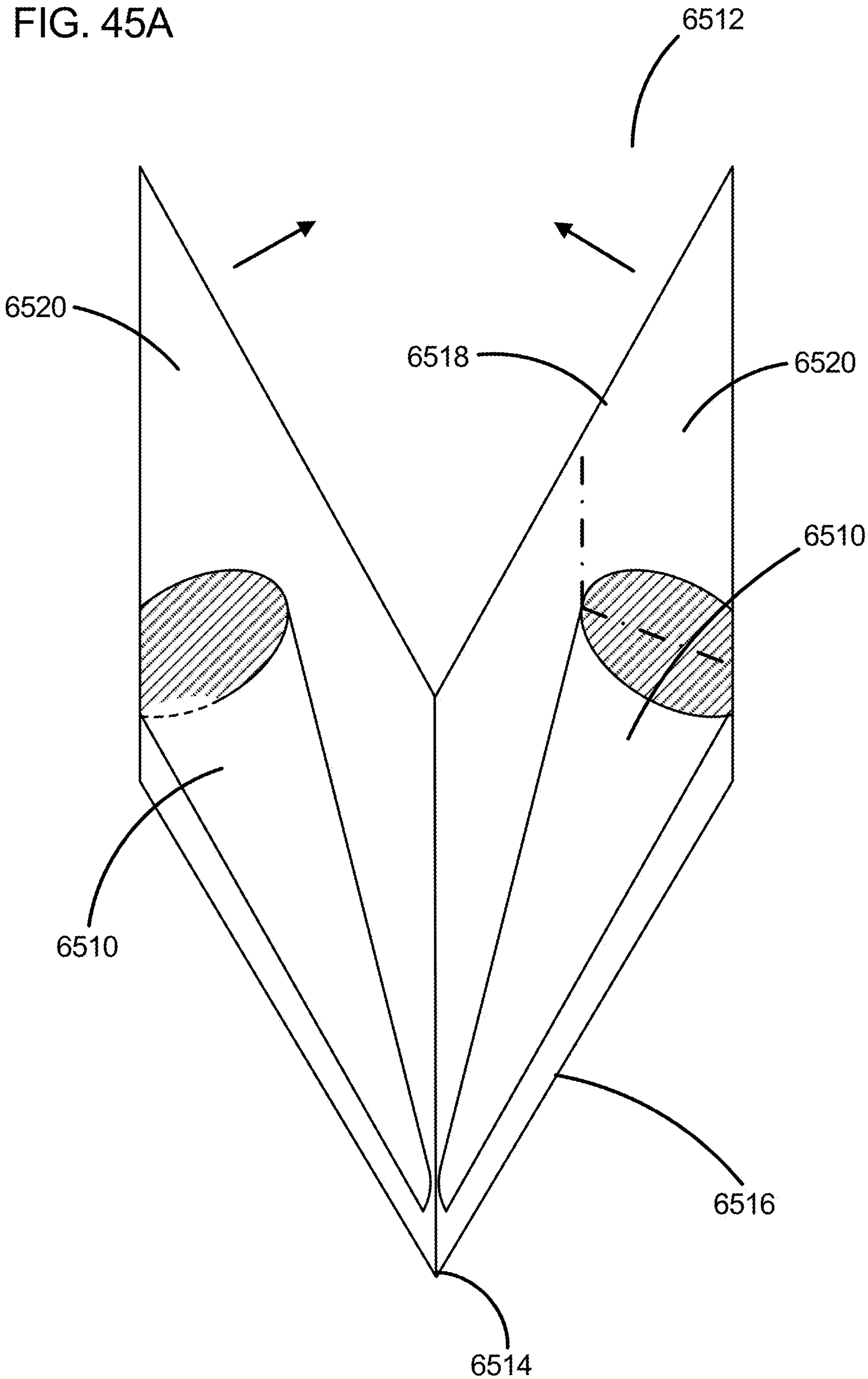
FIG. 45A is a schematic, perspective view of a portion of a support section of the filter media of FIG. 44, illustrated in a folded configuration but expanded or separated for illustrative purposes.

E. Additional Media Pack Arrangements Including Pleated Media with Flutes; FIGS. 44-46

Additional examples of alternative types of media arrangements or packs that involve filtration media having flutes extending between opposite ends or flow faces in a straight through flow configuration are depicted in FIGS. 44-46. The flutes can be considered inlet flutes when they are arranged to receive dirty air via an inlet flow face, and they can be considered outlet flutes when they are arranged to permit filtered air to flow out via an outlet flow face.

Figure 45B:
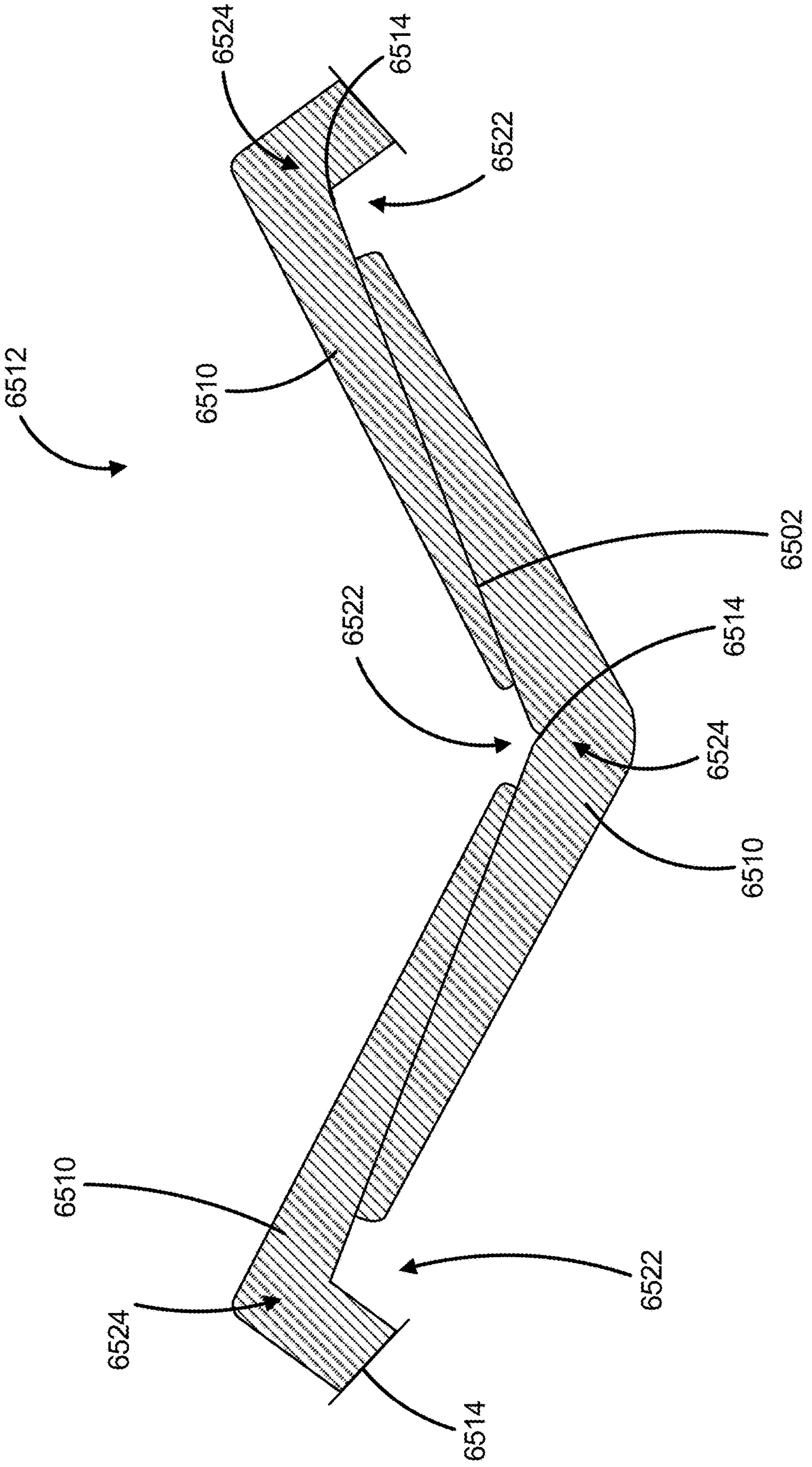
FIG. 45B is a schematic, cross-sectional view of a portion of the support section of the filter media of FIG. 44, illustrated in a folded configuration but expanded or separated for illustrative purposes.
Figure 46:
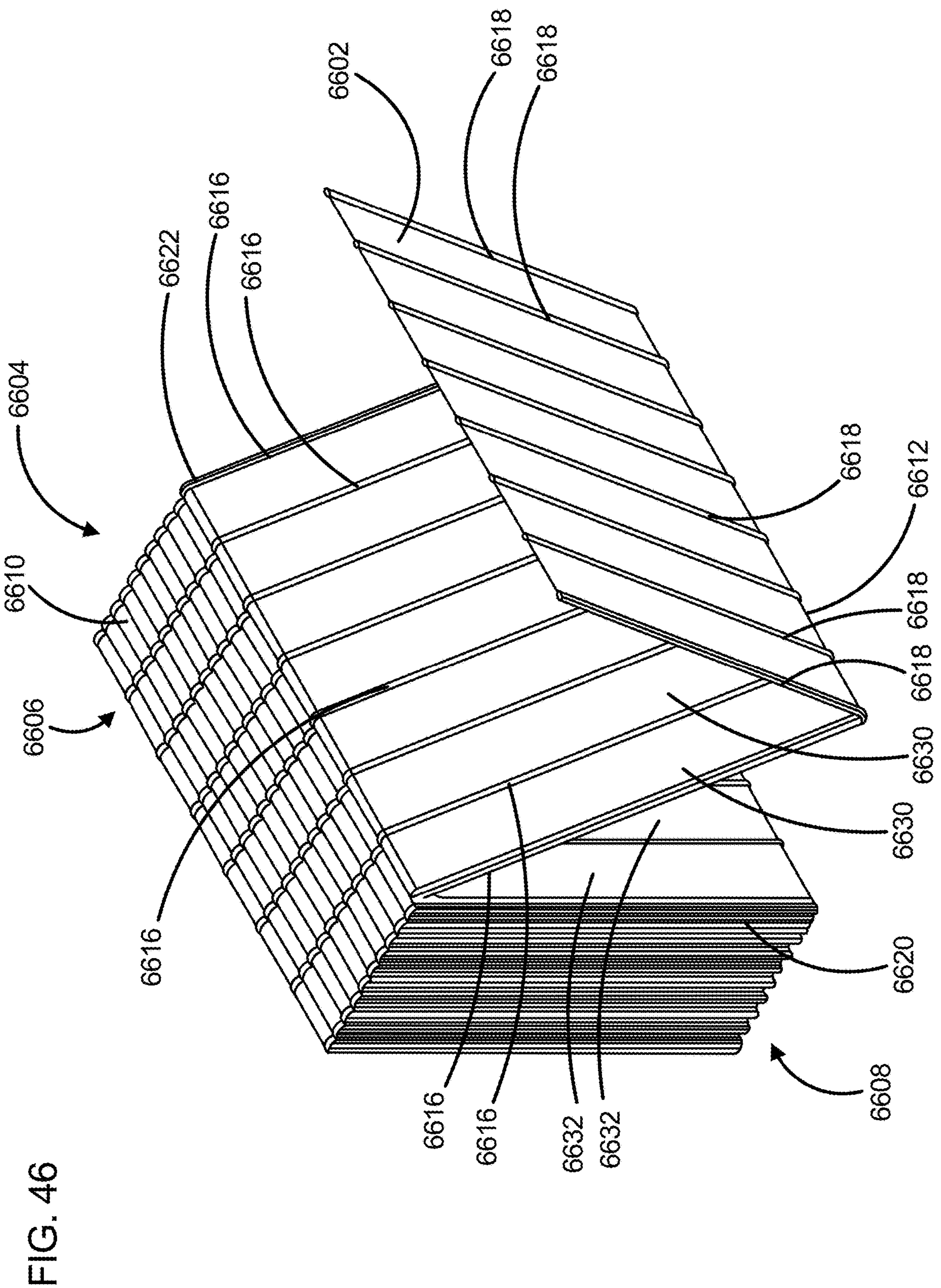
FIG. 46 is a perspective view of another media variation useable in arrangements according to the present disclosure.
Figure 47:
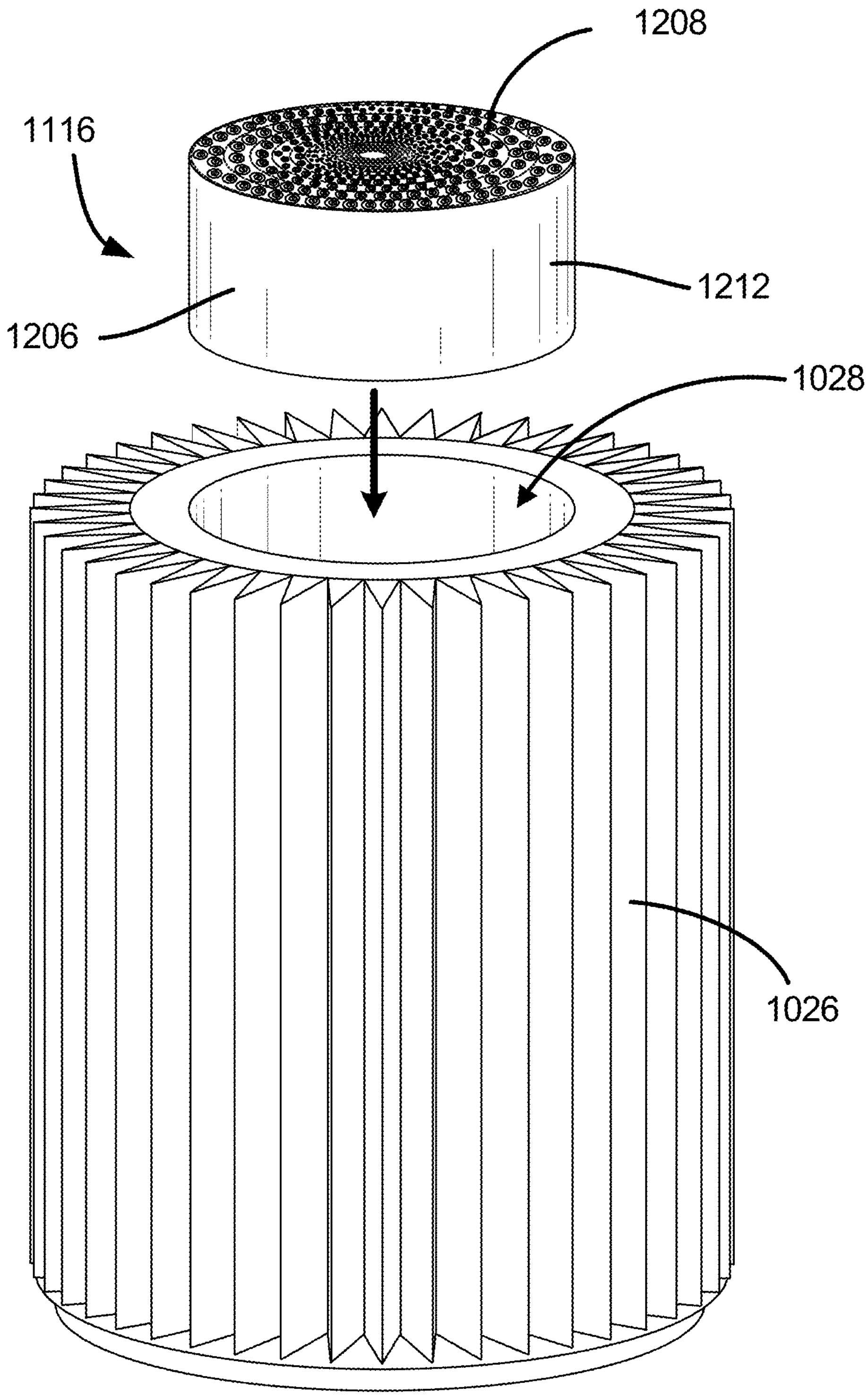
FIG. 47 is a perspective, exploded view of portions of the filter arrangement of FIG. 48.

The filtration media 6502 depicted in FIGS. 44-45B, which is analogous to ones depicted in U.S. Pat. Nos. 8,479,924 and 9,919,256 assigned to Mann+Hummel GmbH, is illustrated in an arrangement that shows how the filtration media 6502 can be formed into a media pack arrangement 6504.

The media pack arrangement 6504 can be considered as having relatively long or deep pleats from an inlet flow face 6506 to an outlet flow face 6508, and can also have varying pleat depths as illustrated. As the depth of pleats of a media pack increases, there is a tendency of the filtration media to collapse on each other thereby causing masking. Masking is undesirable because masked filtration media tends to no longer be available for filtration thereby decreasing dust holding capacity and flow through the media pack, and also potentially increasing pressure drop across the media pack. In order to reduce masking and to help the filtration media retain its shape, support structures are known to be applied to pleated media. In FIGS. 45A and 45B, support sections or spacers 6510 are provided. It should be appreciated that FIGS. 45A and 45B are illustrated in a folded configuration 6512 having pleat folds 6514, but are expanded or separated to show how the filtration media 6502 and the support sections or spacers 6510 can be arranged.

As illustrated in FIGS. 45A-45B, the filtration media 6502 extends between a first side 6516 and a second side 6518. Although only one support section 6510 is shown on each pleat face 6520, it should be appreciated that multiple support sections 6510 can be arranged along each pleat face 6520 so that when the filtration media 6502 is arranged into a media pack as illustrated in FIG. 44 as media pack 604, the volume between each of the support sections 6510 can be considered flutes extending between the inlet flow face 6506 and the outlet flow face 6508. The support sections 6510 can be arranged on each flow face 6520 so that opposite support sections 6510 contact or engage each other to help maintain the media pack shape while also limiting the amount of filtration media that would be contacted by the support sections 6510, as illustrated in FIG. 45A. Furthermore, by providing that the support sections 6510 have adhesive properties, the support sections 6510 can be provided so that opposing support sections 6510 can adhere to each other when the filtration media 6502 is arranged into the media pack 6504.

The support sections 6510 can be arranged in a tapered configuration where support sections 6510 have a cross section at an interior fold 6522 and wherein the cross section increases toward an exterior fold 6524. In this context, the phrase "interior fold" refers to the side of the media that forms an acute angle, and the phrase "exterior fold" refers to the side of the media that forms an obtuse angle when the media is arranged into a media pack. Furthermore, the reference to changing the cross section of the support sections 6510 can refer to one or both of the height that the support section extends away from the media to which it is adhered and also to the width along the media to which it is adhered to in a direction toward or away from other support sections across adjacent flutes. Changing the shape of the support sections 6510 can help maintain the shape of the media pack and the resulting flutes, and can help reduce the amount of media that would otherwise be contacted by the support sections 6510 if they were not arranged in a tapered configuration. In addition, the support sections 6510 can be arranged in a non-tapered configuration. As illustrated in FIG. 45B, the support sections 6510 can be provided so that they extend over the exterior folds 6524 although it is not necessary for the support sections 6510 to extend over the exterior folds. In addition, it is not necessary for the support sections 6510 to extend into the interior folds 6522, although, if desired, the support sections 6510 can be provided so that they extend into the interior folds 6522.

The support sections 6510 can be applied to the filtration media 6502 as adhesive extruded onto the filtration media 6502 where the adhesive forms the support sections 6510. Before the adhesive has a chance to fully cure, the filtration media 6502 can be folded into the media pack arrangement 6504, which may or may not have varying pleat depths. By forming the media pack arrangement 6504 before the adhesive has fully cured, the opposing support sections 6510 can become bonded or adhered to each other thereby forming flutes extending between the inlet flow face 6506 and the outlet flow face 6508.

It should be appreciated that the filtration media 6502 can be provided with deformation, such as corrugations, extending across the media. The direction of deformation, such as corrugation, can be parallel or perpendicular to the pleat fold direction.

The filtration media 6602 depicted in FIG. 46 is analogous to filtration media depicted in US 2018/02007566 assigned to Champion Laboratories, Inc., as another example of a media pack arrangement 6604 having inlet and outlet flutes in a straight through flow arrangement.

The filtration media pack arrangement 6604 can be formed by folding the filtration media 6602 to form an inlet flow face 6606 and an outlet flow face 6608. The pleat tips 6610 form the inlet flow face 6606, and the pleat tips 6612 form the outlet flow face 6608. Adhesive beads 6616 and 6618, which may be continuous or discontinuous, extend along the filtration media 6602 in multiple lines across the filtration media 6602 from a media first side 6620 to a media second side 6622. The adhesive beads 6616 and 6618 along the media first side 6620 and along the media second side 6620 can be thickened, if desired, and can be arranged to provide an edge seal along the media first side 6620 and the media second side 6622. By providing that the adhesive beads 6616 and 6618 adhere to each other as the filtration media 6602 is folded, inlet flutes 6630 and outlet flutes 6632 can be formed in the straight through media pack arrangement 6604.

A similar type of filtration media pack arrangement is commercially available under the name Enduracube from Baldwin Filters, Inc. The filtration media pack available under the name Enduracube from Baldwin Filters, Inc. is arranged in a pleated configuration forming inlet flutes and outlet flutes extending between an inlet flow face and an outlet flow face.

F. Still Further Media Types

Many of the techniques characterized herein will preferably be applied when the media is oriented for filtering between opposite flow ends of the cartridge is media having flutes or pleat tips that extend in a direction between those opposite ends. However, alternatives are possible. The techniques characterized herein with respect to seal arrangement definition can be applied in filter cartridges that have opposite flow ends, with media positioned to filter fluid flow between those ends, even when the media does not include flutes or pleat tips extending in a direction between those ends. The media, for example, can be depth media, can be pleated in an alternate direction, or it can be a non-pleated material.

It is indeed the case, however, that the techniques characterized herein are particularly advantageous for use with cartridges that are relatively deep in extension between flow ends, usually at least 100 mm, typically at least 150 mm, often at least 200 mm, sometimes at least 250 mm, and in some instances 300 mm or more, and are configured for large loading volume during use. These types of systems will typically be ones in which the media is configured with pleat tips or flutes extending in a direction between opposite flow ends.

It is also noted that while the techniques described herein were typically developed for advantageous application and arrangements involving media packs with straight through flow configurations, the techniques can be applied to advantage in other systems. For example, the techniques can be applied when the cartridge comprises media surrounding a central interior, in which the cartridge has an open end. Such arrangements can involve "forward flow" in which air to be filtered enters the central open interior by passage through the media, and the exits through the open end; or, with reverse flow in which air to be filtered enters the open end and then turns and passes through the media. A variety of such arrangements are possible, including pleated media and alternate types of media. Configurations usable would include cylindrical and conical, among others.

III. Additional Arrangements; FIGS. 47-53

Figure 48:
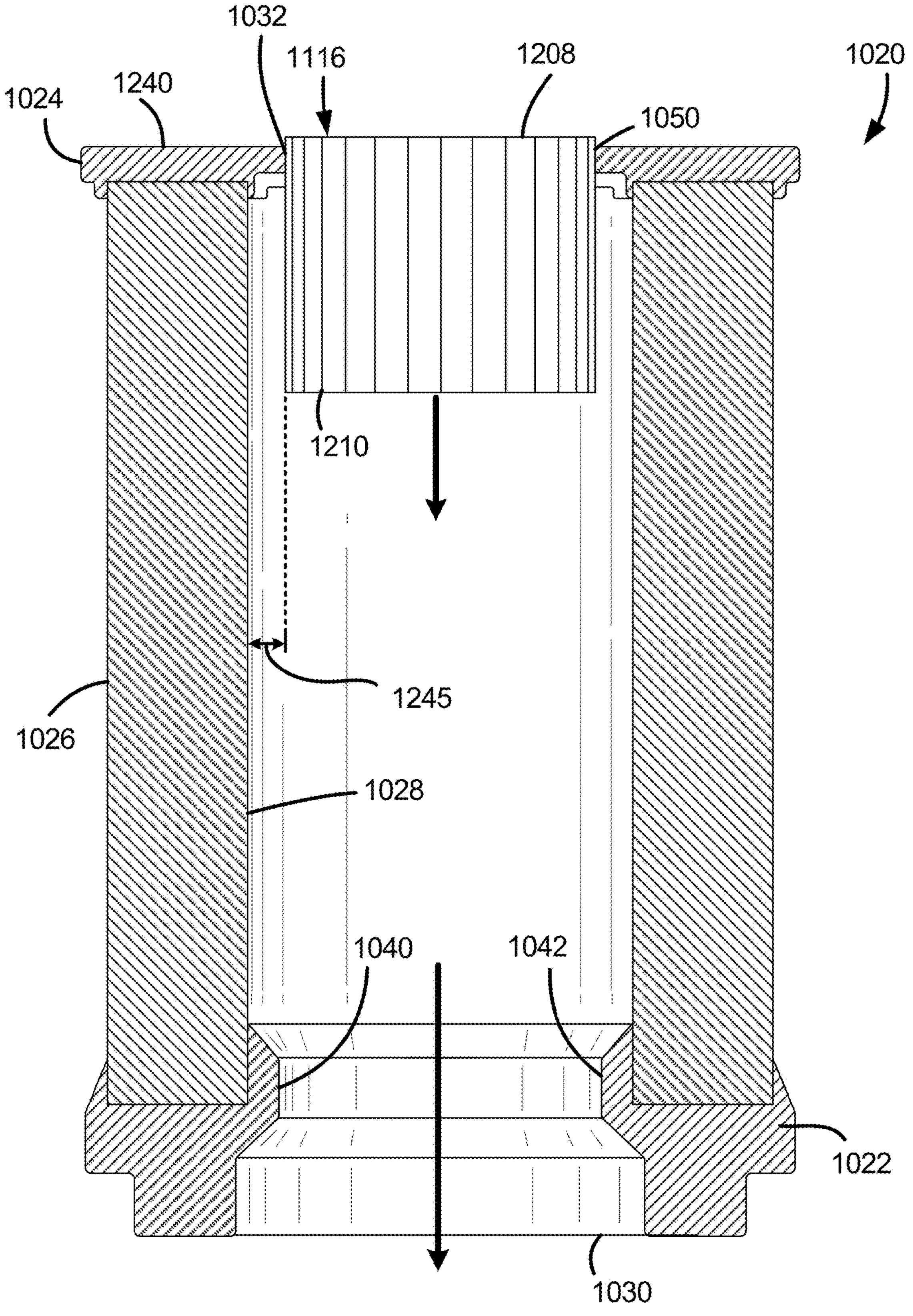
FIG. 48 is a perspective view of a filter arrangement, constructed in accordance with principles of this disclosure.

FIG. 48 is a perspective view of a filter arrangement 1020, constructed in accordance with principles of this disclosure. In general, the filter arrangement 1020 includes a first open end cap 1022, an opposite second end cap 1024, a tubular section of filter media 1026 extending between the end caps 1022, 1024, and a filter cartridge 1160 mounted within an opening in the second end cap 1024.

The filter media 1026 can be many different types, depending on the application. In many useful embodiments, the filter media 1026 is pleated. In many useful embodiments, the filter media 1026 is pleated cellulose. The filter media 1026 is tubular and surrounds an open interior volume 1028. The tubular shape can have a round cross-section, or it can have other shapes such as oval.

The first end cap 1022 has an opening 1030 in communication with the interior volume 1028. The second end cap 1024 has an opening 1032 that accommodates the filter cartridge 1160.

The end caps 1022, 1024 are secured to the ends of the filter media 1026. This can be done by molding the end caps 1022, 1024 directly onto the media 1026, but many alternatives are possible.

In FIG. 48, the first end cap 1022 includes a seal member 1040 to form a releasable seal with a mating part, such as an outlet tube. The seal member 1040 can be an inwardly directed radial seal member 1042. The seal member 1040 can be molded as part of the first end cap 22, with a soft polyurethane foam. Alternative seal arrangements are possible, including pinch seals or axial seals.

The filter cartridge 116 includes a media pack 1206. The media pack 1206 can include many different types of media including membrane, depth media, foam media, pleated, straight-through flow media, z-media, fluted media, and any of the various types described in Section II of this disclosure, above.

In the example shown in the FIGS., the media pack 1206 includes a first flow face 1208 and an opposite second flow face 1210 for straight through flow.

Flutes 411, 415 (FIG. 22) extend in a direction between the opposite first and second flow faces 1208, 1210. A side wall 1212 (FIG. 47) extends between the first and second flow faces 1208, 1210. The side wall 1212 forms an outer periphery of the cartridge 1016 and can include a hard shell, in some embodiments. In other embodiments, the side wall 1212 is the outer wall of the media pack 1206 and is free of a shell.

In this embodiment, the first flow face 1208 corresponds to an inlet flow face, while the second flow face 1210 corresponds to an outlet flow face.

The filter cartridge 1016 can either be removable and replaceable in the opening 1032 of the second end cap 1024, or it may be non-removably/permanently mounted therein.

In embodiments in which the cartridge 1016 is non-removably mounted, the end cap 1024 and filter cartridge 1016 are molded together in a single continuous end piece 1240, so that they are one unitary filter element.

In embodiments in which the filter cartridge 1016 is removably mounted in the opening 1032 of the second end cap 1024, there can be a seal member 1050 radially formed between the sidewall 1212 of the media pack 1206 and a radial inner portion of the second end cap 1024. While the seal member 1050 shown in the drawings forms an inwardly directed radial seal, many other types of seals can be formed including a pinch seal or an axial seal.

Preferably, to avoid blocking flow through the pleated media 1026 (i.e., masking), there will be a minimum and/or controlled distance 1245 (FIG. 48) between the outer periphery of the cartridge 1116 and inner wall of the pleats 1026 along the interior 1028. For example, the distance 1245 can be: at least 0.3 cm; no greater 40% of the diameter of the opening 1032; typically less than 5 cm; and typically in a range of 0.5-2 cm.

The media pack 1206 is preferably a coiled media pack, but in other embodiments, the media pack 1206 can be stacked, as described with respect to FIG. 32 above. In this embodiment, the media pack 1206 has a cross-sectional shape that matches the cross-sectional shape of the openings 1126, 1130 of the end caps 1022, 1024. In this example, the shape is round. In other embodiments, the media pack can be other shapes including, for example: non-round, obround, oval, racetrack-shaped, kidney-shaped, conical, frusto-conical, trapezoidal, regular or irregular polygon, banana-shaped; a sector of an annulus with rounded ends; or a segment of a circle.

The media pack 1206 extends from the second end cap 1024 into the interior volume 1028 and toward the first end cap 1022 along an extension less than half of a distance between the first 1022 and second end caps 1024. In some embodiments, it extends less than one-third of the distance between the first 1022 and second 1024 end caps. Alternatives are possible including the media pack 1206 extending from the second end cap 1024 into the interior volume 1028 and toward the first end cap 1022 along an extension greater than 10%, or greater than 20%, or greater than 30%, or greater than 40%, or greater than 50% of a distance between the first 1022 and second end caps 1024.

The filter cartridge 1116 allows for flow of unfiltered fluid, such as air, through the first flow face 1208. The media pack 1206 removes particulate, and filtered fluid the flows through the second flow face 1210 to reach the interior volume 1028 of the filter element 1042. Likewise, unfiltered fluid flows through the filter media 1026 and into the interior volume 1028, joining the filtered fluid that passed through the filter cartridge 1116. From there, the filtered fluid flows through the aperture 1040.

In general, advantages are achieved with the filter arrangement 1020 over the prior art. For example, the filter cartridge 1116 helps to add life and more media to both the filter arrangement 1020 without creating a larger footprint. In addition, having two different media types (e.g., pleated media 1026 and media 1206) leads to advantages including being able to filter different particle sizes. The two different media types can be helpful since they will often having different clogging behavior in high or low humid conditions. For example, in changing humidity periods, the different media types (e.g., pleated 1026 and media 1206) can show different loading behavior over time, which can lower the overall pressure drop by providing more media and two options for the fluid (air) to pass.

Example Alternative Second End Cap, FIGS. 49-53

An alternative embodiment for the filter arrangement is shown in FIGS. 49-53 at 1020'. The filter arrangement 1020' can be the same as the filter arrangement 1020, described above, except that there is an alternative embodiment of the second end cap 1020'.

Figure 49:
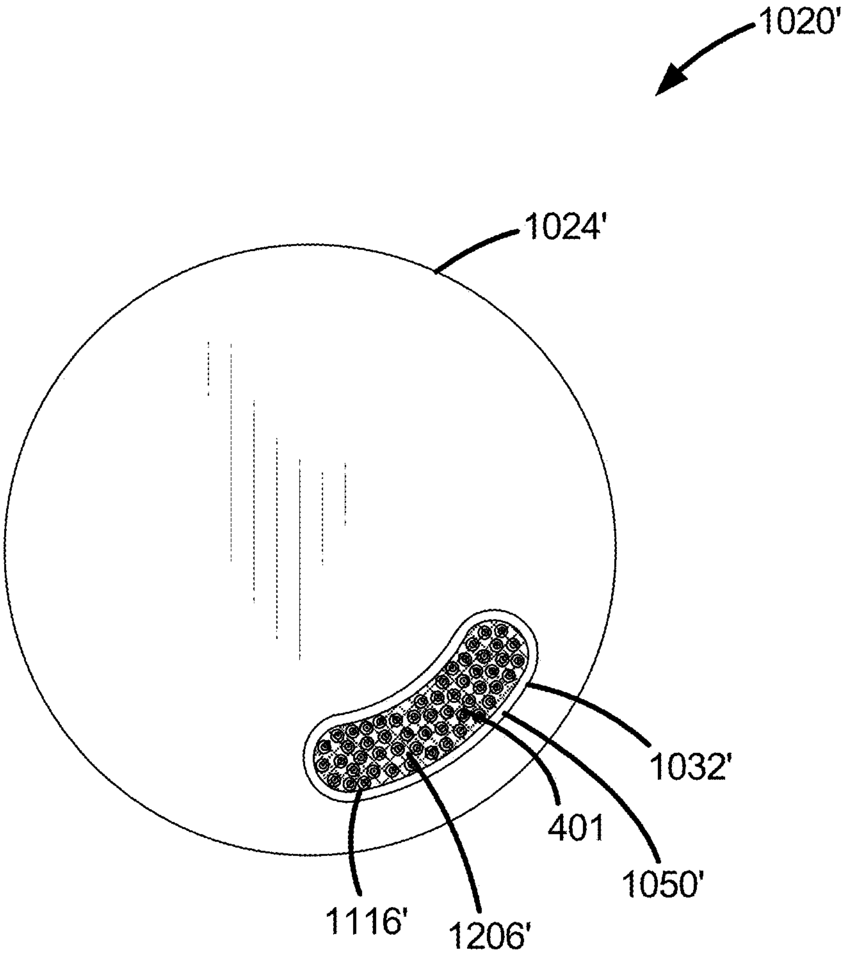
FIG. 49 is an end view of an alternative embodiment of a filter arrangement, constructed in accordance with principles of this disclosure.
Figure 50:
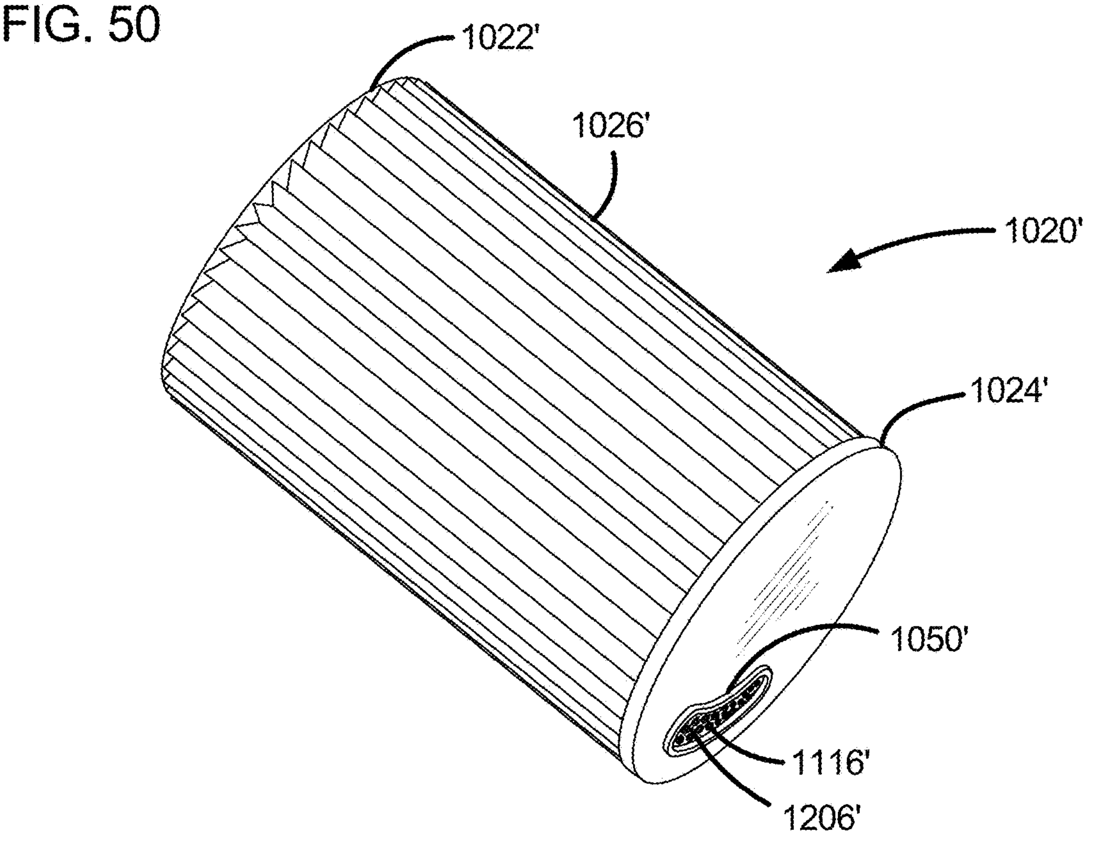
FIG. 50 is a perspective view of the filter arrangement of FIG. 49.
Figure 51:
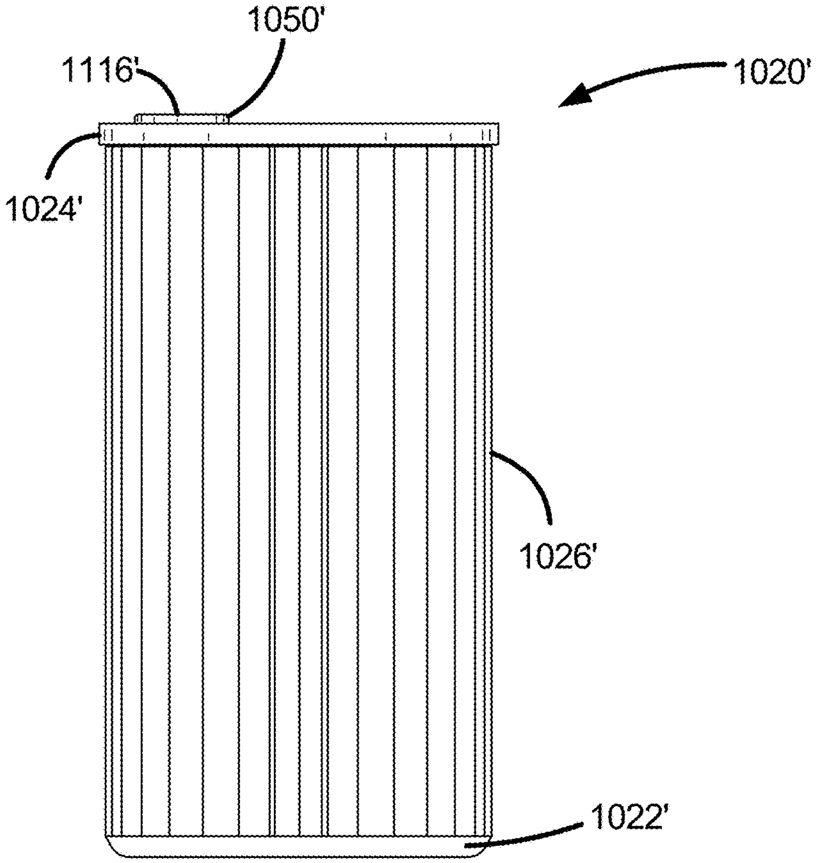
FIG. 51 is a side elevational view of the filter arrangement of FIG. 49.

In FIG. 49, the opening 1032' in the second end cap 1024' is off-center. The filter cartridge 1116' is oriented in the opening 1032', either removably or permanently. A seal member 1050' is around the periphery of the filter cartridge 1116'. The seal member 1050' can project from a remaining portion of the end cap 1020', as can be seen in FIG. 50.

The media pack 1206' can be any of the various types described above in section II of this disclosure. For example, the media pack 1206' can be straight-through flow media, such as fluted media, pleated media, Z-media, membrane, depth media, foam media, and any variation as described in Section II. The outer perimeter shape of the filter cartridge 1116' is non-round. In the example shown in FIGS. 49-51, the shape can include: a sector of an annulus with rounded ends; a segment of a circle; a kidney; or a banana.

In some implementations, the filter cartridge 1116' can be operably installed in a filter housing, in which a portion of the housing has an opening that is sized to receive the axially projecting seal member 1050'. The seal member 1050', in the embodiment shown, is an outwardly extending radial seal to form a seal between the filter cartridge 1116' and the opening 1032' in the end cap 1024'. The seal member 1050', since it projects axially from the end cap 1024' is positioned to form a radially seal with a similar shaped opening (e.g., a sector of an annulus with rounded ends; a segment of a circle; a kidney; or a banana) in a portion of a filter housing, such as either the housing body or a housing cover. Alternative seals are possible including a radially inwardly extending radial seal, axial seal, pinch seal, or a combination. The media pack 1206' operates to filter any fluid flowing through the opening in the housing.

In further examples, the filter cartridge 1116' is non-removably a part of the end cap 1024'. The seal member 1050' projects axially from the end cap 1024' and is positioned to form a removable seal with a similar shaped opening (e.g., a sector of an annulus with rounded ends; a segment of a circle; a kidney; or a banana) in a portion of a filter housing, such as either the housing body or a housing cover. The removable seal can be a radial seal (inward or outward directed), axial seal, or pinch seal.

Figure 52:
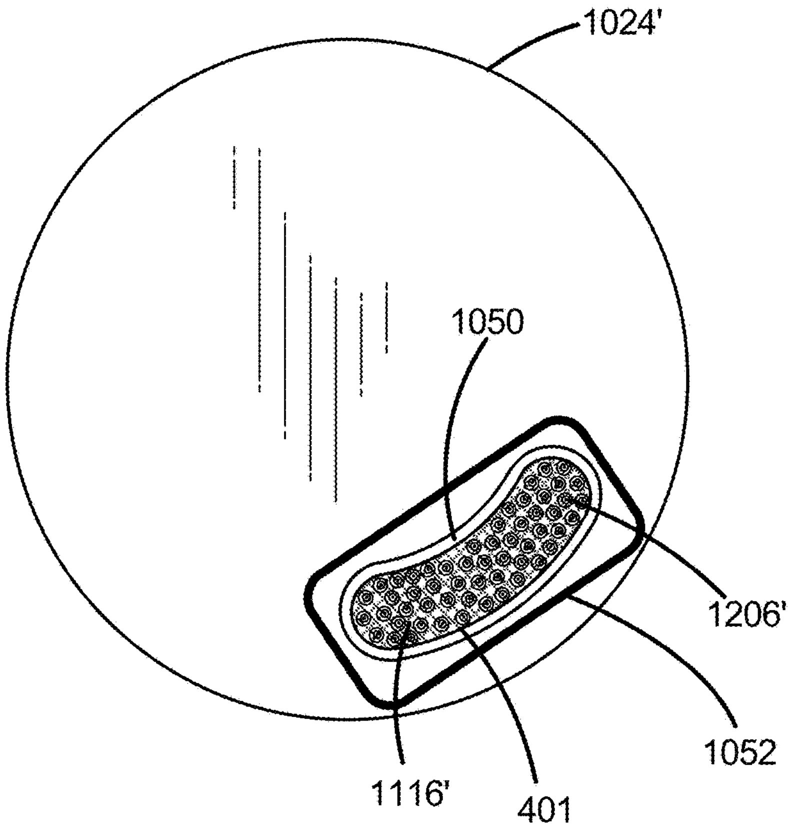
FIG. 52 is an end view of an alternative embodiment of a filter arrangement, constructed in accordance with principles of this disclosure.

In further examples, the filter cartridge 1116' is removably inserted into the end cap 1024'. There can be a first seal member, in the form of seal member 1050', between the filter cartridge 1116' and the end cap 1024', and a second seal member in the form of seal member 1052 (FIG. 52) projecting axially from the end cap 1024', which is positioned to form a removable seal over an opening, which could be many shapes (e.g., a sector of an annulus with rounded ends; a segment of a circle; a kidney; or a banana) in a portion of a filter housing, such as either the housing body or a housing cover. The first seal member 1050' between the cartridge 1116' and the end cap 1024' can be a radial seal, while the second seal member 1052 with the housing part can be an axial seal. The second seal member 1052 can have a periphery of many shapes, such as rectangular as shown in FIG. 52. In an alternative, the filter cartridge 1116' may be a non-removable part of the end cap 1024'.

Figure 53:
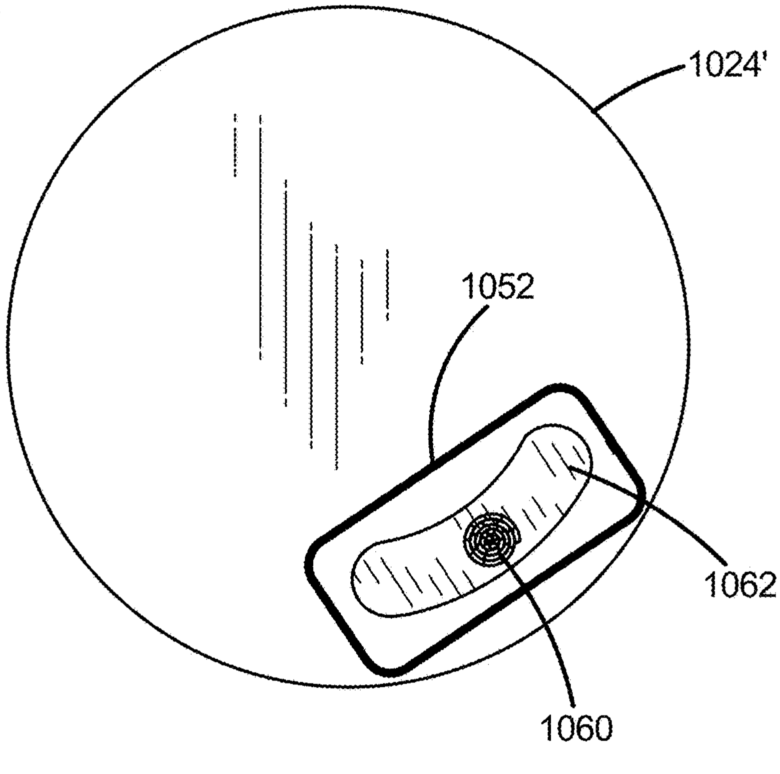
FIG. 53 is an end view of an alternative embodiment of a filter arrangement, constructed in accordance with principles of this disclosure.

In the example in FIG. 53, the filter cartridge 1060 is round and made from straight-through flow media, including any of the types described in Section II above including fluted media, pleated media, Z-media, membrane, depth media, foam media. The filter cartridge 1060 is either removably or non-removably positioned in the end cap 1024'. Surrounding the filter cartridge 1060 is a non-permeable closure material 1062, such as plastic, including a hard molded plastic. The periphery of the closure material 1062 can have the shape of a sector of an annulus with rounded ends; a segment of a circle; a kidney; or a banana). The seal member 1052 is shown surrounding the closure material 1062, which surrounds the filter cartridge 1060. The seal member 1052 is shown as an axial seal. In an alternative, instead of seal member 1052, this embodiment can include seal member 1050' forming the periphery of the closure material 1062 and projecting axially from the end cap 1024' to be positioned to form a radially seal with a similar shaped opening (e.g., a sector of an annulus with rounded ends; a segment of a circle; a kidney; or a banana) in a portion of a filter housing, such as either the housing body or a housing cover.

Inventive clauses relating to the second alternative end cap of FIGS. 49-53 include:

A filter arrangement comprising: first and second opposite end caps; the first end cap having an opening; (b) a tubular section of filter media extending between the first and second end caps and defining an interior volume therewithin; and a filter cartridge mounted within an opening in the second end cap.

The filter arrangement as above wherein the filter cartridge has a media pack comprising media for straight-through flow.

The filter arrangement as above, wherein the filter cartridge has a media pack comprising flutes.

The filter arrangement as above, wherein the filter cartridge has a media pack comprising pleats.

The filter arrangement as above, wherein the filter cartridge has a media pack comprising opposite first and second flow faces with flutes extending in a direction therebetween; and a sidewall extending between the first and second flow faces; at least some of the flutes having an upstream portion adjacent the first flow face being open and a downstream portion adjacent the second flow face being closed; and at least some of the flutes having an upstream portion adjacent the first flow face being closed and a downstream portion adjacent the second flow face being open.

The filter arrangement as above wherein the tubular section of filter media is pleated media.

The filter arrangement as above wherein the first open end cap includes a radially inwardly directed seal member oriented to form a releasable radial seal.

The filter arrangement as above wherein the filter cartridge is removably mounted in the opening of the second end cap.

The filter arrangement as above wherein the filter cartridge is non-removably mounted in the opening of the second end cap.

The filter arrangement as above wherein the media pack in the filter cartridge is coiled.

The filter arrangement as above wherein the media pack of the filter cartridge extends from the second end cap into the interior volume and toward the first end cap along an extension less than half of a distance between the first and second end caps.

The filter arrangement as above wherein the media pack of the filter cartridge extends from the second end cap into the interior volume and toward the first end cap along an extension less than one-third of a distance between the first and second end caps.

The filter arrangement as above wherein the filter cartridge is positioned within the opening in the second end cap in an off-centered position.

The filter arrangement as above wherein the filter cartridge has an outer perimeter shape that is non-round.

The filter arrangement as above, wherein the filter cartridge has an outer perimeter shape including one of: a sector of an annulus with rounded ends; a segment of a circle; a kidney; or a banana.

The filter arrangement as above wherein the filter cartridge includes a seal member that forms a seal between the opening in the second end cap and the filter cartridge.

The filter arrangement as above wherein the seal member includes one of a: an outwardly extending radial seal member; an inwardly extending radial seal member; a pinch seal member; or an axial seal member.

The above are example principles. Many embodiments can be made using these principles.

What is claimed is:

1. A filter element comprising:
- (a) a tubular section of filter media defining a filter interior within the tubular section;
- (b) a first end cap secured to the filter media;
  - (i) the first end cap having a seal arrangement along an inner radial surface; the seal arrangement including a seal member having an inwardly radially directed seal member surface and a thickness that varies along the seal member surface;
    - (A) the thickness of the seal member surface varying in a radial direction along the seal member surface; and
    - (B) a length of the seal member surface being constant in an axial direction;
- (c) a second end cap secured to the filter media at an end of the filter media opposite of the first end cap;
  - (i) the second end cap having a recessed section extending from an inner perimeter of the filter media and projecting into the filter interior;
  - (ii) a rod-receiving aperture centered in the recessed section; and
  - (iii) an integrated gasket with an inwardly directed radial seal surface surrounding the rod-receiving aperture.

2. The filter element of claim 1, further including a seal support; the seal member being supported by the seal support.

3. The filter element of claim 2, wherein the seal support comprises an inner liner extending between the first and second end caps.

4. The filter element of claim 1, wherein the seal member thickness has a minimum thickness and a maximum thickness, wherein the maximum thickness is at least 1.1 times the minimum thickness.

5. The filter element of claim 1, wherein the filter media is pleated media.

6. The filter element of claim 1, wherein the tubular section of filter media has a round cross-section.

7. The filter element of claim 1, wherein the inwardly radially directed seal surface defines a plurality of outwardly projecting portions alternating with a plurality of inwardly projecting portions.

8. The filter element of claim 7, wherein the outwardly projecting portions and inwardly projecting portions are curved.

9. The filter element of claim 7, wherein there are greater than 20 radially outwardly projecting portions alternating with greater than 20 radially inwardly projecting portions.

10. The filter element of claim 1, wherein the integrated gasket has an outer diameter less than 20% of an outer diameter of the second end cap.

* * * * *